US012787002B2

(12) United States Patent
Elkotby et al.

(10) Patent No.: US 12,787,002 B2
(45) Date of Patent: Nov. 3, 2026

(54) METHODS, ARCHITECTURES, APPARATUSES AND SYSTEMS FOR SUPPORTING IDLE/INACTIVE RRC STATES PAGING USING ULTRA-LOW POWER RECEIVERS

(71) Applicant: InterDigital Patent Holdings, Inc., Wilmington, DE (US)

(72) Inventors: Hussain Elkotby, Conshohocken, PA (US); Keiichi Kubota, Tokyo (JP); Ali Esswie, Montreal (CA); Virgile Garcia, Antibes (FR); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 275 days.

(21) Appl. No.: 18/569,051

(22) PCT Filed: Jun. 14, 2022

(86) PCT No.: PCT/US2022/033343
§ 371 (c)(1),
(2) Date: Dec. 11, 2023

(87) PCT Pub. No.: WO2022/266036
PCT Pub. Date: Dec. 22, 2022

(65) Prior Publication Data

US 2024/0284456 A1 Aug. 22, 2024

Related U.S. Application Data

(60) Provisional application No. 63/297,890, filed on Jan. 10, 2022, provisional application No. 63/210,224, filed on Jun. 14, 2021.

(51) Int. Cl.
*H04W 52/02* (2009.01)
*H04W 68/02* (2009.01)
(Continued)

(52) U.S. Cl.
CPC ... *H04W 72/1273* (2013.01); *H04W 52/0235* (2013.01); *H04W 68/02* (2013.01); *H04W 76/19* (2018.02)

(58) Field of Classification Search
CPC ......... H04W 72/1242; H04W 72/1268; H04W 72/1289; H04W 72/12; H04W 72/10;
(Continued)

(56) References Cited

U.S. PATENT DOCUMENTS

| | | | | |
|---|---|---|---|---|
| 12,401,323 | B2 * | 8/2025 | Moody | H03F 1/0222 |
| 2014/0112224 | A1 * | 4/2014 | Jafarian | H04W 52/0209 370/311 |

(Continued)

FOREIGN PATENT DOCUMENTS

| | | | |
|---|---|---|---|
| EP | 3609242 | A1 | 2/2020 |
| WO | WO 2019108940 | A1 | 6/2019 |

(Continued)

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304 V16.4.0, Mar. 2021, 39 pages.

(Continued)

*Primary Examiner* — Nathan S Taylor
(74) *Attorney, Agent, or Firm* — VOLPE KOENIG

(57) ABSTRACT

Procedures, methods, architectures, apparatuses, systems, devices, and computer program products related to a Wireless Transmit-Receive Unit (WTRU) operating in a network, for supporting paging using an Ultra-Low Power (ULP) receiver, are disclosed. A WTRU may receive a ULP-specific configuration, and may activate the ULP receiver, and inactivate the Uu receiver, when support of ULP paging operation, by the network, is determined. The ULP receiver (Continued)

may detect a Low-Power Wake-Up Signal (LP-WUS) and may activate the Uu receiver and perform PDCCH monitoring. Under condition that the WTRU detects, in the channel monitoring, its identifier in a paging message received via the Uu receiver, the WTRU initiates a connection establishment or a connection resume procedure.

15 Claims, 22 Drawing Sheets

(51) Int. Cl.
*H04W 72/1273* (2023.01)
*H04W 76/19* (2018.01)

(58) Field of Classification Search
CPC . H04W 52/08; H04W 52/146; H04W 52/325; H04W 52/362; H04W 52/367; H04W 52/54; H04W 72/044; H04W 72/23; H04W 52/32; H04W 72/04; H04W 68/02; H04W 52/0216; H04W 72/232; H04W 52/0229; H04W 52/0235; H04W 52/028; H04W 68/005; H04W 72/1273; H04W 52/0225; H04W 72/231; H04W 76/19; H04W 76/27; H04W 84/12; H04W 24/08; H04W 68/025; H04W 76/28; H04W 88/02; H04W 88/08; H04W 16/14; H04W 4/70; H04W 48/18; H04W 48/20; H04W 52/0209; H04W 52/0219; H04W 52/0274; H04W 74/002; H04W 74/0833; H04W 88/06; H04W 92/10; H04W 48/10; H04W 74/0836; H04W 52/02; H04W 68/00; H04W 36/00; H04W 36/08; H04W 4/00; H04W 4/08; H04W 72/0446; H04W 72/0453; H04W 72/20; H04W 74/04; H04W 74/08; H04W 76/11; H04L 5/00; H04L 1/1861; H04L 1/1864; H04L 5/0053; H04L 5/0091; H04L 1/00; H04L 1/0041; H04L 1/0045; H04L 1/0069; H04L 1/08; H04L 5/0007; H04L 27/02; H04L 27/10; H04L 1/0026; H04L 27/2613; H04L 1/1829; H04L 27/26; Y02D 30/70; H02J 50/001; H02J 50/00; H04J 11/0069; H04M 1/00; H04M 1/725
See application file for complete search history.

(56) References Cited

U.S. PATENT DOCUMENTS

| | | | | |
|---|---|---|---|---|
| 2014/0112226 | A1* | 4/2014 | Jafarian | H04W 52/0229 370/311 |
| 2014/0112229 | A1* | 4/2014 | Merlin | H04L 5/0055 370/311 |
| 2014/0120962 | A1* | 5/2014 | Merlin | H04W 68/02 455/466 |
| 2014/0126442 | A1* | 5/2014 | Jafarian | H04W 52/0212 370/311 |
| 2017/0332327 | A1* | 11/2017 | Fang | H04L 5/0007 |
| 2019/0150095 | A1* | 5/2019 | Lin | H04W 52/0267 370/311 |
| 2019/0172285 | A1* | 6/2019 | Jin | H04W 4/80 |
| 2019/0182749 | A1* | 6/2019 | Breaux | H04W 4/027 |
| 2019/0288860 | A1* | 9/2019 | Poltorak | H04L 9/3268 |
| 2020/0059863 | A1* | 2/2020 | Ji | H04W 88/02 |
| 2020/0288395 | A1* | 9/2020 | Doherty | H04W 52/028 |
| 2021/0337460 | A1* | 10/2021 | Breaux, III | H04W 8/18 |
| 2022/0070766 | A1* | 3/2022 | Haque | H04W 52/0209 |
| 2023/0045879 | A1* | 2/2023 | Tunnell | G06Q 30/0269 |
| 2023/0074373 | A1* | 3/2023 | Jatunov | G01S 13/84 |
| 2023/0075058 | A1* | 3/2023 | Gibbs | A61B 5/681 |
| 2023/0156569 | A1* | 5/2023 | Breaux, III | H04W 12/08 381/86 |
| 2023/0156570 | A1* | 5/2023 | Breaux, III | H04W 4/80 381/86 |
| 2023/0328815 | A1* | 10/2023 | Wiese | H04L 12/66 370/328 |
| 2023/0379817 | A1* | 11/2023 | Chen | H04W 52/0212 |
| 2023/0388930 | A1* | 11/2023 | Chen | H04W 52/0251 |
| 2024/0236739 | A1* | 7/2024 | Kubota | H04W 36/36 |

FOREIGN PATENT DOCUMENTS

| | | | |
|---|---|---|---|
| WO | WO 2020131813 | A1 | 6/2020 |
| WO | WO 2021155209 | A1 | 8/2021 |

OTHER PUBLICATIONS

Alghaihab et al., "Analysis of Circuit Noise and Non-Ideal Filtering Impact on Energy Detection Based Ultra-Low-Power Radios Performance", Institute of Electrical and Electronics Engineers (IEEE), IEEE Transactions on Circuits and Systems II: Express Briefs, vol. 65, Issue No. 12, Dec. 2018, 5 pages.

Wang et al., "A Near-Zero-Power Wake-Up Receiver Achieving—69-dBm Sensitivity", Institute of Electrical and Electronics Engineers (IEEE), IEEE Journal of Solid-State Circuits, vol. 53, Issue No. 6, Jun. 2018, 13 pages.

"3rd Generation Partnership Project; Technical Specification Group Radio Access Network; NR; Radio Resource Control (RRC) protocol specification (Release 16)", 3GPP TS 38.331 V16.4.1, Mar. 2021, 949 pages.

* cited by examiner

METHODS, ARCHITECTURES, APPARATUSES AND SYSTEMS FOR SUPPORTING IDLE/INACTIVE RRC STATES PAGING USING ULTRA-LOW POWER RECEIVERS

CROSS-REFERENCE TO RELATED APPLICATIONS

This application is a U.S. National Stage Application under 35 U.S.C. 371 of International Patent Application No. PCT/US2022/033343, filed 14 Jun. 2022, which claims the benefit of U.S. Provisional Patent Application Nos. (i) 63/297,890 filed Jan. 10, 2022, and (ii) 63/210,224 filed Jun. 14, 2021; each of which is incorporated herein by reference.

TECHNICAL FIELD

The present disclosure is generally directed to the fields of communication networks, wireless and/or wired. For example, one or more embodiments disclosed herein are related to methods, architectures, apparatuses, and/or systems including a Wireless Transmit-Receive Unit (WTRU) operating in a network, for supporting paging using an Ultra-Low Power (ULP) receiver in wireless communications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
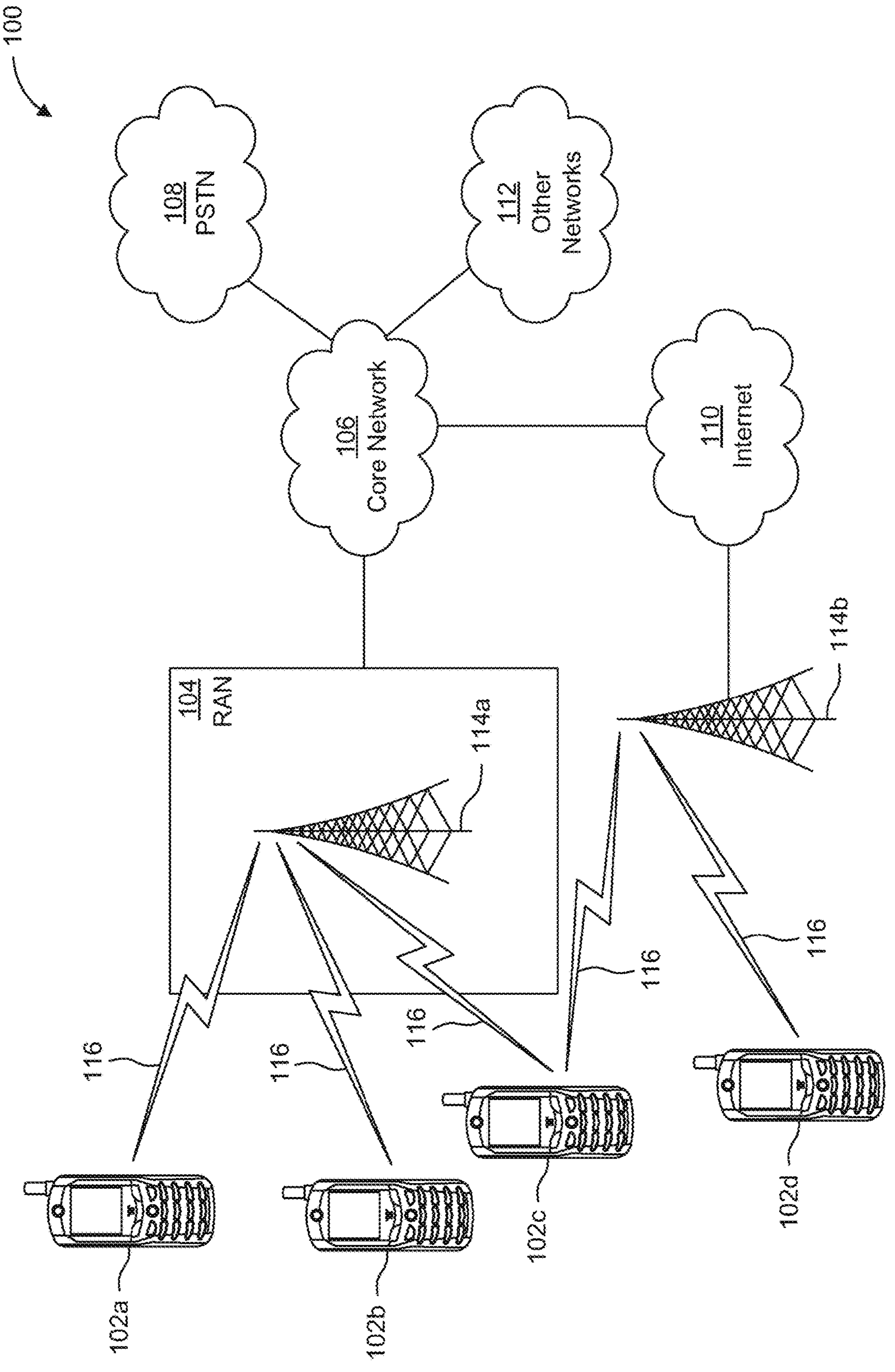
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
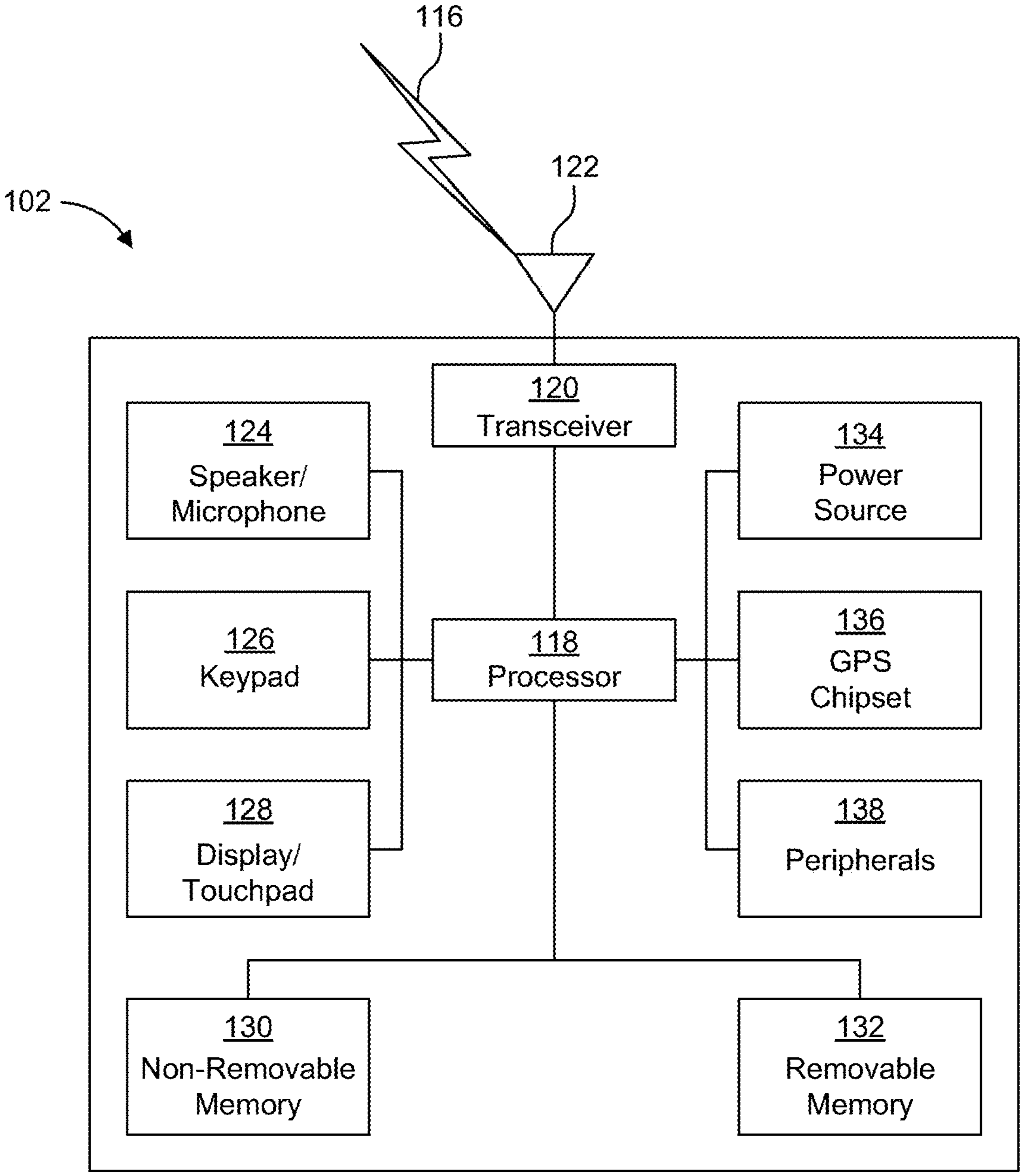
FIG. 1B is a system diagram illustrating an example wireless transmit/receive unit (WTRU) that may be used within the communications system illustrated in FIG. TA.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
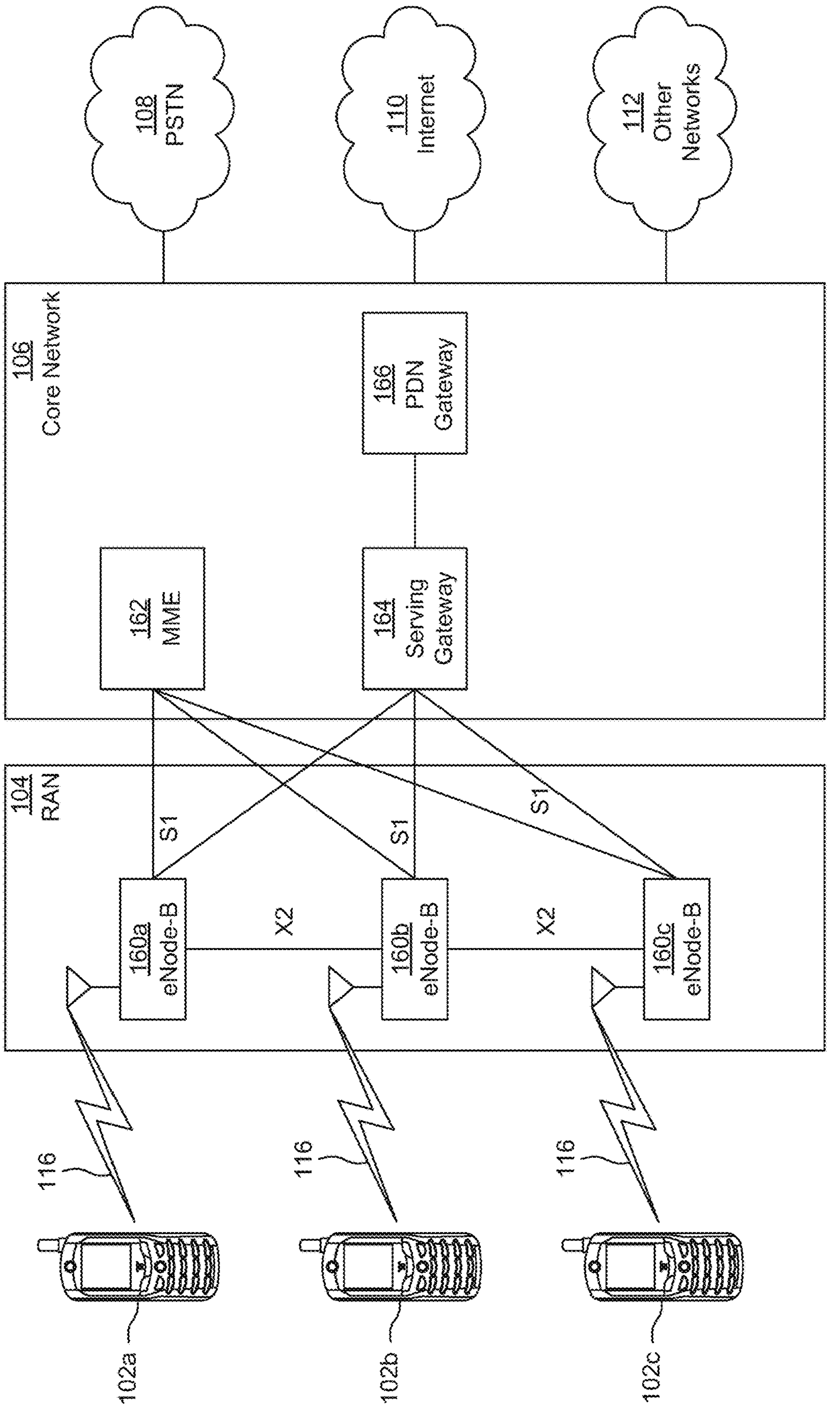
FIG. 1C is a system diagram illustrating an example radio access network (RAN) and an example core network (CN) that may be used within the communications system illustrated in FIG. TA.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and conventional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs

102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
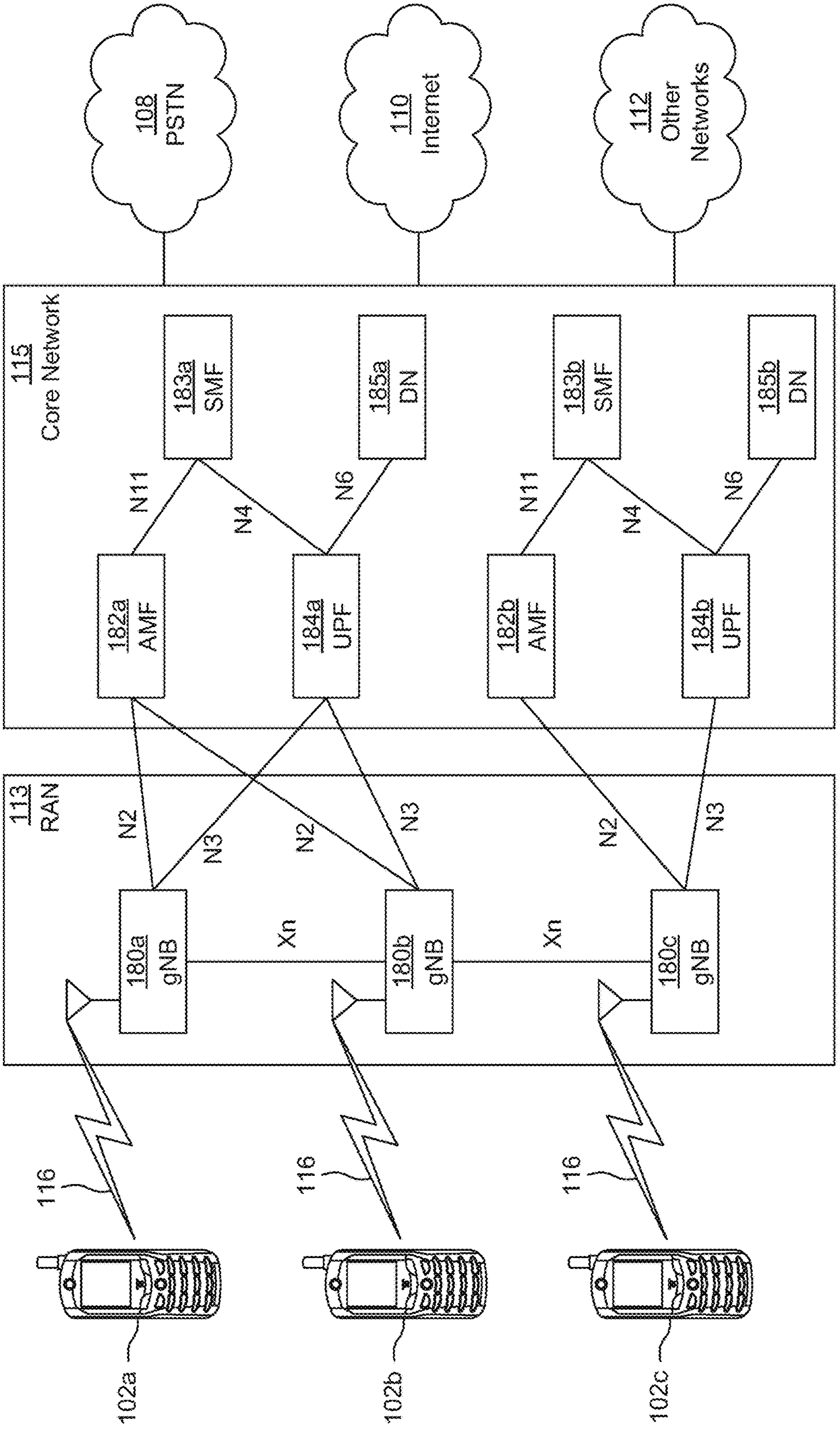
FIG. 1D is a system diagram illustrating a further example RAN and a further example CN that may be used within the communications system illustrated in FIG. TA.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In anon-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-ID, and the corresponding description of FIGS. 1A-ID, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Ultra-Low Power (ULP) Receivers

In state-of-the-art wireless technology such as cellular and WLAN, RF front-ends are usually a mix of passive and active components. For example, passive components include Receive (Rx) antennas, Transmit/Receive (Tx/Rx) path switches and filters. These components require little if any power in order to function. On the other hand, active components require power in order to function. For example, the oscillator to tune to the carrier frequency, the low noise amplifier and the Analog/Digital (A/D) converters in the Rx path are active components.

Advances in RF component design have made it possible to use a novel type of RF circuitry that can process received RF waveforms which are collected through the antenna front-end by the receiving device in an Ultra-Low Power (ULP) mode with minimal usage, or even absence, of an active power supply. For example, such a device may consider only passive RF components and harvest energy from the received RF waveform to run the necessary circuitry to process signals. Another increasingly popular approach is to use a mixer-first architecture, eliminate the need for an RF low noise amplifier (LNA), and focus on the development of passive RF components. Passive (or almost passive) ULP receivers use RF components such as cascading capacitors, zero-bias Schottky diodes or MEMS to implement the functionality required for voltage multipliers or rectifiers, charge pumps and signal detectors. It is worth considering that those ULP receivers can still operate in the antenna far-fieid and may support reasonable link budgets.

Those novel ULP receivers can perform basic signal detection such as correlation for a known signature waveform and/or reception of low data rate signals. They may also be put into energy harvesting mode by accumulating energy from the RF waveform entering the receiver front-end through the Rx antenna. Link budgets characteristic of small or medium area cellular base stations are supported. For example, ULP receivers can be used as wake-up radios to trigger device internal wake-up and signal interrupts following the detection of wake-up signaling which then prompts the main modem receiver using active RF components to start up.

In the following, the term 'RRC' is used. The Radio Resource Control (RRC) protocol is used in UMTS, LTE and 5G on the Air interface. It is a layer 3 (Network Layer) protocol used between WTRU and Base Station. This protocol is specified by 3GPP. RRC messages are transported via the PDCP-Protocol. The major functions of the RRC protocol include connection establishment and release functions, broadcast of system information, radio bearer establishment, re-configuration and release, RRC connection mobility procedures, paging notification and release and outer loop power control. By means of the signalling functions the RRC configures the user and control planes according to the network status and allows for Radio Resource Management strategies to be implemented. The operation of the RRC is guided by a state machine which defines certain specific states that a WTRU may be present in. The different states in this state machine have different amounts of radio resources associated with them and these are the resources that the WTRU may use when it is present in a given specific state. Since different amounts of resources are available at different states the quality of the service that the user experiences and the energy consumption of the WTRU are influenced by this state machine. The RRC idle mode (no connection) has the lowest energy consumption. In RRC inactive state, latency is minimized as and signalling load is reduced. Transitions from RRC Inactive to Connected is very quick as WTRU context is stored at the network node (gNB) and at the WTRU.

The reduction in device power consumption is considerable when ULP receivers are used. A typical cellular 3G, 4G or 5G modem transceiver may easily require up to a few hundred mWs in order to demodulate and process received signals during active reception such as in RRC_CONNECTED mode. Power consumption scales with the number of RF front-end chains active on the device, the channel bandwidth used for reception and the received data rate. When the device is in RRC_IDLE mode with no data being received or transmitted, cellular radio power saving protocols such as (enhanced) Discontinuous Reception mechanism ((e)DRX) ensure that the receiver only needs to be powered on a few times per second at most. Typically, the device then performs tasks such as measuring the received signal strength of the serving and/or neighbor cells for the purpose of cell (re-)selection procedures and reception of paging channels. In addition, the device performs Automatic Frequency Control (AFC) and channel estimation in support of coherent demodulation. Device power consumption when in RRC_IDLE is in the order of several mWs. In Release 15 enhanced Machine Type Communication (eMTC) and Narrowband Internet of Things (NB-IoT), sequence detection circuitry for processing of in-band wake-up signals in RRC_IDLE mode may also be implemented in the form of a dedicated wake-up receiver. This allows to power down the A/D converters and significant parts of the digital baseband processor. However, several active components in the RF front-end such as low-noise amplifiers and oscillators are still used where the LNA power consumption is usually in the milliwatt range. On the other hand, ULP receivers can reduce device's power consumption in RRC_IDLE to about or below 1 mW by removing the RF LNA and having power consumption dominated by only the local oscillator.

Figure 2A:
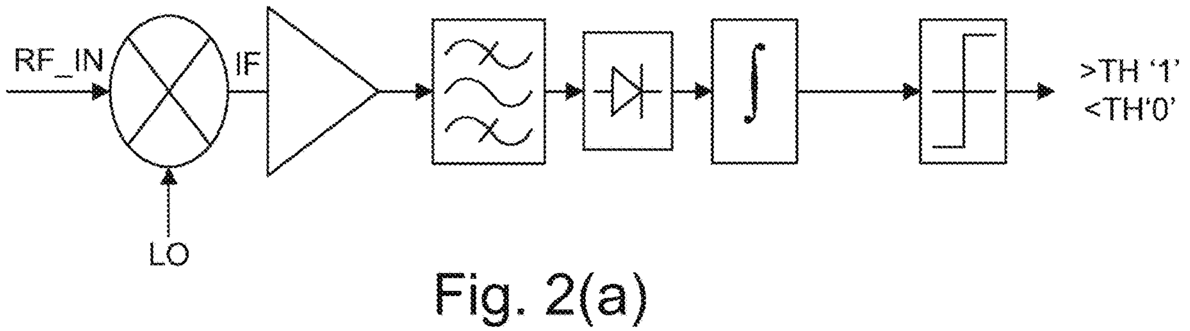
FIG. 2 is a block diagram of an ED-based mixer-first receiver for (a) OOK and for (b) FSK.
Figure 2B:
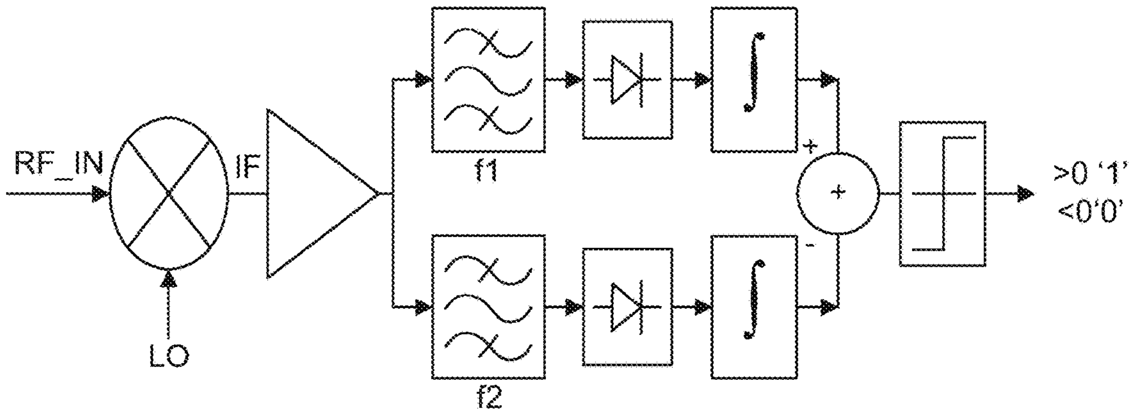
Figure 3:
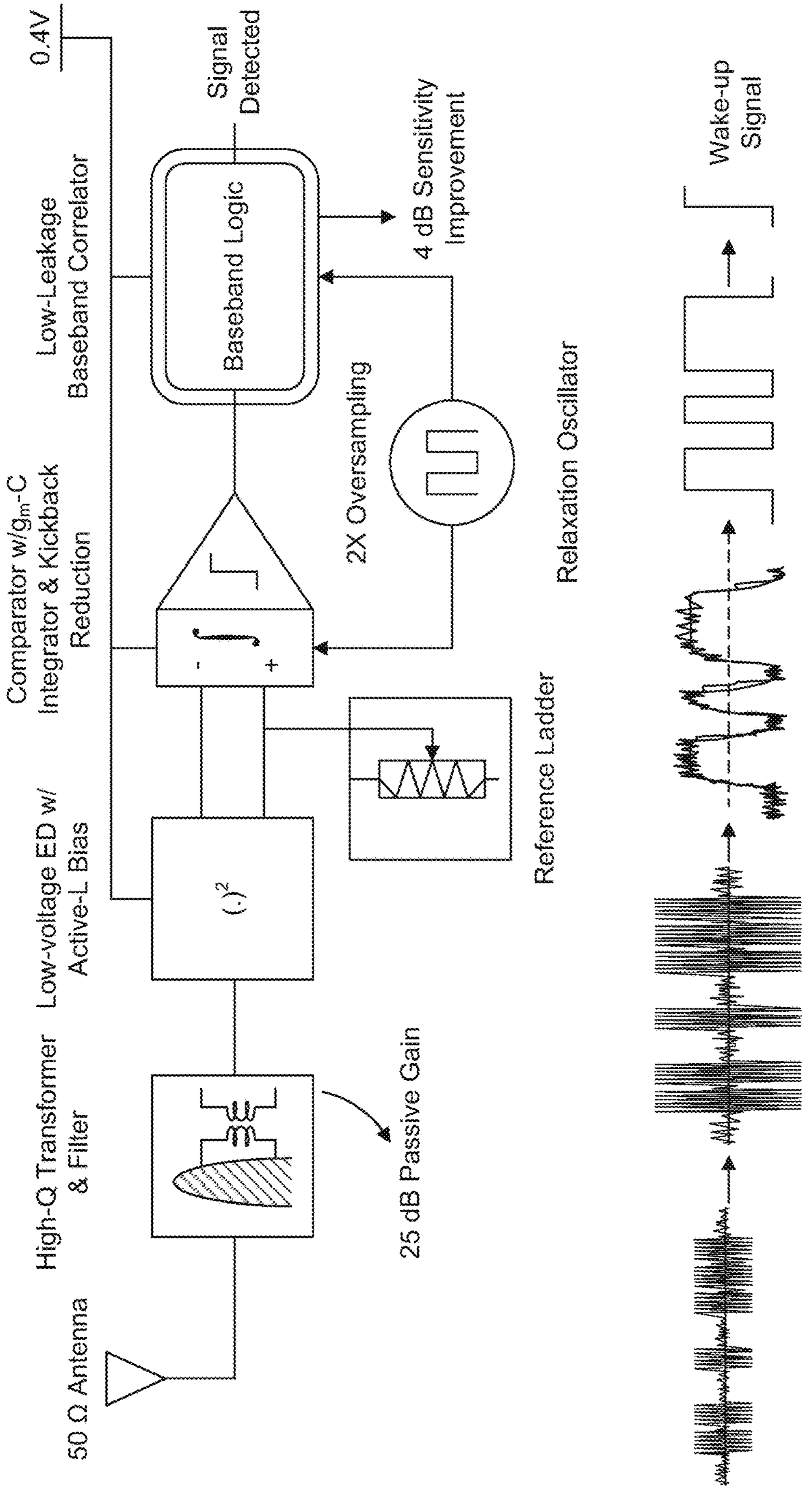
FIG. 3 is a block diagram of a ULP receiver with an all-passive Radio-Frequency (RF) front end.

Two types of modulation schemes, On-Off Keying (OOK) and Frequency-Shift Keying (FSK), are the most commonly used in ULP receivers with OOK being the most attractive when designing ULP radios due to its simplicity. Simplified block diagrams for e.g., mixer-first energy detection (ED) based OOK and FSK radios are shown in FIGS. 2*a* and 2*b*. Whereas a simplified block diagram for a ULP receiver with an all-passive RF front-end is shown in FIG. 3.

IDLE Mode Operations in 3GPP

WTRUs implementing either one or a combination of 2G, 3G, 4G and/or 5G RATs perform Public Land Mobile Network (PLMN) selection, cell selection/re-selection and location registration procedures while in RRC_IDLE mode. Depending on capabilities, some devices may also support manual Closed Subscriber Group (CSG) selection or Multimedia Broadcast Multicast Services (MBMS) frequency prioritization in RRC_IDLE mode. 5G devices may support RAN-based Notification Area (RNA) updates and operation in RRC_INACTIVE state.

When a WTRU is switched on, a PLMN is selected by the WTRU. For the selected PLMN, associated RAT(s) may be set. With cell selection, the WTRU searches for a suitable cell of the selected PLMN, chooses that cell to provide available services, and monitors its control channel. The WTRU may register its presence by means of a NAS registration procedure in the tracking area of the chosen cell.

While in RRC_IDLE, a WTRU performs received signal strength measurements on serving and/or neighbor cells. If the WTRU finds a more suitable cell according to the cell reselection criteria, it reselects onto that cell and camps on it. If this new cell does not belong to at least one tracking area to which the WTRU is registered, location registration is performed. The WTRU may also search for higher priority PLMNs at regular time intervals and search for a suitable cell if another PLMN has been selected by its NAS.

If a WTRU loses coverage of the registered PLMN, either a new PLMN is selected automatically or an indication of available PLMNs is given to the user so that a manual selection can be performed. Various means of control exist for the network to prioritize cell selection onto certain RATs, to control the rate at which low, medium or high mobility WTRUs perform cell re-selection and to bar selected tracking areas from re-selection by WTRUs.

When the WTRU camps on a cell in RRC_IDLE state or in RRC_INACTIVE state, it may receive system information from the PLMN, it may establish an RRC connection or resume a suspended RRC connection and it may receive Earthquake and Tsunami Warning System (ETWS) or Commercial Mobile Alert System (CMAS) notifications. Moreover, if the network needs to send a control message or deliver data to a registered WTRU, it knows in most cases the set of tracking areas in which the WTRU is camped. A paging message can then be sent for the WTRU on the control channels of all the cells in the corresponding set of areas. The WTRU will then receive the paging message and can respond.

IDLE/INACTIVE Mode Paging in 3GPP

The WTRU may use DRX or Paging Cycle (PC) in RRC_IDLE and RRC_INACTIVE state in order to reduce power consumption. Ideally, WTRUs in RRC_IDLE and RRC_INACTIVE modes should be deep sleeping (i.e., shutting down their transceiver ends) as long as there is not incoming traffic for them. However, for those WTRUs to get noted/aware of incoming downlink payload, the network configures idle/inactive WTRUs with a periodic set of occasions within certain (set of) frames, where idle and inactive WTRU should periodically wake up, monitor, and determine if there is a paging indication.

Specifically, in RRC IDLE/INACTIVE modes, WTRUs are continuously waking up, according to the configured paging cycle, in order to check if a single/multiple WTRUs are being paged in the current paging occasion. Therefore, WTRUs follow those three steps before transitioning to RRC CONNECTED state for getting paged as follows:

1) As WTRUs may be out of sync with the radio interface, due to the long sleep period, WTRUs first attempt re-synching with the NR radio interface by detecting at least a single synchronization signal block (SSB). Different WTRUs, with different implementations (from various WTRU vendors) require a different number of SSBs/radio sequences before they get in full sync with the network. For instance, WTRUs in good signal-to-interference-noise-ratio (SINR) conditions may be able to re-sync with the radio network by detecting a single SSB/sequence signal; although, WTRUs in poor SINR conditions may require additional SSB instances.
2) After WTRUs are in full sync with the RAN, WTRUs attempt to blindly decode the paging downlink control information (DCI), sent on the possible physical downlink control channel (PDCCH) occasions (pre-configured by higher layers). The paging DCI implies an indication to the idle/inactive WTRUs that there is at least a single WTRU with incoming traffic in the downlink direction. In case there is NO paging DCI detected over the PDCCH resources, idle/inactive WTRUs assume that there is no paging in the current paging opportunity, and hence, continue sleeping until the next paging occasion.
3) If idle/inactive WTRUs detect the presence of the paging DCI, in the paging occasion, they decode the subsequent Physical Downlink Shared Channel (PDSCH) data resources to read the paging record. The paging record is an indication of the ID or IDs of the idle/inactive WTRU(s) that is (are) getting paged. From the WTRU perspective, if the paging record contains its own temporary ID, the corresponding WTRU triggers the random-access procedure in order to switch to the RRC CONNECTED state.

A Paging Occasion (PO) is a set of PDCCH monitoring occasions (PMOs) and can consist of multiple time slots (e.g., subframe or OFDM symbol) where paging DCI (DCI 1_0 scrambled with P-RNTI) can be sent. In multi-beam operations, a WTRU assumes that the same paging message is repeated in all transmitted beams, to support that, in each PO, one or more PMOs are associated with one SSB, and a PO can consist of multiple PMOs associated with different SSBs supported by a gNB. The selection of the beam(s) for the reception of the paging message is up to WTRU implementation.

A Paging cycle (PC)/Discontinuous Reception (DRX) cycle is the number of radio frames in the cycle where a WTRU periodically monitors for a page. These can be configured as cell-specific as well as WTRU-specific paging cycles.

In each paging cycle, the same PO can be monitored by a group of WTRUs depending on their static or temporary WTRU-ID. Such group is called a paging group (PG), which can be defined as a group of WTRUs monitoring the same POs in the same Paging Frames (PFs). One Paging Frame is one Radio Frame, which may contain one or multiple POs or starting point of a PO.

In IDLE/INACTIVE Mode, the specific Paging Frame (PF) and subframe within that PF, for example, the PO that a WTRU may monitor for the paging may be determined based on the WTRU ID (e.g., WTRU_ID) and parameters which may be specified by the network. The parameters may include the PC length (e.g., in frames) which may be the same as a DRX cycle and another parameter which together may enable the determination of the number of PF per PC and the number of PO per PF which may be in the cell. From the network perspective, there may be multiple PFs per PC and multiple POs within a PF, for example, more than one subframe per PC may carry PDCCH masked with a P-RNTI. Additionally, from the WTRU perspective, a WTRU may monitor a PO per paging cycle, and such a PO may be determined based on the parameters specified herein (e.g., above), which may be provided to the WTRU via system information, dedicated signaling information, and the like.

The WTRU may determine the PF and PO for paging by using the following formulae:

System Frame Number (SFN) for the Paging Frame (PF) is determined by:

$$(SFN + \text{PF\_offset}) \bmod T = (T \; div \; N) * (\text{WTRU\_ID} \bmod N);$$

Index (i_s), indicating the index of the PO is determined by:

$$\text{i\_s} = \text{floor}(\text{WTRU\_ID}/N) \bmod Ns;$$

Where:

T: DRX cycle of the WTRU (T is determined by the shortest of the WTRU specific DRX value(s), if configured by RRC and/or upper layers, and a default DRX value broadcast in system information. In RRC_IDLE state, if WTRU specific DRX is not configured by upper layers, the default value is applied).;

N: number of total paging frames in T;

Ns: number of paging occasions for a PF;

PF_offset: offset used for PF determination;

WTRU_ID: 5G-S-TMSI mod 1024.

The PMOs for paging are determined according to configured parameters pagingSearchSpace and firstPDCCH-MonitoringOccasionOfPO and nrofPDCCH-MonitoringOccasionPerSSB-InPO if configured as specified in 3GPP TS 38.331. When SearchSpaceId=0 is configured for pagingSearchSpace, the PDCCH monitoring occasions for paging are same as for RMSI.

When SearchSpaceId other than 0 is configured for pagingSearchSpace, the WTRU may assume that each PO is a set of 'S*X' consecutive PMOs where 'S' is the number of actual transmitted SSBs determined according to ssb-PositionsInBurst in SIB1 and X is the nrofPDCCH-MonitoringOccasionPerSSB-InPO if configured or is equal to 1 otherwise. The [x*S+K]th PMO for paging in the PO corresponds to the Kth transmitted SSB, where x=0, 1, . . . , X−1, K=1, 2, . . . , S. The PMOs for paging which do not overlap with UL symbols (determined according to tdd-UL-DL-ConfigurationCommon) are sequentially numbered from zero starting from the first PMO for paging in the PF. When firstPDCCH-MonitoringOccasionOfPO is present, the starting PMO number of (is +1)th PO is the (is +1)th value of the firstPDCCH-MonitoringOccasionOfPO parameter; otherwise, it is equal to i_s*S*X. If X>1, when the WTRU detects a PDCCH transmission addressed to P-RNTI within its PO, the WTRU is not required to monitor the subsequent PDCCH monitoring occasions for this PO.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331. The parameter first-PDCCH-MonitoringOccasionOfPO is signaled in SIB1 for paging in initial DL bandwidth part (BWP). For paging in a DL BWP other than the initial DL BWP, the parameter first-PDCCH-MonitoringOccasionOfPO is signaled in the corresponding BWP configuration. If the WTRU has no 5G-S-TMSI, for instance when the WTRU has not yet registered onto the network, the WTRU shall use as default identity WTRU_ID=0 in the PF and i_s formulas above. 5G-S-TMSI is a 48-bit long bit string. 5G-S-TMSI shall in the formulae above be interpreted as a binary number where the left most bit represents the most significant bit.

In each of its PO, the WTRU monitors PMO(s) for the PDCCH for DL assignments on the PDCCH masked (e.g., DCI 1_0) with a P-RNTI (Paging RNTI) in IDLE/INACTIVE Mode. Such DL assignment may contain Short Message (used to indicate system information modification, ETWS/SMAS indication, or/and indication of stop monitoring the current PO), or/and scheduling/resource allocation information for Paging Channel (PCH) carried on a PDSCH. A PDSCH which may carry PCH may be referred to as a PCH PDSCH or Paging message over PDSCH.

DL assignment on the PDCCH is same for both IDLE mode paging (called CN initiated paging) and INACTIVE mode paging (called RAN initiated paging). In case when the WTRU detects a DL assignment using the P-RNTI and finds that it contains the scheduling information for paging message over the PDSCH, the WTRU may demodulate the assigned PDSCH RBs and may decode the paging message carried on that PDSCH. The paging message contains paging record which contains WTRU-IDs of the WTRUs which are being paged. If the WTRU is in RRC IDLE state and finds its WTRU-ID in the paging record equivalent to its 5G-S-TMSI (i.e., CN-initiated Paging), it forwards the WTRU-ID to the upper layer (e.g., NAS) which may further initiate the process of RRC connection establishment. If the WTRU is in RRC INACTIVE state and finds its WTRU-ID in the paging record equivalent to its full-RNTI (i.e., RAN-initiated Paging), the WTRU initiates the RRC connection resume procedure. If the WTRU is in RRC INACTIVE state and finds its WTRU-ID in the paging record equivalent to 5G-S-TMSI (i.e., CN-initiated Paging), it moves to RRC IDLE state and informs NAS. If the WTRU does not find its WTRU-ID, it goes to sleep/power-saving mode.

In case when the WTRU detects a DL assignment using the P-RNTI containing a Short Message of System Information update, the WTRU applies the system information acquisition procedure defined. If the Stop Paging Monitoring indication is enabled in the Short Message, the WTRU stops monitoring PMOs for paging in the current PO. If the WTRU is ETWS/CMAS capable, and the ETWS/CMAS Indication is enabled in the Short Message, the WTRU acquires the related system information block configured by the network.

Overview

WTRUs spend most of their time in RRC IDLE state and therefore power consumption associated with IDLE mode operation dominate the WTRU's battery life. In IDLE/INACTIVE modes, a WTRU must monitor the Paging Occasions (POs) to determine presence of network events, initiate RRC Connection Establishment/Resume procedure, and transition to RRC Connected state. The WTRU may use Discontinuous Reception (DRX) in order to reduce power consumption, creating a clear trade-off between latency and battery life. Unlike existing state-of-the-art devices, a WTRU implementing an Ultra-Low Power (ULP), e.g., passive or semi-passive, receiver can benefit from near zero power consumption when it is not actively performing transmission or high data rate reception for the purpose of either exchanging data or large amount of control signaling with the network. Therefore, such WTRUs can break the latency versus battery life trade-off by enabling the ULP receiver to continuously monitor the POs in IDLE or INACTIVE states without a significant impact on the WTRUs' battery life. A Zero-Energy (ZE) receiver that considers energy harvesting to compensate for its power consumption has been considered for IDLE mode operations support. However, this disclosure is focused on integrating the ULP receiver into 3GPP systems to support energy-efficient and low-latency or on-demand IDLE/INACTIVE mode Paging.

Definitions

Here are defined some of the terminology used throughout the present disclosure.

DRX cycle and Paging Cycle: may be used interchangeably herein to denote the RRC_IDLE or RRC_INACTIVE mode DRX cycle.

Cell and gNB: may be used interchangeably.

PCH PDSCH and Paging message over PDSCH: may be used interchangeably.

SSB and beam: may be used interchangeably herein. SSB and beam may be used interchangeably to represent a specific setting of spatial Tx parameters a gNB uses to perform a DL paging related (DCI scrambled with P-RNTI, paging message over PDSCH) transmission. A different setting of spatial Tx parameters at the gNB would be represented by a different (e.g., another) beam or SSB.

LP-PDCCH: low-power physical downlink control channel is a newly defined physical channel that can carry control signals, e.g., wake-up signals and/or paging downlink control information (DCI), with characteristics that are specific to ULP receivers.

LP-PDSCH: low-power physical downlink shared channel is a newly defined physical channel that can carry information signals, e.g., paging messages, with characteristics that are specific to ULP receivers.

LP-WUS: low-power wake-up signal is used to wake up WTRUs supporting ULP receiver's signal characteristics, e.g., modulation, coding, and waveform, and may be used to convey control information, e.g., Paging Occasions (POs) configuration.

LP-SS: low-power synchronization signal is used to synchronize the ULP receiver, which is structured according to ULP receivers' signal characteristics, and may convey system related information, e.g., cell identifier (ID).

LP-PO: low-power paging occasion defines the resources that are used to signal the paging DCI for a WTRU that is equipped with a ULP receiver, as well as the ULP-specific signal characteristics, e.g., modulation and coding scheme, and waveform.

DC-Rx: a duty-cycled non-ULP conventional receiver that is configured with either a short duty cycle for ULP-Paging-Indication support and/or a legacy/long duty cycle for fallback paging reception operation.

OD-PMC-Rx: an on-demand, paging monitoring configured, non-ULP conventional receiver that is configured/signaled with an on-demand paging monitoring configuration for a pre-specified/signaled duration. It may also be configured with a legacy/long duty cycle for fallback paging reception operation.

Figure 4:
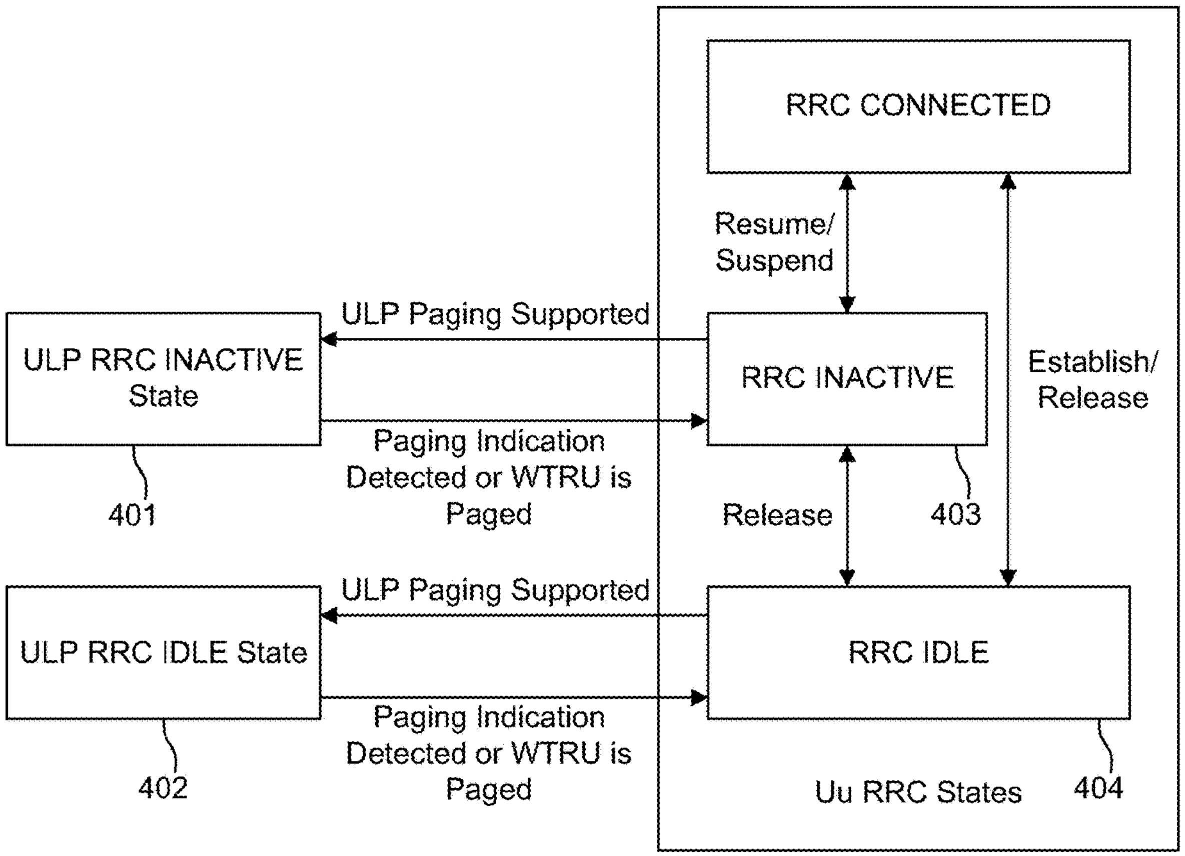
FIG. 4 illustrates states of a WTRU, according to an embodiment, in ULP capable networks with exemplary transitions.

ULP RRC IDLE/INACTIVE state: an RRC state that governs WTRU's behavior in IDLE/INACTIVE state using the ULP receiver, example shown in FIG. 4, see ULP RRC INACTIVE state 401 and ULP RRC IDLE state 402. Throughout the present disclosure and despite the explicit representation of the additional RRC states 401 and 402 in FIG. 4 that are in addition to the RRC IDLE/INACTIVE states 403, 404, using the ULP RRC IDLE/INACTIVE state terminology does not have to imply the definition of new RRC states, but can rather be used to ease understanding and refer to WTRU's utilization and/or monitoring of ULP-specific physical signals and channels such as any of the LP-SS, LP-WUS, LP-PDCCH, and LP-PDSCH defined above.

Uu RRC IDLE/INACTIVE state: a legacy/conventional RRC state that governs WTRU's behavior in IDLE/INACTIVE state using the conventional/legacy receiver, example shown in FIG. 4, Uu RRC INACTIVE state 403 and Uu RRC IDLE state 404. The term 'Uu' is used to indicate the interface between a WTRU and the RAN, and is also called 'air interface'. Throughout the present disclosure, using the Uu RRC IDLE/INACTIVE state terminology does not have to imply separate (ULP/Uu) RRC states, but can rather be used to ease understanding and refer to WTRU's utilization and/or monitoring of legacy/conventional physical signals and channels such as any of the PSS/SSS, WUS/MWUS, PDCCH, and the PDSCH.

Uu/ULP cell: a Uu or a ULP cell may indicate separate physical or logical entities which eventually lead to different operational states, e.g., a legacy Uu RRC IDLE state and a ULP RRC IDLE state, or different WTRU's behavior in terms of the type of physical signals and channels that are utilized and/or monitored.

Figure 5:
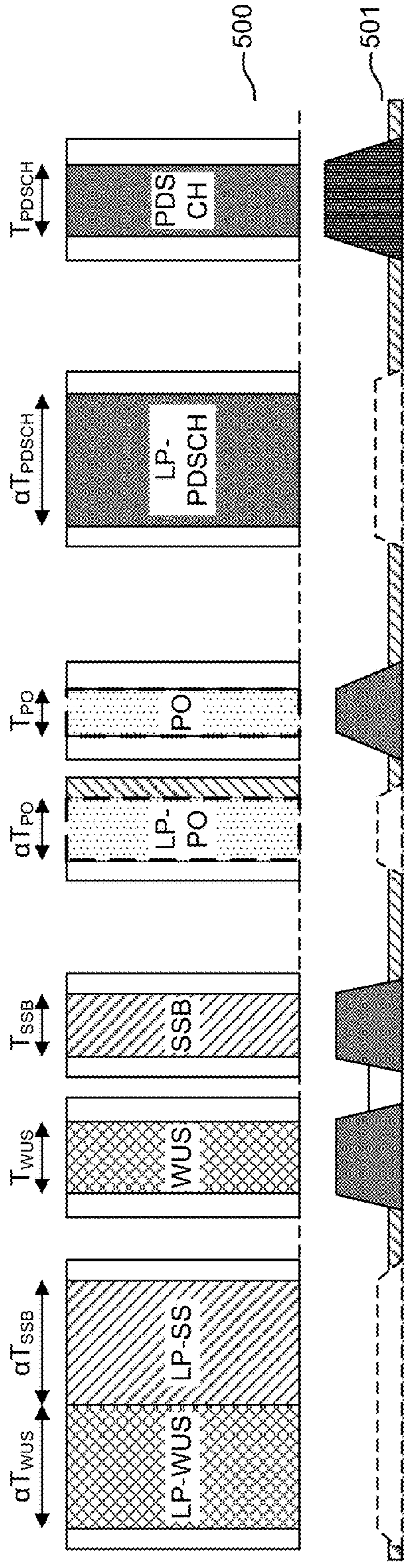
FIG. 5 illustrates ULP specific channels and associated power consumption profile according to an embodiment.

The consideration of a ULP receiver to be integrated into 3GPP system requires the incorporation and support of additional new modulation and coding schemes, e.g., OOK, FSK, and Manchester coding. This implies the need to either develop a completely new supplementary air-interface or the introduction of new physical channels that are specific to ULP receivers. In this disclosure, are explored the procedural impacts on paging reception due to the integration of ULP receivers into 3GPP systems to reduce latency and/or save power consumption in IDLE and/or INACTIVE states. Therefore, Paging solutions and procedures are developed in this disclosure that can address both the power consumption reduction (energy-efficient solutions) and/or Paging latency reduction (including e.g., On-demand Paging) aspects in Section "ULP-based Paging Procedures". Whereas variant paging configurations that can be used to weigh one aspect or the other are detailed in "ULP-based Paging Configurations Variants". In FIG. 5 are shown the different signals and channels 500 that may be considered in a ULP capable network along with an exemplary power consumption profile 501. In this figure, the value $\alpha \geq 1$ is a time expansion factor for ULP signals/channels compared to legacy signals/channels due to the potential difference in supported modulation type/order, transmission rates, and coding schemes.

ULP-Based Paging Procedures

This section discusses opportunities related to enabling paging of a ULP receiver with the purpose of either improving device's energy efficiency, i.e., reduction of overall power consumption associated with paging procedure, and/or enabling reduction in paging latency compared to legacy paging procedure. For any of the addressed ULP-based paging purposes, paging performance in terms of reliability is not impacted. Two main solution categories are explored; one without WTRU's feedback support, which puts the burden on the network in terms of resource utilization, and another with WTRU's feedback support, which shares the burden between the WTRU and the network. The feedback may be provided using conventional transmissions of the Uu air interface or via new low power air interface, e.g., using backscattering techniques. In IDLE state, the network is unaware of the WTRU's location, i.e., unaware of which cell within the tracking area is currently selected by the WTRU. Therefore, if the network enables ULP-specific paging support, it has to provide the ULP-specific paging signals/messages over all the cells within the tracking area where the WTRU might be. If there is however feedback from the WTRU, the network might be able to limit which cells within the tracking area will need to support this functionality. Also covered here are scenarios when the WTRU can be uniquely addressed by a LP-WUS or a paging DCI (or equivalent, e.g., a second level of wake-up signaling or a paging sequence) without the need of paging message/record decoding.

ULP-Based Paging Procedures: Group-Specific WUS or Paging DCI without Feedback

Here are explored the ULP-based paging solutions without WTRU's feedback support. In this category, when ULP is enabled within a cell, set of cells, or in the network, the network must support wake-up signaling and/or paging DCI and/or paging message transmissions with signal characteristics that are suitable for both ULP and conventional receivers, either simultaneously or sequentially. This support implies an additional burden on the network in terms of network resource utilization, especially when ULP and conventional receivers' signals are simultaneously supported, because the network might be unaware of whether the WTRU is currently using the ULP or the conventional receiver to receive paging signaling/messages. So, the network might decide to simultaneously signal/page the WTRU using both legacy and ULP-specific signals/messages, which can be an additional overhead on the network side from a resource utilization point of view. However, this will help the WTRU in power saving because it won't be required to periodically send feedback to the network for state synchronization.

According to a first embodiment, a WTRU utilizes the ULP receiver for LP-WUS detection and the conventional receiver to determine if it is being paged. In a first step, the WTRU determines support, by the network, of ULP paging (e.g., in the form of presence of an LP-WUS transmission) within any of current serving cell and a set of cells in, e.g., a notification or tracking area. For example, the support of ULP paging by the network can be determined based on a ULP-specific information element(s) in a system information block, or it can be signaled in any of an RRC message, e.g., RRC Release or RRC Suspend messages, and NAS message, e.g., Registration Accept messages. Additionally, the WTRU may report its ULP receiver capability and receive paging monitoring configuration/parameters in any of system information, RRC, and NAS messages including any of the following:

- Support of LP-WUS transmissions targeting ULP capable WTRUs;
- LP-WUS configuration as any of sequence-based/DCI-based, group identifiers, and monitoring periodicity, e.g., duty-cycled or continuous;
- LP-SS configuration in case of duty-cycled monitoring operation, e.g., sequence structure, potential sequences, and periodicity;
- Legacy PO transmission configuration such as paging search space, periodicity, and/or relationship to LP-WUS (e.g., a time offset from a detected LP-WUS). The PO search space may constitute a set of frequency resources defined in terms of, e.g., control channel elements (CCE), resource element groups (REG), and/or aggregation level, and a set/duration of time resources defined in terms of OFDM symbols.

The WTRU then, in a second step, operates in a ULP RRC IDLE state and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network.

It is worth noting that the WTRU does not have to transition to a separate ULP RRC IDLE state but can switch to monitoring the LP-WUS transmissions using the ULP receiver within the same RRC IDLE state. Additionally, and in an alternative to the second step, the WTRU may determine inability to utilize and monitor ULP-specific physical signals and channels based on specific conditions and the supported configuration by the serving cell or set of cells identified by the network, e.g., the WTRU determining a received LP-SS signal strength below a specified/signaled threshold.

Upon detection of a LP-WUS, the WTRU transitions to Uu RRC IDLE state within a maximum time duration specified/signaled by the network. Similarly, the WTRU does not have to transition to a separate RRC IDLE state but has to be able to transition to legacy PO/PDCCH channel monitoring within the specified time duration. The maximum time duration may indicate an offset defining the beginning of PO and paging message transmissions with respect to when the LP-WUS is transmitted. In a fourth step, the WTRU utilizes the conventional receiver to decode the paging DCI in a PO and corresponding paging message. On a condition that the WTRU detects its identifier in the paging message, it initiates connection establishment/resume procedure.

According to a second embodiment, a WTRU utilizes the ULP receiver for LP-WUS detection and dynamic determination of presence of LP-PDCCH carrying the paging DCI, where the LP-WUS may be group specific and the paging DCI may contain sub-group identifiers. In a first step, the WTRU determines support of ULP paging (e.g., in the form of presence of LP-WUS transmission and opportunistic availability/transmission of paging DCIs over LP-PDCCH) within any of current serving cell and a set of cells in, e.g., a notification or tracking area. For example, the support can be determined based on a ULP-specific information element(s) in a system information block received, or it can be signaled in any of an RRC message, e.g., RRC Release or RRC Suspend messages, and NAS message, e.g., Registration Accept messages. Additionally, the ULP may report its WTRU ULP capability and receive paging monitoring configuration/parameters in any of system information, RRC, and NAS messages including any of the following:

- Support of any of LP-WUS and LP-PO. Support may be static, or it may be opportunistically enabled by LP-WUS in a dynamic fashion;
- LP-WUS configuration as any of sequence-based/DCI-based, group identifiers, monitoring periodicity, e.g., duty-cycled or continuous, and mapping to paging DCI configuration;
- LP-SS configuration in case of duty-cycled monitoring operation, e.g., sequence structure, potential sequences, and periodicity;
- Paging DCI configuration may be any of LP-PO and legacy PO transmission configuration such as paging search space, periodicity, and/or relationship to LP-WUS (e.g., a time offset from a detected LP-WUS). The LP-PO/PO search space may constitute a set of frequency resources defined in terms of, e.g., control channel elements (CCE), resource element groups (REG), and/or aggregation level, and a set/duration of time resources defined in terms of (OFDM) symbols, slots, and/or frames.

The WTRU then, in a second step, operates in a ULP RRC IDLE state (e.g., switches to ULP physical signals/channels monitoring) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network.

In an alternative to the second step, the WTRU may determine inability to utilize and monitor ULP-specific physical signals and channels based on specific conditions and the supported configuration by the serving cell or set of cells identified by the network, e.g., the WTRU determining a received LP-SS signal strength below a specified/signaled threshold.

Upon detection of a LP-WUS addressed to a configured group (e.g., based on configured group identifiers) and determining presence of a LP-PO opportunity based on the detected LP-WUS, the WTRU utilizes the LP-PO configuration to decode the paging DCI. On a condition that the paging DCI is successfully decoded (and a configured sub-group identifier is detected, if available), the WTRU determines the paging message transmission configuration, e.g., scheduled time and frequency resources and modulation and coding scheme, and transitions to Uu RRC IDLE state (e.g., switches to PDSCH channel monitoring/decoding) within a maximum time duration based on the paging message's scheduling information. Otherwise, the WTRU transitions to Uu RRC IDLE state (e.g., switches to PDCCH/PDSCH channel monitoring and decoding) within a maximum time duration based on the configured/signaled paging DCI's PO configuration of the conventional receiver. In a fifth step, the WTRU utilizes the conventional receiver to decode the corresponding paging message to the decoded LP-PO or PO. On a condition that the WTRU detects its identifier in the paging message, it initiates connection establishment/resume procedure.

Figure 6:
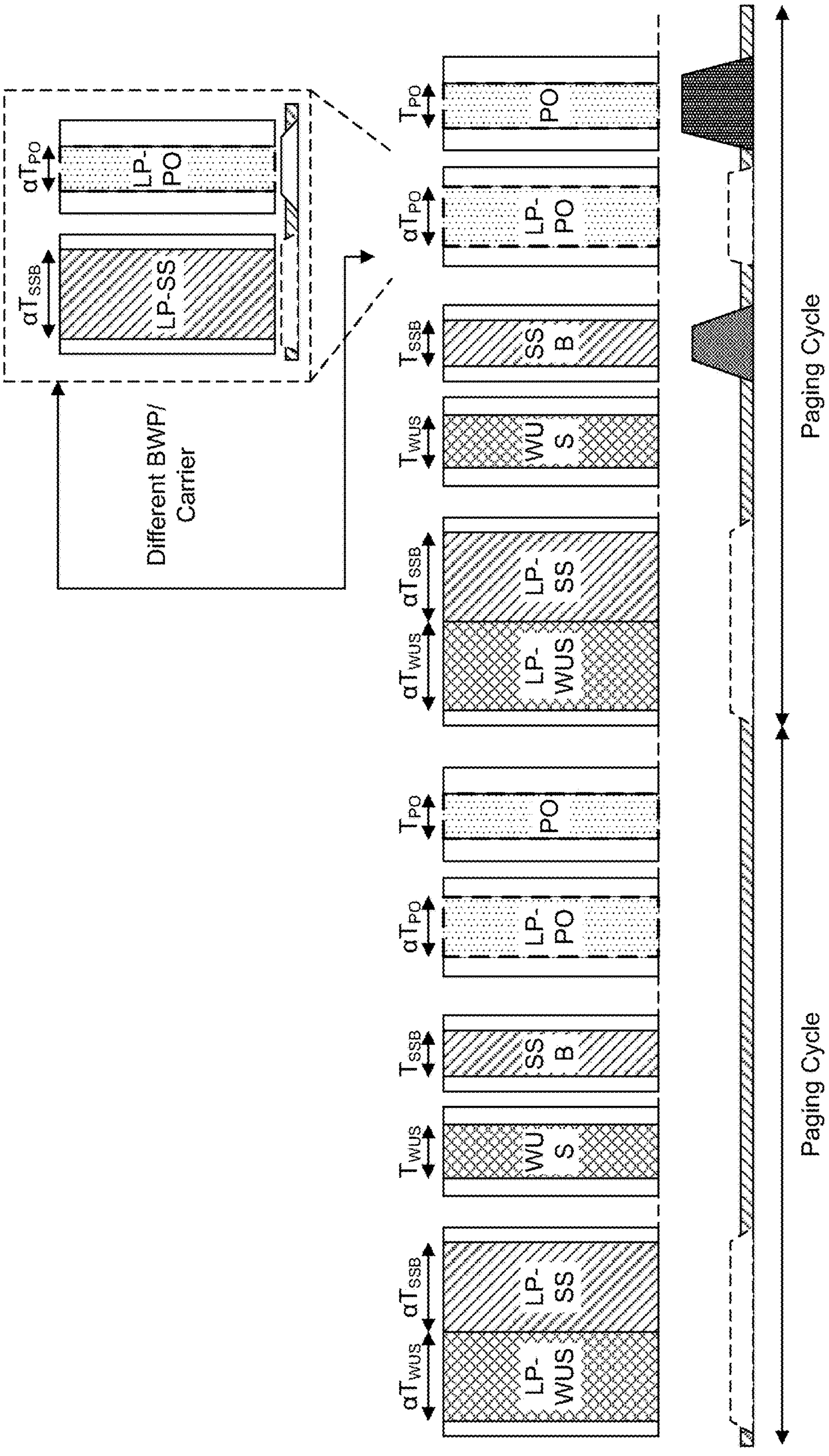
FIG. 6 illustrates a WTRU's successful detection of the LP-WUS but failure to decode the LP-PDCCH channel.
Figure 7:
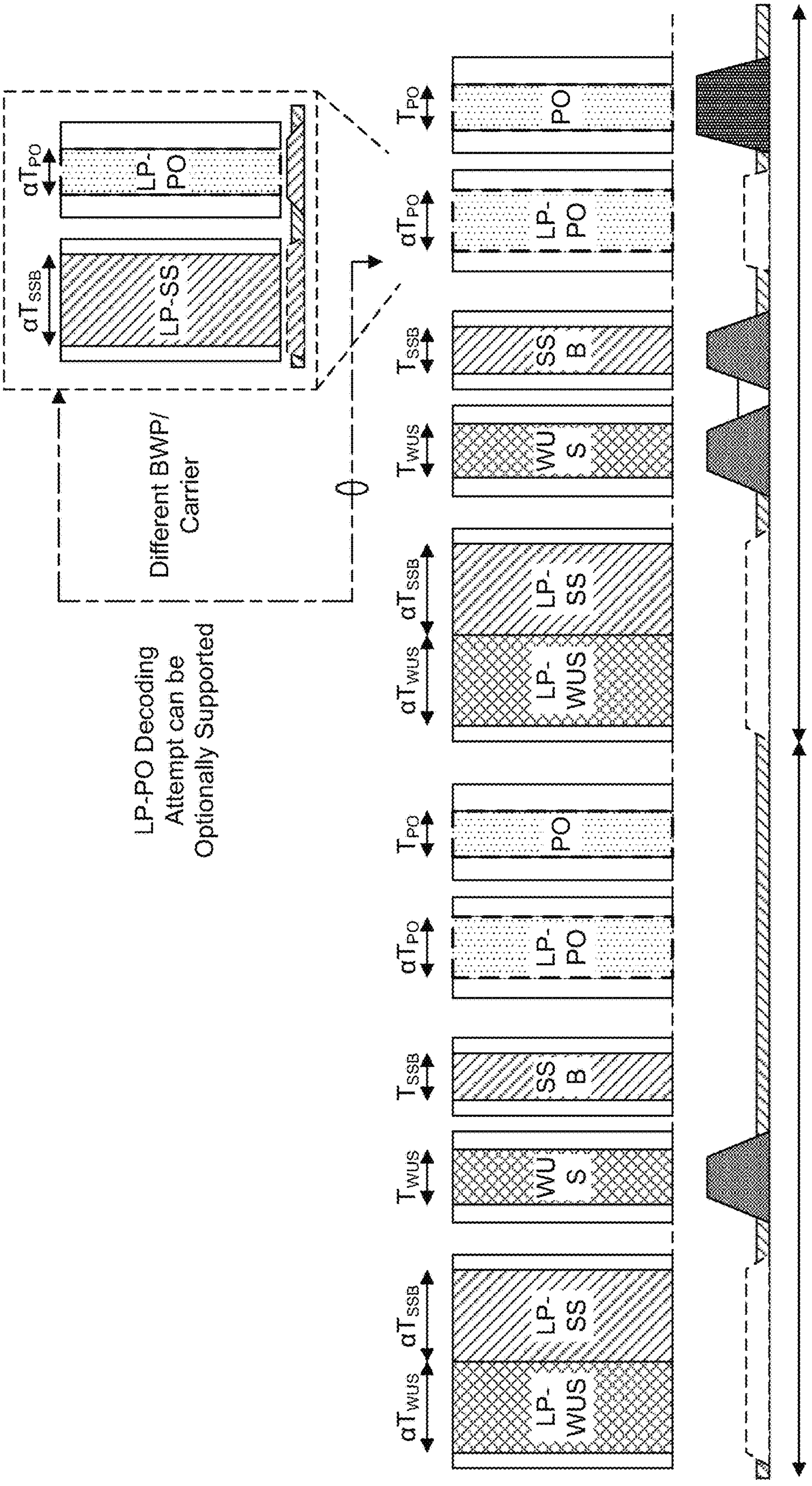
FIG. 7 illustrates a WTRU's failure to detect the LP-WUS and decode the LP-PDCCH channel.
Figure 8:
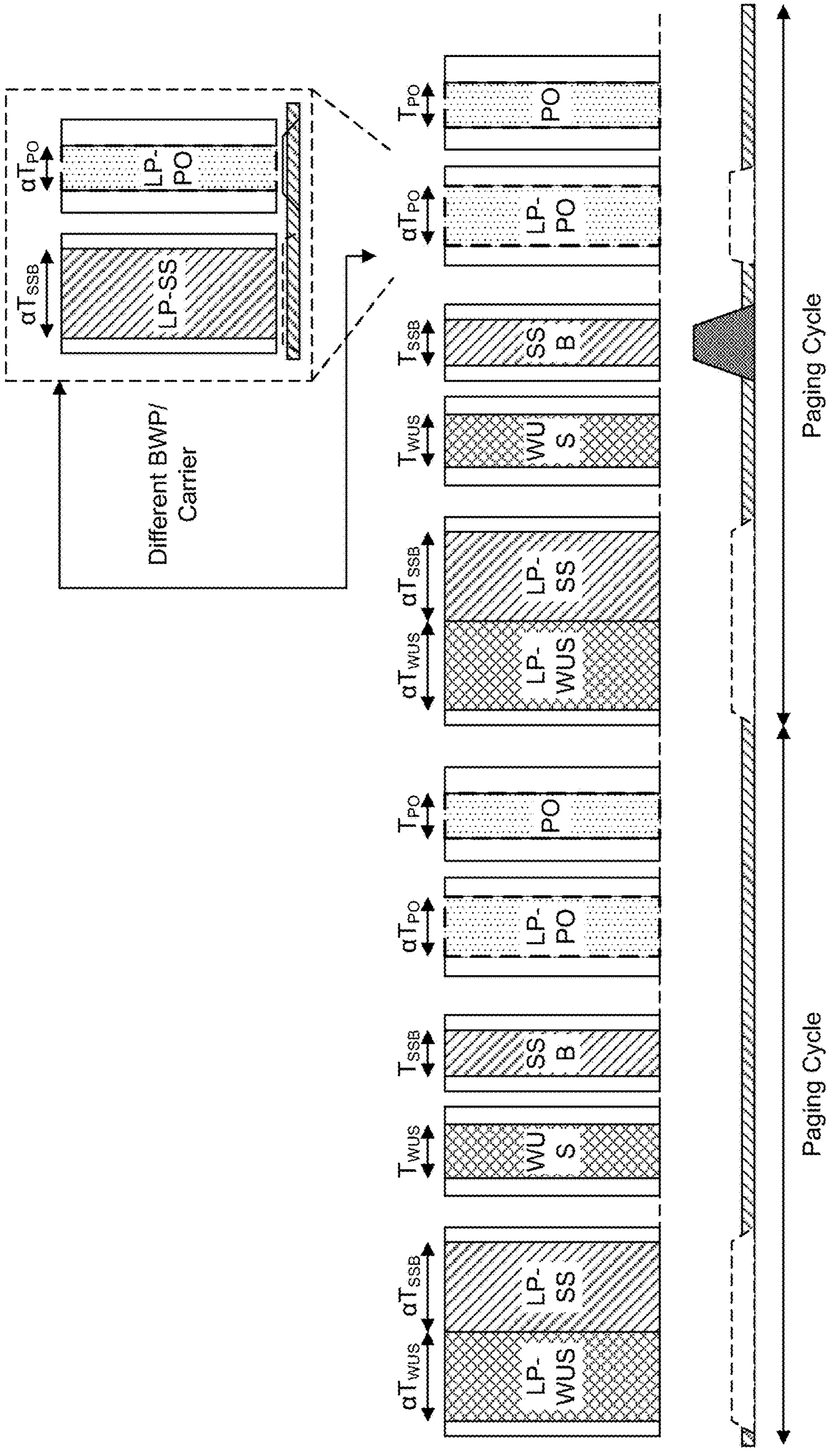
FIG. 8 illustrates a WTRU's successful detection of the LP-WUS and successful decoding of the LP-PDCCH channel.

According to a third embodiment, a WTRU utilizes the ULP receiver for LP-WUS/LP-PO detection/decoding, and dynamically determines the need for Paging Occasion (PO) reception via the conventional receiver, where the LP-WUS may be group specific and the paging DCI (of the LP-PO) may contain sub-group identifiers. An illustrative example is shown in FIGS. 6-8. In a first step, the WTRU determines support, by the network, of ULP paging (e.g., in the form of presence/availability of LP-WUS and paging DCIs over LP-PDCCH transmissions) within any of current serving cell and a set of cells in, e.g., a notification or tracking area. For example, the support can be determined based on an indication or presence of a ULP-specific information element(s) in a system information block received, or it can be signaled in any of an RRC message received, e.g., RRC Release or RRC Suspend messages, and NAS message, e.g., Registration Accept messages. Additionally, the ULP may report its WTRU ULP capability and receive paging monitoring configuration/parameters in any of system information, RRC, and NAS messages including any of the following:

- Support of any of LP-WUS and LP-PO. Support may be static, or it may be opportunistically enabled by LP-WUS in a dynamic fashion.
- LP-WUS configuration as any of sequence-based/DCI-based, group identifiers, monitoring periodicity, e.g., duty-cycled or continuous, and mapping to paging DCI configuration.
- LP-SS configuration in case of duty-cycled monitoring operation, e.g., sequence structure, potential sequences, and periodicity.
- Paging DCI configuration may be any of LP-PO and legacy PO transmission configuration such as paging search space, periodicity, and/or relationship to LP_WUS (e.g., a time offset from a detected LP-WUS). The LP-PO/PO search space may constitute a set of frequency resources defined in terms of, e.g., control channel elements (CCE), resource element groups (REG), and/or aggregation level, and a set/duration of time resources defined in terms of (OFDM) symbols, slots, and/or frames.

The WTRU then, in a second step, operates in a ULP RRC IDLE state (e.g., switches to ULP physical signals/channels monitoring, detection, and decoding) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network.

In an alternative to the second step, the WTRU may determine inability to operate in a ULP RRC IDLE state, e.g., utilize and monitor ULP-specific physical signals and channels, based on specific conditions and the supported configuration by the serving cell or set of cells identified by the network, e.g., the WTRU determining a received LP-SS signal strength below a specified/signaled threshold.

In a third step, upon detection of a LP-WUS addressed to a configured group (e.g., based on configured group identifiers) and determining any of a received signal strength and signal-to-noise ratio between a first and second thresholds based on a LP-SS used by the ULP for synchronization and/or the LP-WUS, the WTRU utilizes the LP-PO configuration to decode the paging DCI and conventional synchronization signals, e.g., PSS and/or SSS in an SSB, to synchronize the conventional receiver, if needed. On a condition that the paging DCI is successfully decoded as depicted in FIG. 8 (and a configured sub-group identifier is detected, if available), the WTRU determines the paging message transmission configuration, e.g., scheduled time and frequency resources and modulation and coding scheme, and transitions to Uu RRC IDLE state (e.g., switches to PDSCH channel decoding) within a maximum time duration based on the paging message's scheduling information. Otherwise as depicted in FIG. 6, the WTRU transitions to Uu RRC IDLE state (e.g., switches to PDCCH/PDSCH channel monitoring and decoding) within a maximum time duration based on the configured/signaled paging DCI's PO configuration of the conventional receiver. In a fifth step, the WTRU utilizes the conventional receiver to decode the corresponding paging message to the decoded LP-PO or PO. On a condition that the WTRU detects its identifier in the paging message, it initiates connection establishment/resume procedure.

In an alternative to the third step, the WTRU determining any of a received signal strength and signal-to-noise ratio below a first threshold and transitioning to Uu RRC IDLE state (e.g., switching to PDCCH channel monitoring and decoding) within a maximum time duration based on the configured/signaled paging DCI's PO configuration of the conventional receiver. In another alternative to the third step, the WTRU determining any of a received signal strength and signal-to-noise ratio above a second threshold and maintaining ULP RRC IDLE state (e.g., the monitoring of the LP-PDCCH channel) operation, i.e., attempting to decode the paging DCI over LP-PO regardless of successful or failure in decoding.

In an additional alternative depicted in FIG. 7, the WTRU fails to detect the LP-WUS, transitions to Uu RRC IDLE state (e.g., switches to PDCCH channel monitoring), utilizes conventional synchronization signals, e.g., PSS and/or SSS in an SSB, to synchronize the conventional receiver, if needed, and detects via the conventional receiver a WUS. The WTRU then utilizes the ULP receiver and LP-PO configuration to decode the paging DCI, and upon successful decoding, the WTRU proceeds to the fifth step above. Otherwise, the WTRU utilizes the conventional receiver and the configured/signaled paging DCI's PO configuration to decode the paging DCI.

In a fourth embodiment, a WTRU utilizes the ULP receiver for LP-WUS/LP-PO/LP-PDSCH detection/decoding, and dynamically determines the need for Paging Occasion (PO) and/or Paging Message reception via the conventional receiver, where the LP-WUS may be group specific and the paging DCI (of the LP-PO) may contain sub-group identifiers. In a first step, the WTRU determines support of ULP paging (e.g., in the form of LP-WUS, paging DCIs over LP-PDCCH, and paging messages over LP-PDSCH transmissions) within any of current serving cell and a set of cells in, e.g., a notification or tracking area. For example, the support can be determined based on a ULP-specific information element(s) in a system information block, or it can be signaled in any of an RRC message, e.g., RRC Release or RRC Suspend messages, and NAS message, e.g., Registration Accept messages. Additionally, the ULP may report its WTRU ULP capability and receive paging monitoring configuration/parameters in any of system information, RRC, and NAS messages including any of the following:

- Support of any of LP-WUS, LP-PO, and ULP paging messages. Support may be static, or it may be opportunistically enabled by LP-WUS in a dynamic fashion;
- LP-WUS configuration as any of sequence-based/DCI-based, group identifiers, monitoring periodicity, e.g., duty-cycled or continuous, and mapping to any of paging DCI and messages configuration;
- LP-SS configuration in case of duty-cycled monitoring operation, e.g., sequence structure, potential sequences, and periodicity;
- Paging DCI configuration may be any of LP-PO and legacy PO transmission configuration such as paging search space, periodicity, and/or relationship to LP_WUS (e.g., a time offset from a detected LP-WUS). The LP-PO/PO search space may constitute a set of frequency resources defined in terms of, e.g., control channel elements (CCE), resource element groups (REG), and/or aggregation level, and a set/duration of time resources defined in terms of (OFDM) symbols, slots, and/or frames.

The WTRU then, in a second step, operates in a ULP RRC IDLE state (e.g., switches to ULP physical signals/channels monitoring, detection, and decoding) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In an alternative to the second step, the WTRU may determine inability to utilize and monitor ULP-specific physical signals and channels based on specific conditions and the supported configuration by the serving cell or set of cells identified by the network, e.g., the WTRU determining a received LP-SS signal strength below a specified/signaled threshold.

In a third step, upon detection of a LP-WUS addressed to a configured group (e.g., based on configured group identifiers) and determining any of a received signal strength and signal-to-noise ratio between a first and second thresholds based on a LP-SS used by the ULP for synchronization and/or the LP-WUS, the WTRU utilizes the LP-PO configuration to decode the paging DCI and conventional synchronization signals, e.g., PSS and/or SSS in an SSB, to synchronize the conventional receiver, if needed.

Alternatively, the WTRU may determine that the current serving cell does not support paging DCI and/or message transmissions over LP-PDCCH/LP-PDSCH channels based on the detected LP-WUS. The WTRU, subsequently, transitions to Uu RRC IDLE state (e.g., switches to legacy PDCCH/PDSCH channels monitoring and decoding) and utilizes the conventional receiver for paging DCI and/or message reception. The conventional receiver may also consider legacy synchronization signal, e.g., PSS and SSS in an SSB, for synchronization, if needed.

On a condition that the paging DCI of the LP-PO is successfully decoded (and a configured sub-group identifier is detected, if available), the WTRU determines the paging message transmission configuration, e.g., scheduled time and frequency resources and modulation and coding scheme. Otherwise, the WTRU transitions to Uu RRC IDLE state (e.g., switches to PDCCH monitoring) within a maximum time duration based on the configured/signaled paging DCI's PO configuration of the conventional receiver. The paging DCI in any of the LP-PO and PO may indicate, as part of the paging message transmission configuration, whether the serving cell supports paging message transmission over any of PDSCH and LP-PDSCH.

In a fifth step, the WTRU utilizes the ULP to decode the paging message in the LP-PDSCH channel according to the determined configuration and transitions to Uu RRC IDLE state (e.g., utilizes legacy/existing physical UL/DL channels) to initiate RRC connection establishment/resume procedure if its identifier is detected. Alternatively, upon failure to decode the paging message in the LP-PDSCH channel using the ULP, the WTRU transitions to Uu RRC IDLE state (e.g., switches to PDSCH channel decoding) within a maximum time duration based on the configured/signaled scheduling information of the PDSCH channel carrying the paging message. On a condition that the WTRU detects its identifier in the paging message in the PDSCH channel, it initiates connection establishment/resume procedure.

It may be noted that in any of the previous embodiments, the sub-group identifier within the paging DCI in any of a PO and LP-PO may be a unique identifier. In such case, the WTRU may not need to decode a paging message and may initiate connection establishment/resume procedure directly.

According to a fifth embodiment, a WTRU utilizes the ULP receiver for LP-PO/LP-PDSCH detection/decoding, and dynamically determines the need for Paging Occasion (PO) and/or Paging Message reception via the conventional receiver, where the paging DCI (of any of the LP-PO and PO) may contain sub-group identifiers. In a first step, the WTRU determines support of ULP paging (e.g., in the form of paging DCIs over LP-PDCCH and paging messages over LP-PDSCH transmissions) within any of current serving cell and a set of cells in, e.g., a notification or tracking area. For example, the support can be determined based on a ULP-specific information element(s) in a system information block, or it can be signaled in any of an RRC message, e.g., RRC Release or RRC Suspend messages, and NAS message, e.g., Registration Accept messages. Additionally, the ULP may report its WTRU ULP capability and receive paging monitoring configuration/parameters in any of system information, RRC, and NAS messages including any of the following:

- Support of any of LP-PO and ULP paging messages. Support of ULP paging messages may be static, or it may be opportunistically enabled by the paging DCI in a dynamic fashion;
- Paging DCI configuration may be any of LP-PO and legacy PO transmission configuration and may include any of sequence-based/DCI-based (explicit information) support, monitoring periodicity, e.g., duty-cycled or continuous, paging search space, and mapping (in case of sequence-based design) to any of group identifiers and paging messages/records configuration. The LP-PO/PO search space may constitute a set of frequency resources defined in terms of, e.g., control channel elements (CCE), resource element groups (REG), and/or aggregation level, and a set/duration of time resources defined in terms of (OFDM) symbols, slots, and/or frames;
- LP-SS configuration in case of duty-cycled monitoring operation, e.g., sequence structure, potential sequences, and periodicity.

The WTRU then, in a second step, operates in a ULP RRC IDLE state (e.g., switches to ULP physical signals/channels monitoring, detection, and decoding) and monitors the channel using the ULP for paging DCI detection where channel monitoring can be duty-cycled or continuous, i.e., on-demand paging, based on WTRU's power consumption budget of paging reception and supported configuration by the serving cell or set of cells identified by the network, and the DCI may be implicitly encoded as a sequence. In an alternative to the second step, the WTRU may determine inability to utilize and monitor ULP-specific physical signals and channels based on specific conditions and the supported configuration by the serving cell or set of cells identified by the network, e.g., the WTRU determining a received LP-SS signal strength below a specified/signaled threshold.

In a third step, upon detection of a paging DCI addressed to a configured group/sub-group (e.g., based on any of configured group/sub-group identifiers and mapping to detected DCI) and determining any of a received signal strength and signal-to-noise ratio between a first and second thresholds based on a LP-SS used by the ULP for synchronization and/or the LP-PO, the WTRU utilizes conventional synchronization signals, e.g., PSS and/or SSS in an SSB, to synchronize the conventional receiver, if needed.

In a fourth step, the WTRU utilizes determined paging message/record configuration (e.g., based on any of explicit scheduling information in the paging DCI and mapping of detect DCI to preconfigured scheduling information) to decode the paging message/record in a LP-PDSCH channel using the ULP.

Alternatively, the WTRU may determine that the current serving cell does not support paging message/record transmissions over LP-PDSCH channels based on the detected paging DCI. The WTRU, subsequently, transitions to Uu RRC IDLE state (e.g., switches to PDSCH decoding) and utilizes the conventional receiver for paging message/record reception over a PDSCH channel.

In a fifth step, on a condition that the WTRU successfully decode the paging message/record via the ULP receiver, the WTRU transitions to Uu RRC IDLE state (e.g., utilizes legacy/existing physical UL/DL channels) to initiate RRC connection establishment/resume procedure, if its identifier is detected in the paging message/record of any of the LP-PDSCH. Otherwise, the WTRU transitions to Uu RRC IDLE state (e.g., switches to PDSCH decoding) within a maximum time duration based on the configured/signaled scheduling information of the PDSCH channel carrying the paging message; and utilizes the conventional receiver for paging message/record reception over a PDSCH channel.

In an alternative to the third step, when the WTRU detects a paging DCI but fails to correctly decode the information (e.g., in an explicitly encoded information scenario), the WTRU transitions to Uu RRC IDLE state (e.g., switches to PDCCH monitoring and decoding) within a maximum time duration based on the configured/signaled paging DCI's PO configuration of the conventional receiver. In another alternative to the third step, the WTRU may consider a fallback timer T_UuPagingFallback to capture the case when it fails to detect/decode a paging DCI using the ULP receiver (e.g., in a scenario where information is implicitly encoded as a sequence). The WTRU then transitions to Uu RRC IDLE state and monitors paging DCI according to the configured/signaled paging DCI's PO configuration of the conventional receiver, if it fails to detect a paging DCI by the ULP receiver for a duration T_UuPagingFallback. The fallback to the Uu RRC IDLE state may also be dependent on the LP-SS received signal strength, e.g., the WTRU fails to detect a paging DCI by the ULP receiver for a duration T_UuPagingFallback and/or detects a LP-SS received signal strength falling below a specified/configured threshold. The WTRU may also return to ULP RRC IDLE state if it does not receive any paging DCI for a configured/signaled number of POs. In an additional alternative to the third step, the WTRU determining any of a received signal strength and signal-to-noise ratio above a second threshold and maintaining ULP RRC IDLE state operation, i.e., attempting to decode the paging message/record over LP-PDSCH regardless of successful or failure in decoding.

It is noted here that the purpose of any of the IDLE/INACTIVE states' PDCCH and LP-PDCCH DCI may entail WTRU/Group-specific signaling, e.g., wake-up signaling (WUS), early paging indication (EPI/PEI), slot format indication (SFI), and/or paging DCI, or common signaling including any of a system information change/modification notification and public warning systems' notifications such as ETWS (Earthquake and Tsunami Warning System) and CMAS (Commercial Mobile Alert System) notifications. Depending on the type of the received DCI over any of the PDCCH and LP-PDCCH, the action of the WTRU in any of the previous embodiments may be different. In these embodiments, the focus is on the WTRU's actions in response to WTRU/Group-specific DCI signaling, in particular the paging notification DCI, but the procedures still hold in general for any other type of messages including the common signaling DCI where the WTRU may not have to decode a PDSCH/LP-PDSCH channel or initiate a connection establishment/resume procedure.

ULP-based Paging Procedures: Group-Specific WUS or Paging DCI with Feedback

In this section are explored the ULP-based paging solutions with WTRU's feedback support. In this category, when ULP is enabled within a cell, set of cells, or in the network, the network may dynamically, i.e., based on WTRU's feedback, support wake-up signaling and/or paging DCI and/or paging message transmissions with signal characteristics that are suitable for ULP receivers. This dynamic support may reduce the burden on the network in terms of network resource utilization but implies an additional burden on the ULP-capable WTRU to provide feedback to the network in the form of UL transmissions.

In a first embodiment, a WTRU utilizes the ULP and/or conventional receivers to determine dynamic support of low power paging by current serving cell, set of neighboring cells, and/or set of cells in a notification/tracking area. The ULP receiver may still be used to receive system information but may need to provide feedback to enable paging reception. In a first step, the WTRU determines support of ULP paging (e.g., in the form of dynamically enabled LP-WUS, paging DCIs over LP-PDCCH, and paging messages over LP-PDSCH transmissions through WTRU's feedback) within any of current serving cell and a set of cells in, e.g., a notification or tracking area. For example, the support can be determined based on a ULP-specific information element(s) in a system information block, or it can be signaled in any of an RRC message, e.g., RRC Release or RRC Suspend messages, and NAS message, e.g., Registration Accept messages. Additionally, the ULP may report its WTRU ULP capability and receive paging monitoring configuration/parameters introduced in Section "Group-Specific WUS or Paging DCI without Feedback" in any of system information, RRC, and NAS messages. The WTRU may also receive paging-enablement feedback configuration as any of the following:

- Feedback type, e.g., WTRU-specific or group-specific, and supported sequence structures and seeds.
- Feedback occasions defined as, e.g., an initial offset with respect to LP-SS or SSB transmission instances, number of feedback transmission opportunities, and potential frequency resources.
- Acknowledgement configuration as any of implicit acknowledgement, e.g., in the form of a ULP paging monitoring duration followed by a feedback retransmission upon failure of detection, and explicit acknowledgment.

In a second step, the WTRU evaluates power consumption penalty associated with ULP-paging-enablement feedback, e.g., based on WTRU's type, expected traffic, paging latency requirement, received signal strength, battery status, and/or mobility state. For example, a WTRU may determine stringent paging latency requirement, low-mobility status, and that feedback may enable ULP paging under current serving cell only. The WTRU may then decide that it is still energy and paging-latency efficient to transmit a ULP-paging-enablement feedback. In a third step, the WTRU utilizes the ULP receiver to detect a LP-SS signal, determine feedback occasion(s), and transmits the ULP-paging-enablement signal. In a fourth step, the WTRU receives an acknowledgment for its feedback and utilizes the ULP receiver for paging detection and/or reception. Otherwise, the WTRU fails to receive an acknowledgment for a configured/signaled duration or receives a negative acknowledgment (NACK) and retransmits the ULP-paging-enablement signal in a subsequent feedback occasion. Alternatively, the WTRU utilizes the ULP receiver to monitor the channel for any of a paging indication(s) and paging DCI(s) addressed to its configured group(s)/sub-group(s) for a configured/signaled duration. If the WTRU fails to receive any of a paging indication(s) and paging DCI(s) addressed to its configured group(s)/sub-group(s) for the configured/signaled duration, it retransmits the ULP-paging-enablement signal in a subsequent feedback occasion.

It is to be noted that in the previous (first) embodiment, the dynamic (feedback-based) enablement of ULP paging may entail the enablement/support of any of the LP-WUS, LP-PDCCH, and LP-PDSCH, i.e., feedback does not have to enable all the low-power channels supported by a ULP receiver and can enable only a subset of the channels. Additionally, in any of the embodiments in this section, feedback may enable ULP paging in any of current serving cell, first tier of neighboring cells, and a set of cells constituting/covering an area, e.g., a RAN notification area or a tracking area.

In a second embodiment, a WTRU utilizes the ULP and/or conventional receivers to determine dynamic support of low power paging by current serving cell, set of neighboring cells, and/or set of cells in a notification/tracking area. In a first step, the WTRU reports its ULP capability and receives paging monitoring and ULP-paging-enablement feedback configuration/parameters introduced in Section "Group-Specific WUS or Paging DCI without Feedback" in any of system information, RRC signaling, and NAS messages. In a second step, the WTRU operates in ULP RRC IDLE state and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In a third step, the WTRU detects a LP-WUS addressed to a configured group (e.g., based on configured group identifiers) and determines the need for feedback to receive the LP-PO and/or paging message over LP-PDSCH based on the detected LP-WUS. Alternatively, the WTRU detects a LP-WUS, determines that ULP based paging DCI and paging message/record are enabled, and follows any of the procedures described in Section "Group-Specific WUS or Paging DCI without Feedback". In a fourth step, the WTRU evaluates power consumption penalty associated with ULP-paging-enablement feedback, e.g., based on WTRU's type, expected traffic, paging latency requirement, received signal strength, and/or mobility state. For example, a WTRU may determine that power consumption penalty is justified by feedback enabling the ULP based paging over a set of cells instead of only the serving cell and its determined mobility status. On a condition that the WTRU determines that feedback's power consumption penalty would be offset by expected power saving gain due to the reception of LP-PO and/or paging message over LP-PDSCH (and/or by the reduction in paging latency), it transmits a WTRU-specific or group-specific feedback to the network, based on received/signaled configuration, requesting enablement of low power paging. In a sixth step, the WTRU receives an acknowledgment for its feedback and utilizes the ULP receiver for paging DCI and paging message/record reception. Otherwise, the WTRU fails to receive an acknowledgment for a configured/signaled duration or receives a negative acknowledgment (NACK) and retransmits the ULP-paging-enablement signal in a subsequent feedback occasion or utilize the conventional receiver to receive the paging DCI and paging message/record. Alternatively, the WTRU utilizes the ULP receiver to monitor the channel for paging DCI(s) addressed to its configured group(s)/sub-group(s) for a configured/signaled duration. If the WTRU fails to receive any paging DCI(s) addressed to its configured group(s)/sub-group(s) for the configured/signaled duration, it retransmits the ULP-paging-enablement signal in a subsequent feedback occasion or utilize the conventional receiver to receive the paging DCI and paging message/record. On a condition that the WTRU detects its identifier in the paging message of any of the PDSCH and LP-PDSCH channels, it initiates connection establishment/resume procedure.

In any of the previous embodiments, the WTRU may consider ULP-paging-enablement signal retransmissions for a fixed number of times which may be decided by the WTRU or configured by the network as a ULP paging specific parameter. Upon exhaustion of the number of retransmissions, the WTRU may utilize the conventional receiver for any of paging indication detection and paging DCI/message/record reception.

In a third embodiment, a WTRU utilizes the ULP and/or conventional receivers to determine dynamic support of low power paging by current serving cell, set of neighboring cells, and/or set of cells in, e.g., a notification/tracking area. In a first step, the WTRU reports its ULP capability and receives paging monitoring and ULP-paging-enablement feedback configuration/parameters introduced in Section "Group-Specific WUS or Paging DCI without Feedback" in any of system information, RRC signaling, and NAS messages. In a second step, the WTRU operates in ULP RRC IDLE state and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In a third step, the WTRU detects a LP-WUS addressed to a configured group (e.g., based on configured group identifiers) and determines the need for feedback to receive the LP-PO and/or paging message over LP-PDSCH based on the detected LP-WUS. Alternatively, the WTRU detects a LP-WUS, determines that ULP based paging DCI and paging message/record are enabled, and follows any of the procedures described in Section "Group-Specific WUS or Paging DCI without Feedback". In a fourth step, the WTRU determines feedback transmission configuration based on any of detected LP-WUS and mapping to feedback transmission configuration, and received/signaled configuration through, e.g., system information, RRC signaling, or NAS messages. In a fifth step, the WTRU determines a feedback transmission priority based on any of a desired power consumption budget, paging latency requirement, WTRU's type, expected traffic, received signal strength, and/or mobility state. In a sixth step, the WTRU determines/selects a feedback transmission occasion based on determined feedback transmission priority, and monitors feedback occasions prior to its determined/selected one. On the condition that the WTRU detects feedback signals transmitted by other WTRU(s) that belong(s) to any of the configured group(s)/sub-group(s), using the ULP and/or conventional receivers, on any of the configured and monitored feedback occasions, the WTRU refrains from feedback transmission on the determined/selected feedback occasion. Otherwise, the WTRU transmits a WTRU-specific or group-specific feedback to the network, based on received/signaled configuration, requesting enablement of low power paging. In an eighth step, the WTRU receives an acknowledgment for any of the transmitted feedback signals and utilizes the ULP receiver for paging DCI and paging message/record reception. Otherwise, the WTRU fails to receive an acknowledgment for a configured/signaled duration or receives a negative acknowledgment (NACK), and repeats steps four through eight or utilize the conventional receiver to receive the paging DCI and paging message/record. On a condition that the WTRU detects its identifier in the paging message of any of the PDSCH and LP-PDSCH channels, it initiates connection establishment/resume procedure.

ULP-Based Paging Procedures: WTRU-Specific WUS or Paging DCI

In any of the embodiments presented in the preceding section "ULP-based Paging Procedures: Group-specific WUS or Paging DCI without Feedback" and "ULP-based Paging Procedures: Group-specific WUS or Paging DCI with Feedback", any of the LP-WUS, paging DCI over LP-PDCCH, and paging DCI over PDCCH can be uniquely addressed to a specific WTRU. In this subsection, are presented a few examples that show potential changes to the previously presented embodiments to capture this aspect (WTRU-specific WUS or paging DCI addressing).

According to a first embodiment, a WTRU utilizes the ULP receiver for LP-WUS detection and the conventional receiver to determine if it is being paged. In a first step, the WTRU reports its ULP capability, receives paging monitoring configuration/parameters introduced above, and determines support of ULP paging (e.g., in the form of LP-WUS transmission). The WTRU then, in a second step, operates in a ULP RRC IDLE state (e.g., switches to ULP physical signals monitoring and detection) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In an alternative to the second step, the WTRU may determine inability to utilize and monitor ULP-specific physical signals based on specific conditions and the supported configuration by the serving cell or set of cells identified by the network, e.g., the WTRU determining a received LP-SS signal strength below a specified/signaled threshold. Upon detection of a uniquely addressed/assigned LP-WUS, the WTRU transitions to Uu RRC IDLE state (e.g., switches to PDCCH/PDSCH channels monitoring, detection, and decoding) within a maximum time duration specified/signaled by the network. The maximum time duration may indicate an offset defining the beginning of PRACH (Physical Random-Access Channel) occasions with respect to when the LP-WUS is transmitted. In a fourth step, the WTRU utilizes the conventional transceiver to initiate connection establishment/resume procedure.

According to a second embodiment, a WTRU utilizes the ULP receiver for LP-WUS detection and the conventional receiver to determine if it is being paged. In a first step, the WTRU reports its ULP capability, receives paging monitoring configuration/parameters introduced above, and determines support of ULP paging (e.g., in the form of LP-WUS transmission). The WTRU then, in a second step, operates in a ULP RRC IDLE state (e.g., switches to ULP physical signals monitoring and detection) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In an alternative to the second step, the WTRU may determine inability to utilize and monitor ULP-specific physical signals based on specific conditions and the supported configuration by the serving cell or set of cells identified by the network, e.g., the WTRU determining a received LP-SS signal strength below a specified/signaled threshold. Upon detection of a LP-WUS, the WTRU transitions to Uu RRC IDLE state (e.g., switches to PDCCH/PDSCH channels monitoring, detection, and decoding) within a maximum time duration specified/signaled by the network. The maximum time duration may indicate an offset defining the beginning of PO transmissions with respect to when the LP-WUS is transmitted. In a fourth step, the WTRU utilizes the conventional receiver to decode the paging DCI in a PO. On a condition that the WTRU detects its configured unique identifier in the paging DCI, it initiates connection establishment/resume procedure.

According to a third embodiment, a WTRU utilizes the ULP receiver for LP-WUS detection and dynamic determination of presence of LP-PDCCH carrying the paging DCI, where the LP-WUS may be group specific and the paging DCI may contain unique identifiers. In a first step, the WTRU reports its ULP capability, receives paging monitoring configuration/parameters introduced above, and determines support of ULP paging (e.g., in the form of LP-WUS and opportunistic transmission of paging DCIs over LP-PDCCH). The WTRU then, in a second step, operates in a ULP RRC IDLE state (e.g., switches to ULP physical signals monitoring and detection) and monitors the channel using the ULP for LP-WUS detection where channel monitoring can be duty-cycled or continuous, i.e., on-demand paging, based on WTRU's power consumption budget of paging reception and supported configuration by the serving cell or set of cells identified by the network. In an alternative to the second step, the WTRU may determine inability to utilize and monitor ULP-specific physical signals based on specific conditions and the supported configuration by the serving cell or set of cells identified by the network, e.g., the WTRU determining a received LP-SS signal strength below a specified/signaled threshold. Upon detection of a LP-WUS addressed to a configured group (e.g., based on configured group identifiers) and determining presence of a LP-PO opportunity based on the detected LP-WUS, the WTRU utilizes the LP-PO configuration to decode the paging DCI. On a condition that the paging DCI is successfully decoded (and a configured unique identifier is detected), the WTRU transitions to Uu RRC IDLE state (e.g., switches to legacy UL/DL physical channels operation) within a maximum time duration based on the PRACH occasions configuration. Otherwise, the WTRU transitions to Uu RRC IDLE state (e.g., switches to PDCCH/PDSCH channels monitoring, detection, and decoding) within a maximum time duration based on the configured/signaled paging DCI's PO configuration of the conventional receiver. In a fifth step, the WTRU utilizes the conventional transceiver to initiate connection establishment/resume procedure.

ULP-Based Paging Configuration Variants

This section provides details for the paging configuration variants which enable the paging procedures' opportunities discussed in Section "ULP-based Paging Procedures" related to enabling paging of a ULP receiver with focus on device's energy efficiency or paging latency reduction without an impact on device's paging reliability. Are described here two main configuration variants as duty-cycled paging and the more desirable of on-demand paging. For both cases, the WTRU is expected to feedback its receiver capability and its desired/preferred mode of operation. Specifically, in one option, a WTRU signals the serving RAN node with its preferred duty cycled ULP receptions. In another option, a WTRU signals its preferred on-demand mode for ULP paging. Those new IEs can trigger and be part of a mobility registration update and/or RNA update and/or a temporary RACH procedure. with the first set of solutions, the WTRU attempts to balance paging latency and IDLE state power consumption, whereas the second set of solutions put a much higher weight and focuses mainly on paging latency reduction.

ULP-Based Paging Configuration Variants: Duty-Cycled Paging Configurations

This subsection covers and enables the duty-cycled low-power paging solutions utilizing any of the ULP and conventional receivers. Are denoted the paging procedure performed, e.g., over the ULP interface or by the ULP receiver, as a low-power paging procedure. In this approach, when ULP is enabled within a cell, set of cells (in an area, e.g., notification or tracking area), or in the network, the RAN and/or Core network configures a WTRU with at least two different paging cycles according to the following scenarios:

- Low-Power Paging indication Support:
  - In one option, ULP receivers are used to receive duty-cycled paging indication and conventional receivers are used to receive duty-cycled paging DCIs and messages/records. Both ULP and conventional receiver duty-cycles are based on legacy supported values;
  - In a second option, ULP receivers are used to receive short duty-cycled paging indication and conventional receivers are used to receive short duty-cycled paging DCIs and messages/records. The two duty cycles may be related but may not be the same;
  - In a third option, ULP receivers are used to receive short duty-cycled paging indication and conventional receivers are used to receive longer duty-cycled paging DCIs and messages/records;
  - In all options, the conventional receivers are configured with a long duty cycle for fallback paging reception operation by the conventional receiver.
- Low-Power Paging DCI Support: In this category, low power paging indication (as per the previous point) may or may not be supported along with the low power paging DCI support. The ULP receiver may be configured to receive the paging DCI with short or long/legacy duty cycle. On the other hand, the conventional receiver may be configured with a long duty cycle for fallback paging reception operation by the conventional receiver. The conventional receiver is used to receive the paging message/record according to the scheduling information received in the paging DCI, if needed, i.e., neither the paging indication nor the paging DCI was uniquely addressing the WTRU;
- Low-Power Paging message/record Support: In this category again, low power paging indication (as per the previous points) may or may not be supported along with the low power paging DCI support. The ULP receiver may be used to receive the paging message/record based on the scheduling information in the received paging DCI. The conventional receiver may still be configured with a long duty cycle for fallback paging reception operation by the conventional receiver.

Therefore, the signaling to enable the multiple paging duty cycles may be defined and may be supported by specifications. In one option, the RAN node may configure the ULP-capable WTRUs with two temporary IDs (e.g., I-RNTI, s-TMSI, TMSI), and two sets of the cell-specific paging settings (e.g., a paging periodicity) for the ULP and conventional receivers, respectively. At the ULP-capable WTRUs side, such configuration defines two various paging cycles with different periodicities for ULP and conventional transceivers. For CN-based paging, the core network may register two permanent WTRU-IDs for ULP-capable WTRUs for the same purpose. In another option, the RAN node may still configure the ULP-capable WTRUs with a single temporary ID (e.g., TMSI), but two sets of the cell-specific paging settings (e.g., a paging periodicity) for the ULP and conventional receivers, respectively, based on known WTRU capability. At the ULP-capable WTRUs side, such configuration may define two various paging cycles with different periodicities or the same paging cycle/periodicity for ULP and conventional transceivers. Thus, depending on the type of the WTRU connectivity status, the ULP-capable WTRU shall be monitoring the corresponding ULP paging occasions and accordingly the respective Uu regular paging occasions. Based on the paging load and capacity, the RAN and/or Core network may also provide parameters or configurations that configure the WTRU on when to switch from one duty cycle to the other and/or when to utilize the conventional versus ULP receiver for paging reception.

Figure 9:
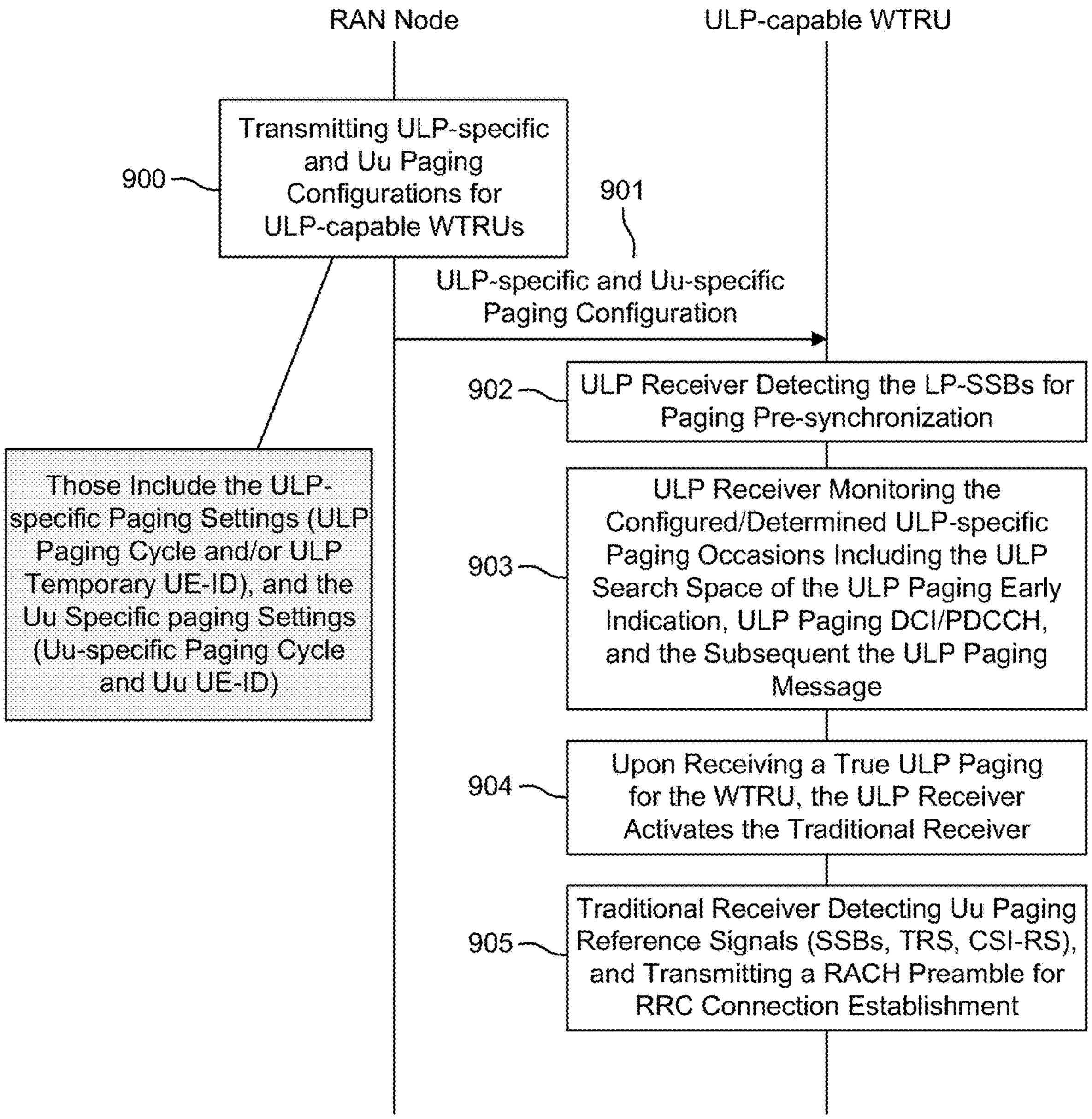
FIG. 9 is a timeline example of an exemplary embodiment 1.

In an exemplary embodiment, depicted by FIG. 9, a ULP device/WTRU,

- receiving (901) the ULP and Uu paging configurations from selected RAN node (as transmitted by selected RAN node in 900) including the ULP-specific paging cycle, ULP specific WTRU-ID, and the corresponding conventional Uu receiver paging cycle;
- utilizing (902) LP-SS for paging pre-synchronization and (903) received configurations for monitoring the ULP-specific paging occasions with the shorter configured ULP-specific paging cycle;
- On condition of a ULP paging indication (either scrambled with WTRU-specific or WTRU-group-specific), the ULP WTRU blindly decodes the ULP paging DCI/PDCCH and the subsequent ULP paging record on the ULP PDSCH channel;
- On condition of a ULP WTRU true paging (904), the ULP WTRU triggering a wake up of the regular Uu receiver. By 'true paging' is meant that the paging record includes the identifier of the WTRU, which means that it is actually the WTRU that is being paged;
- The conventional Uu receiver detecting pre-paging SSBs, CSI-RS and/or TRS reference signals for RAN synchronization (905) and therefore, transmitting a RACH signaling for RRC connection establishment.

Figure 10:
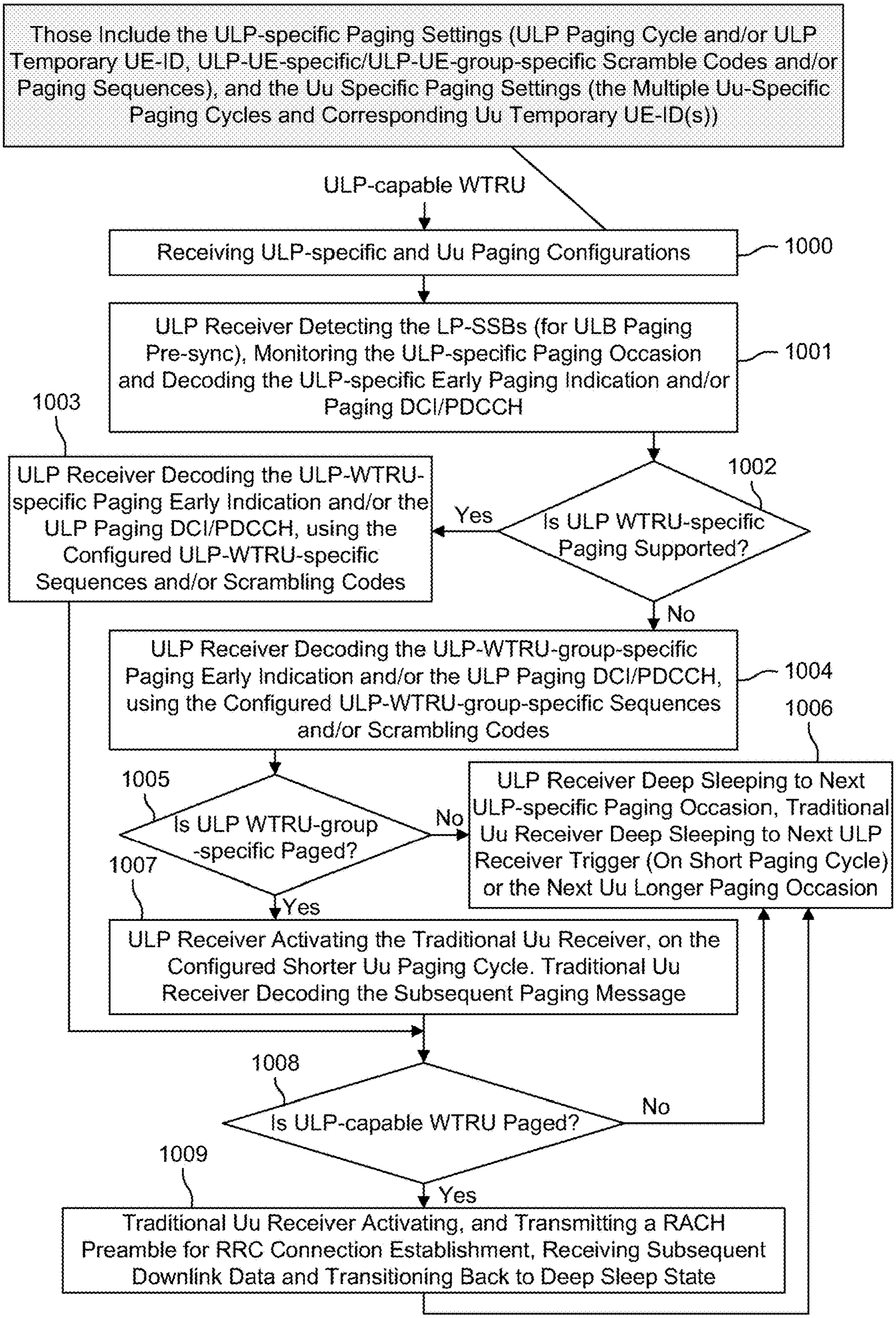
FIG. 10 is a flow diagram of exemplary embodiment 2.

In another exemplary embodiment, depicted by FIG. 10, a ULP device/WTRU,

- receiving (1000) configurations of multiple paging settings in the form of a single ULP-specific paging cycle and multiple paging cycles of the conventional receiver with different paging periodicities, and conventional receiver WTRU-IDs;
- monitoring (1001) the ULP-specific paging search space using the configured ULP-WTRU-specific or ULP-WTRU-group-specific scrambling code/sequences;
- on a condition that (1002) network's support of ULP-group-specific paging is determined, monitoring (1004) LP-WUS for a ULP-group-specific identifier;
- otherwise, monitoring (1003) LP-WUS for a ULP-specific identifier;
- on a condition that (1005) a ULP-group-specific LP-WUS is detected, activating (1007) the conventional Uu receiver on the shorter Uu paging cycle to decode the paging DCI and paging record;
- otherwise (1006), the ULP receiver deep sleeping to next ULP-specific paging occasion.
- On a condition (1008) that paging record included the WTRU's identifier, the conventional Uu receiver waking up (1009), pre-synchronizing with the RAN interface using the RAN Uu SSBs, available TRS and/or CSI-RS. The conventional Uu receiver blindly decoding the corresponding paging DCI and subsequent paging record. The conventional receiver transmitting a RACH signaling for RRC connection establishment.

In another exemplary embodiment, a ULP device/WTRU,

- receiving configurations of multiple paging settings in the form of a single ULP-specific paging cycle and multiple paging cycles of the conventional receiver with different paging periodicities, and conventional receiver WTRU-IDs.
- receiving configurations of one or more paging search subspaces (paging PDCCH/DCI), indication of a default paging search sub-space, to be monitored on condition of a present ULP paging indication with absence of the search sub-space indication.
- monitoring and decoding the ULP paging indication resources and detecting the paging group and the search sub-space ID to be monitored.
- on a condition of a present group true ULP paging indication, triggering the conventional receiver with indication of the determined paging search sub-space to be monitored.
- the conventional Uu receiver waking up, pre-synchronizing with the RAN interface using the RAN Uu SSBs, available TRS and/or CSI-RS. The conventional Uu receiver blindly decoding the corresponding paging DCI/paging search sub-space and subsequent paging record. The conventional receiver transmitting a RACH signaling for RRC connection establishment. The term 'blindly decoding' meaning here that since the WTRU does not know the exact resources that are being used for the transmission of a Paging DCI (i.e., it is only aware of the search space), it has to (blindly) search for the Paging DCI within the search space.

According to a first technical realization, a ULP receiver may be configured with a ULP-specific ptraging duty-cycle and a conventional receiver may be configured with a similar or longer Uu paging duty cycle. A similar ULP and conventional receivers' duty cycles may be considered to focus on WTRU power saving without a significant impact on paging latency. Alternatively, a shorter ULP receiver's paging cycle may be considered to account for a lower paging indication and/or DCI detection probability by the ULP receiver than the conventional receiver. Hence, utilizing the shorter ULP-specific paging cycle may help maintain the same paging latency while saving the WTRU's overall power consumption associated with the paging procedure. This will in general lead to enhancing the WTRU's power consumption and paging round-trip latency since the paging indication, DCI, and/or message/record may only be monitored by the power friendly ULP receiver, e.g., on a basis of a faster/shorter duty cycle or at most the same duty cycle as the conventional receiver. However, the conventional (power inefficient) receiver may only be woken up/activated upon the detection of a group/sub-group addressed paging indication and/or DCI by the ULP receiver. Furthermore, for backward compatibility, the conventional receiver and the configured Uu paging cycle may be considered as a fallback option to the ULP receiver's paging procedure.

According to a second technical realization, a ULP receiver of a WTRU may be configured with a short ULP-specific paging cycle for paging indication detection whereas the conventional receiver of the WTRU may be configured with multiple (e.g., a short and a long/legacy) paging cycles. The conventional receiver's configured short paging cycle may be used to support a faster paging DCI and/or message/record detection/decoding in response to a ULP-receiver triggered operation, e.g., based on the detection of a paging indication (e.g., LP-WUS, paging early indication, or early paging indication) by the ULP receiver. In other words, the paging DCI and/or paging message/record are decoded by the conventional/traditional receiver only if a true paging indication is detected by the ULP receiver, thus, a power saving gain is still achievable by WTRU despite the reduction in paging latency. This is mainly due to the fact the paging indication/DCI false alarms only occur over the ULP channels where the WTRU ID is still not detected in the paging message which is still decoded using the power efficient ULP receiver.

According to a first embodiment, a WTRU in a first step, transmitting its ULP-capability indication (e.g., whether ULP based paging is supported or not) and preferred ULP mode of operation (e.g., a short ULP paging cycle and a dual short/long paging cycle for the conventional receiver) based on desired power saving and paging latency requirements. These IEs are vital at the RAN node to predict the paging behavior of the ULP-capable WTRU. Those can be part of the WTRU capability indication signaling of the last time the WTRU attempted connecting to the CN network and/or possibly triggered in a temporary RACH procedure.

In a second step, a WTRU receiving configurations of multiple paging cycles, one short paging cycle for ULP paging detection and a conventional longer paging cycle for conventional receiver. There are various ways how the multiple paging cycles can be signaled. In one option, for RAN-triggered paging, the RAN node may configure the ULP-capable WTRUs with multiple paging cycles (T parameter) for the same WTRU ID (e.g., TMSI) or the RAN node may configure the WTRUs with the same paging cycle for multiple (one or more) WTRU IDs (e.g., TMSIs), associated with the ULP receiver and the conventional receivers, respectively. Thus, a ULP-capable WTRU and RAN are using consistent paging settings for both ULP and conventional receivers. Those configurations can be conveyed as part of the system information (SIB2) and/or part of the RRC release/suspend procedure before the WTRU transitions to IDLE/INACTIVE RRC state.

In a third step, a WTRU utilizing the received ULP and Uu paging configurations in determining the ULP and conventional Uu paging occasions. The ULP receiver of the WTRU wakes up/is activated prior to the determined ULP-specific paging occasions. The ULP receiver detecting and blindly decoding the ULP paging occasions based on a configured/associated ULP search space. Upon a true paging addressed to the WTRU and determined based on any of the ULP paging early indication, the paging DCI over PDCCH/LP-PDCCH, and the paging record over PDSCH/LP-PDSCH, the WTRU's ULP receiver triggers a waking up signal to the conventional receiver such that it synchronizes with the Uu RAN interface and subsequently triggers the Uu RAN connection establishment/resume procedure.

According to a second embodiment, a ULP receiver of a WTRU determining the next ULP paging occasion based on a received ULP paging configuration including, e.g., a configured ULP paging cycle and/or an assigned ULP WTRU-ID. On a condition that the ULP receiver determining it is not synchronized with the network, the ULP receiver waking up and detecting/utilizing the LP-SS for retaining the ULP synchronization. The number of required LP-SS detections may depend on the channel quality at the ULP receiver. In a next step, the ULP receiver detecting a ULP early paging indication in a configured ULP search space of the early paging indication. Upon a true paging indication addressed to a configured group/sub-group, the ULP receiver triggers the wake up of the conventional receiver and subsequently triggering the Uu synchronization and RRC connection establishment/resume procedure.

According to a third embodiment, a ULP receiver determining the next ULP paging occasion based on a received ULP paging configuration including, e.g., a configured ULP paging cycle and/or an assigned ULP WTRU-ID. On a condition that the ULP receiver determining that it is not synchronized with the network, the ULP receiver waking up and detecting/utilizing the LP-SS for retaining the ULP synchronization. In a next step, the ULP receiver detecting a ULP early paging indication in a configured ULP search space of the early paging indication and subsequently blindly decoding the paging DCI over LP-PDCCH. Upon a true paging indication addressed to a configured group/sub-group, the ULP receiver triggers the wake up of the conventional receiver and subsequently triggering the Uu synchronization and RRC connection establishment/resume procedure.

According to a fourth embodiment, a ULP receiver determining the next ULP paging occasion based on a received ULP paging configuration including, e.g., a configured ULP paging cycle and/or an assigned ULP WTRU-ID. On a condition that the ULP receiver determining that it is not synchronized with the network, the ULP receiver waking up and detecting/utilizing the LP-SS for retaining the ULP synchronization. In a next step, the ULP receiver detecting a ULP early paging indication in a configured ULP search space of the early paging indication and subsequently blindly decoding the paging DCI over LP-PDCCH. The ULP receiver can then utilize scheduling information in the paging DCI to decode the ULP paging message (e.g., ULP paging record on the ULP data channel to check for the presence of the WTRU-specific WTRU-ID). Upon a true paging indication addressed to a configured group/sub-group, the ULP receiver triggers the wake up of the conventional receiver and subsequently triggering the Uu synchronization and RRC connection establishment/resume procedure.

According to a fifth embodiment, a WTRU in a first step receiving the ULP-specific paging configurations including any of the ULP paging cycle, ULP paging temporary WTRU-ID, the one or more paging cycles of the conventional Uu receiver, and another temporary WTRU ID of the conventional Uu receiver. In a second step, the ULP receiver detecting a ULP-specific early paging indication, e.g., as a LP-WUS or a DCI over ULP-specific LP-PDCCH. Upon a true paging indication addressed to a configured group/sub-group, the ULP receiver triggers the wake up/activation of the conventional receiver. In a next step, the conventional receiver adopts a configured short Uu paging cycle to support a faster paging detection and decoding based on the fact of it being triggered by the ULP receiver. In a subsequent step, the conventional/traditional Uu receiver pre-synchronizes with the RAN interface, in case the sync retention is about to expire, and blindly decodes the paging DCI and the subsequent paging message, i.e., paging record on PDSCH.

The ULP paging grouping can be configured in various forms. In the following, various options are presented for designing an efficient ULP paging grouping strategies alongside the foreseen specifications impact.

ULP Paged WTRU Specific DRX Cycle

RAN configures ULP paged WTRU specific DRX cycle, which includes a shorter DRX cycle than the conventional DRX configuration and the WTRU coming from ULP cell/operation due to the ULP paging indication uses the ULP paged WTRU specific DRX cycle configuration for the DL physical channel monitoring to receive the paging message. The ULP paged WTRU specific DRX's paging occasions may be distributed based on a WTRU (ULP-specific) identifier, such as ULP-TMSI, SUPI or a RNTI assigned for the ULP operation.

ULP PaGed WTRU Specific Search Space

RAN configures ULP paged WTRU specific search space, where the WTRU monitors the paging occasions in the search space to receive the paging DCI. The search space may be independent from and/or multiplexed with the conventional paging search space. As a best practice, the paged WTRU specific search space may be appeared more often than the conventional paging search space in order to minimize the overall latency of the paging indication and detection.

The abovementioned ULP specific DRX cycle and/or ULP specific search space configurations would be provided as part of ULP configuration from RAN and the solutions can be solely configured or both solutions can be configured simultaneously. Those configurations include the ULP-specific paging sequence set of sequences, each for a certain ULP-WTRU-ID (e.g., unique, or group-based ID), in case of the ULP paging indication is defined as an SSS-based sequence. For the DCI-based ULP paging, a set of various scrambling codes are defined where each is associated with a certain ULP-WTRU-ID (e.g., unique, or group-based ID). For a certain scrambled-CRC DCI-based paging indication, a single ULP WTRU ID may be to correctly decode the CRC associated with the paging DCI.

ULP Paged WTRU Specific Search Sub-Space(s)

ULP receivers may be used to receive short duty-cycled paging indication and conventional receivers may be configured with another short duty cycle for ULP-Paging-Indication support and a long duty cycle for fallback paging reception operation by the conventional receiver. The ULP-specific paging indication incorporates information on the one or more paging DCI search space(s)/sub-space(s) which the conventional receiver shall monitor upon the ULP receiver detecting a true ULP-group paging indication. The term 'true ULP group paging indication' is used here to refer that the ULP-group paging indication is intended for the WTRU's assigned group.

This subsection entails a ULP receiver, configured with a ULP paging duty cycle, detecting and blindly decoding a ULP-specific paging indication, including information on the paging DCI search space(s)/sub-space(s) which the WTRU needs to monitor in order to determine if it is paged or not. Upon detecting a true ULP paging indication, the ULP receiver triggers a wake up of the conventional receiver, indicating the determined paging search space/sub-space of the paging DCI/PDCCH to be monitored by the conventional receiver. The intuition is that with the introduction of multiple limited paging search space(s), e.g., sub-space(s), for each paging group, the WTRUs which belong to the paged group perform a blind decoding of a more limited search space/sub-space size, relaxing the power consumption burden. The cost paid to achieve such power saving gain is the increased overhead for transmitting the ULP paging indication in order to indicate the paged WTRU paging group as well as the search sub-space to be monitored. The conventional receiver accordingly power ramps up and monitors the indicated paging search sub-space(s). If the WTRU has been paged, the conventional receiver finally triggers the RACH procedure.

ULP Specific Configuration Applicability

Figure 11:
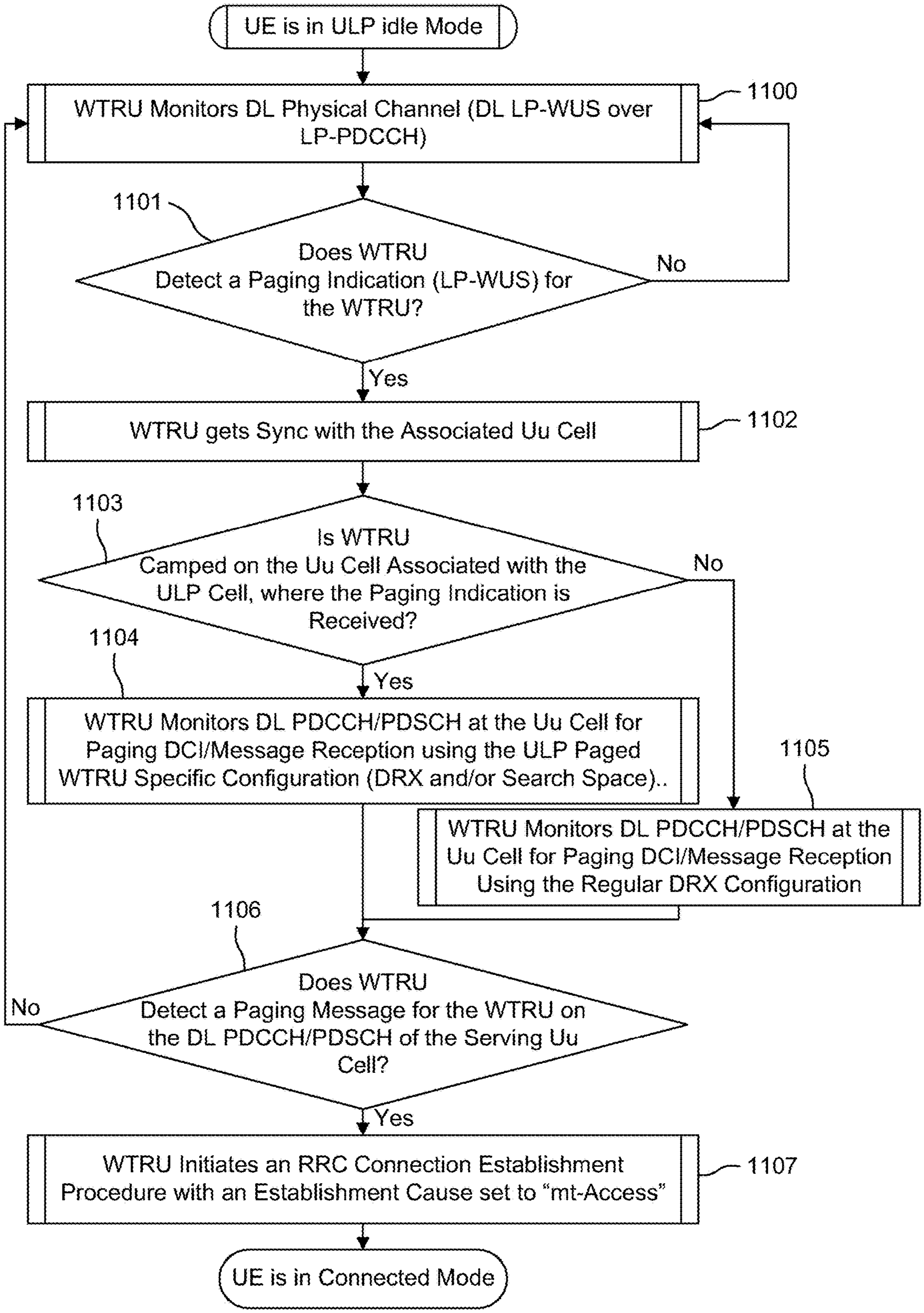
FIG. 11 is a paging message reception with ULP specific paging configuration. In a mobile network, when a device does not have any ongoing data transmissions, it enters an IDLE state in order to preserve battery. If new data arrives for the device, the network probes the IDLE device by sending a so-called "paging" message and the device correspondingly responds.

The abovementioned ULP specific operation on Uu cell is somewhat an expensive paging process thus it may be not a good idea to allow the ULP specific operation on any Uu cell. Thus, the ULP specific paging operation should take place only at the associated Uu cell. In other words, the conventional paging operation would take place if WTRU is camped on a Uu cell, which is not associated with the ULP cell, where the WTRU received the paging indication. The expected WTRU behavior is shown as an embodiment in FIG. 11.

1100: WTRU monitors DL physical signal/channel (LP-WUS/LP-PDCCH), e.g., on a serving ULP cell. ULP receiver consumes 100 to 1000 times less energy than the conventional receiver and so WTRU could monitor the LP-WUS/LP-PDCCH all the time or WTRU may monitor the LP-WUS/LP-PDCCH with relatively short duty cycle (much less than 640 ms, e.g., 10 ms/20 ms). Since WTRU can monitor the paging channel more often than the legacy systems, network can page WTRU more often than the legacy system and so the mobile terminated call setup time can be improved as WTRU can establish RRC connection immediately after the paging indication reception.

1101: WTRU checks if a paging indication designated to the WTRU is sent over the LP-WUS/LP-PDCCH signal/channel. If the paging indication is detected, then go to step 1102. Otherwise, go back to step 1100.

1102: WTRU gets synchronisation with a Uu cell. If the WTRU has already known the best quality Uu cell, then WTRU immediately attempts getting synchronisation with the associated Uu cell. Otherwise, WTRU performs Uu cell selection to find out the best quality Uu cell and is camped on the Uu cell. For the latter case, the synchronisation procedure takes some time and so the Network would provide the paging indication at ULP cell considering the synchronisation delay.

1103: WTRU checks if it's camped on a Uu cell associated with the ULP cell, where WTRU received the paging indication. If the Uu cell is associated with the ULP cell, then go to 1104. Otherwise go to 1105.

1104: WTRU applies the ULP paged WTRU specific configuration (DRX configuration and/or search space) for the paging DCI/message reception on the Uu cell.

1105: WTRU discards the ULP paged WTRU specific configuration but monitors the paging occasions on the Uu cell according to the conventional DRX configuration given by the Uu cell.

1106: WTRU checks if a paging message corresponding to the WTRU is sent over the PDCCH/PDSCH channels. If the paging message is detected and the detected paging message is designated for the WTRU, then go to step 1107. Otherwise, go back to step 1100.

1107: WTRU initiates an RRC connection establishment procedure with an establishment cause set to "mt-Access" so that WTRU can obtain the paged service such as mobile terminated data communication, mobile terminated voice call.

In another embodiment, in a first step, a ULP-capable WTRU receiving the configurations of the ULP paging indication search space/sub-space(s), and periodicity (duty cycle). In a second step, a ULP-capable WTRU monitoring and detecting the ULP paging indication search space resources, including an indication of the paged WTRU group as well as the corresponding paging search sub-space to be monitored. In a third step, the ULP receiver decoding a true paging indication, and determining the corresponding search sub-space. The ULP receiver triggering the activation of the conventional receiver and accordingly, the conventional receiver monitoring, and blindly decoding the determined paging sub-space. Upon detecting a WTRU paging, the conventional receiver triggers the RACH signaling for RRC connection establishment/resume.

ULP Paged WTRU Specific Configuration Provisioning

For the conventional paging procedure, NAS may provide a WTRU specific DRX via NAS signaling as follows. Firstly, WTRU provides AMF with the preferred DRX cycle in REGISTRATION REQUEST message via "Requested DRX parameters" information element and then AMF sends back a WTRU specific DRX in REGISTRATION ACCEPT with "Negotiated DRX parameters" information element.

The "Negotiated DRX parameters" provides the duty cycle information (denoted as "T" in TS 38.304).

If NAS does not provide WTRU the WTRU specific DRX, then WTRU uses a default paging cycle configuration given by AS (SIB1's PCCH-Config nested in Downlink-CommonConfig IE).

For the ULP paged WTRU specific configuration provisioning, at least one of the Uu cell's System Information Block (SIB) needs to be updated or a new SIB needs to be added to signal the "ULP paged WTRU specific DRX" configuration.

Then, the expected WTRU behavior (ULP paged WTRU specific DRX is used if WTRU was paged via paging indication at ULP cell and WTRU has moved into the Uu cell) needs to be defined in specification (e.g., 3GPP TS 38.331)

In addition to the AS spec update, the NAS spec (TS 24.501) may need to be updated with the following change; "5GS DRX Parameters" information element (defined in subclause 9.11.3.2A of TS 24.501) is updated to add ULP specific paging cycle value(s), e.g., "ULP 10 ms", "ULP 20 ms" or "ULP Oms", which the latter implies ULP WTRU can be paged at any time without waiting for any duty cycle. With this NAS spec modification, not only AS but also NAS would know the WTRU's ULP capability and can expect the ULP capable WTRU to respond to the paging indication much quicker than the conventional WTRUs.

ULP-Based Paging Configuration Variants: On-Demand Paging Configurations

This subsection covers and enables the on-demand paging configurations for both the ULP receiver and conventional receivers of the WTRU. In this approach, when ULP is enabled within a cell, set of cells (e.g., in a notification or a tracking area), or in the network, it will continuously monitor a channel for potential paging indication, DCI, and/or messages for a quick paging response. The conventional receivers of the WTRU may also be configured with an on-demand paging monitoring that is kept deactivated unless the ULP device received a true paging indication requiring further conventional paging monitoring. Additionally, the legacy/long duty-cycle monitoring of the conventional receivers of WTRU may be activated as a fallback solution.

When the ULP receiver successfully receives a ULP-Paging-Indication, the WTRU wakes the conventional radio up to monitor and receive a potentially intended paging DCI and/or message. The paging indication received by the ULP may contain indications on the configuration and on the signal(s)/message(s) that the WTRU device should receive (e.g., a search space, a resource, a type of message etc.).

Based on the paging configuration, the power consumption of the conventional device may be reduced as the conventional receiver, which consumes most of the power, may be activated only after the ULP has successfully received a paging indication, and the device can receive the intended paging message/record shortly after the initial paging of the ULP receiver.

The RAN and/or Core network may configure a WTRU with a newly specified paging monitoring configuration supporting Low-Power Paging with On-Demand Paging Monitoring Configured Traditional Receiver (OD-PMC-Rx) where ULP receivers are used to receive on-demand paging indication and conventional receivers are configured/signaled with an on-demand paging monitoring configuration for a pre-specified/signaled duration. Conventional receivers are also configured with a legacy/long duty cycle for fallback paging reception operation. The RAN and/or Core network may also provide parameters or configuration that assist the WTRU in deciding on when to switch between and utilize the conventional versus ULP receiver for paging reception.

According to a first embodiment, a ULP receiver can be configured to receive on-demand paging indication, DCI and/or messages. In a first step, the WTRU's ULP capability of the receiver is exchanged with the network though configuration and the network configures the ULP with which type of message it will be expected to receive. This configuration exchange may be done through, e.g., RRC configuration and/or SIB messages. For example, the ULP receivers may be configured to receive any of the following:

on-demand paging indication;
on-demand paging DCI;
on-demand paging message.

The on-demand paging indication of the ULP (e.g., LP-WUS) can be in the form of a preconfigured sequence, that can be identified by the ULP with any identification of the device, e.g., the permanent or temporary IDs of the ULP or legacy receiver of the device, or an identification of a group based on these.

The configuration of the format of the sequence and content can be predefined and/or signaled by RRC configurations and/or SIB messages. It includes the frequency configuration of where to expect the LP-paging indication. As an on-demand paging indication, the paging signal/message does not have to be specifically placed in predefined paging occasions and can be transmitted at any time.

The configuration may include resource restriction for the on-demand paging, mainly in the frequency domain. This restriction allows a better focus of the ULP device and better processing efficiency. This frequency restriction can be any of a set of frequency resources, a bandwidth part, some subchannels, etc. When configured with frequency restrictions, the ULP device is not expected to receive paging indications outside of theses. The network can assign different frequencies to different ULP devices/device groups. When the LP paging indication is configured to be in-band (i.e., in the same band as an active Uu band), the LP paging indication may be shaped (in time/frequency domain) similarly with the conventional Uu physical channels, in particular, be similar with conventional PDCCH and/or PDSCH, so that other users are not impacted with the low-power paging and so that it can be scheduled by the network with ease. However, to save some energy and processing time, ULP-capable WTRUs may not expected to monitor for paging indications when the network is configured to transmit other signals when such signals are not used by the low-power paging receivers. For instance, the ULP can (if possible) skip the monitoring of UL slots, PDCCH channels that cannot contain LP-paging indication, SSB that are not tracked, etc. Alternatively, when low power physical signals/channels require different scheduled resources' format, e.g., time domain granularity is different, the network may still be required to match low power signals around the resources utilized by other legacy signals/channels such as SSBs and PDCCH channels.

In a second step, the ULP device is configured to monitor the on-demand Paging DCI search space, that may constitute a set of frequency resources defined in terms of, e.g., control channel elements (CCE), resource element groups (REG), and/or aggregation level, and a set/duration of time resources defined in terms of (OFDM) symbols, slots, and/or frames. The on-demand Paging DCI search space configuration can be obtained through predefined settings, SIB/RRC configurations and based on/inferred by the reception of a LP-WUS. For instance, the position in the time/frequency domain of the LP-WUS can indicate that the LP-PDCCH's paging DCI will occur in specific set or subset of the search space, such as a (pre)configured time offset between the LP-WUS and the LP-PDCCH's paging DCI. The LP-PDCCH's paging DCI can be a message scrambled with a P-RNTI, based on the permanent or temporary identity of the ULP and/or of the Uu receiver.

In a third step, if the ULP receiver is capable of and configured to receive on-demand paging messages associated with the on-demand paging DCI, it will therefore monitor the LP-PDSCH channel associated with the received DCI for the paging message itself.

In an alternative third step, if the ULP receiver is not capable of or is not configured to receive on-demand paging messages, the device wakes the conventional receiver up and activates the on-demand paging message reception based on the received PDSCH configuration in the paging DCI.

In another alternative to second and third steps, the conventional receiver of the WTRU device may be configured to receive the on-demand paging DCI and the corresponding paging message/record. The on-demand Paging messages and paging DCI (in PDSCH and PDCCH) search space may constitute a set of frequency resources defined in terms of, e.g., control channel elements (CCE), resource element groups (REG), and/or aggregation level, and a set/duration of time resources defined in terms of (OFDM) symbols, slots, and/or frames. The on-demand Paging DCI search space and its corresponding PDSCH configuration can be obtained through predefined settings, SIB/RRC configurations and based on/inferred by the reception of a LP-WUS. For instance, the position in the time/frequency domain of the LP-WUS can indicate that the DCI will occur in specific set or subset of the search space, such as a (pre)configured time offset between the LP-WUS and the DCI and a frequency position based on the frequency position of the LP-WUS.

The conventional receivers of the WTRU device are configured with long duty-cycle PO monitoring, where the device turns on to check for paging indications and would trigger the fallback reception operation.

According to a second embodiment, a ULP receiver of a WTRU, receiving an on-demand ULP paging according to the configured on-demand ULP paging and ULP WTRU-ID. Upon a true paging indication, based on either the LP-WUS, and/or LP-Paging indication, LP-PDCCH, and/or LP-PDSCH's paging message (paging record), the ULP receiver triggers awaking up signal to the conventional receiver such as it pre-synchronizes with the Uu RAN interface/network and subsequently initiates the Uu RAN connection establishment/resume procedure. Alternatively, the conventional receiver adopts a configured on-demand Uu paging cycle to support a faster paging detection and decoding, on the condition that paging DCI monitoring over the PDCCH is triggered by the ULP receiver detecting a paging indication over the LP-PDCCH channel. The conventional Uu receiver, subsequently, pre-synchronizes with the RAN interface, e.g., in case the sync retention is about to expire. In a next step, the conventional Uu receiver decodes the paging DCI and the subsequent paging message, i.e., paging record transmitted over the PDSCH. On the condition that a configured unique/group ID is detected, the WTRU initiates the Uu RAN connection establishment/resume procedure.

ULP Paged WTRU Specific DCI Monitoring Configuration

RAN configures ULP paged WTRU specific DCI and/or paging record (on-demand) monitoring configuration, which includes any of an offset from when ULP paging indication (e.g., LP-WUS, LP-early paging indication, LP-paging early indication) is received, number of paging DCI/message (record) transmissions, and time separation between transmitted paging DCI/message(record) repetitions. The ULP paged WTRU specific DCI/paging message(record), on-demand, monitoring configuration are enabled only if a ULP paging indication (or paging DCI over LP-PDCCH) is detected using the ULP receiver. The ULP paged WTRU specific DCI/paging message(record) monitoring configuration may be distributed based on a WTRU (ULP-specific) identifier, such as ULP-TMSI, SUPI or a RNTI assigned for the ULP operation.

ULP Paged WTRU Specific Search Space

Like Section "ULP based Paging Procedures: Group-Specific WUS or Paging DCI without Feedback", RAN configures ULP paged WTRU specific search space, where the WTRU monitors the paging occasions (configured paging DCI and/or paging message/record transmission instances) in the search space to receive the paging DCI/message(record). The search space may be independent from and/or multiplexed with the conventional paging search space.

The abovementioned ULP specific paging and/or ULP specific search space configurations would be provided as part of ULP configuration from RAN and the solutions can be solely configured or both solutions can be configured simultaneously. Those configurations include the ULP-specific paging sequence set of sequences, each for a certain ULP-WTRU-ID (e.g., unique, or group-based ID), in case of the ULP paging indication is defined as an SSS-based sequence. For the DCI-based ULP paging, a set of various scrambling codes are defined where each is associated with a certain ULP-WTRU-ID (e.g., unique, or group-based ID). For a certain scrambled-CRC DCI-based paging indication, a single ULP WTRU ID may be to correctly decode the CRC associated with the paging DCI.

ULP Paged WTRU Specific Search Sub-Space(s)

Like Section "ULP based Paging Procedures: Group-Specific WUS or Paging DCI without Feedback", the ULP-specific paging indication incorporates information on the one or more paging DCI search space(s)/sub-space(s) which the conventional receiver shall monitor upon the ULP receiver detecting a true ULP-group paging indication.

The idea in this subsection entails a ULP receiver, configured with an on-demand ULP paging, detecting and blindly decoding a ULP-specific paging indication, including information on the paging DCI search space(s)/sub-space(s) which the conventional receiver of the WTRU needs to monitor in order to determine if it is paged or not. Upon detecting a true ULP paging indication, the ULP receiver triggers a wake up of the conventional receiver, indicating the determined paging search space/sub-space of the paging DCI/PDCCH to be monitored by the conventional receiver. The intuition is that with the introduction of multiple limited paging search spaces, e.g., sub-spaces, for each paging group, the conventional receivers of the WTRUs which belong to the paged group perform a blind decoding of a more limited search space/sub-space size, relaxing the power consumption burden. The cost paid to achieve such power saving gain is the increased overhead for transmitting the ULP paging indication in order to indicate the paged WTRU paging group as well as the search sub-space to be monitored. The conventional receiver accordingly power ramps up and monitors the indicated paging search sub-space(s). If the WTRU has been paged, the conventional receiver finally triggers the RACH procedure.

In an embodiment, in a first step, a ULP-capable WTRU receiving the configurations of the on-demand ULP paging indication. In a second step, a ULP-capable WTRU monitoring and detecting the ULP paging indication resources, including an indication of the paged WTRU group as well as the corresponding paging search sub-space to be monitored. In a third step, the ULP receiver decoding a true paging indication, and determining the corresponding search sub-space. The ULP receiver triggering the activation of the conventional receiver and accordingly, the conventional receiver monitoring, and blindly decoding the determined paging sub-space. Upon detecting a WTRU paging, the conventional receiver triggers the RACH signaling for RRC connection establishment/resume.

ULP-Based Paging Configurations Variants: Hybrid Duty-Cycled and On-Demand Paging Configurations In this subsection, the ULP receivers are used to receive on-demand paging indication and the conventional receivers are configured with two duty-cycles. A short duty cycle for ULP-Paging-Indication support and a legacy/long duty cycle for fallback paging reception operation.

The ULP receiver constantly monitors the paging indication for a quick paging response and deactivates the short duty-cycle of the conventional radio until it receives an ULP indication. The conventional radio short duty-cycle is activated when the ULP received a true paging indication. The legacy/long duty-cycle monitoring of the conventional receivers of the WTRU is kept activated as a fallback solution.

The ULP consumption being low compared to the conventional device, this allows the device to be paged at any time while keeping the energy consumption much lower than legacy. This consumes slightly more energy than when the ULP device uses a duty-cycle itself but allows for faster and more flexible paging.

According to a first embodiment, a ULP receiver can be configured to receive on-demand paging indication, DCI and/or messages. In a first step, the WTRU's ULP capability of the receiver is exchanged with the network though configuration and the network configures the ULP with which type of message it will be expected to receive. This configuration exchange may be done through, e.g., RRC configuration and/or SIB messages. For example, the ULP receivers may be configured to receive any of the following:

- on-demand paging indication
- on-demand paging DCI, and/or
- on-demand paging message The on-demand paging indication of the ULP (e.g., LP-WUS) can be in the form of a preconfigured sequence, that can be identified by the ULP with any identification of the device, e.g., the permanent or temporary IDs of the ULP or legacy receiver of the device, or an identification of a group based on these.

The configuration of the format of the sequence and content can be predefined and/or performed by RRC configurations and/or SIB messages. It includes the frequency configuration of where to expect the LP-paging indication. As a on-demand paging indication, the paging is not specifically placed in predefined paging occasions and can be transmitted at any time.

The configuration can include resource restriction for the on-demand paging, mainly in the frequency domain. This restriction allows a better focus of the ULP device and better processing efficiency. This frequency restriction can be a set of frequency resources, a bandwidth part, some subchannels, etc. When configured with frequency restrictions, the ULP device is not expected to receive paging indications outside of theses. The network can assign different frequencies to different ULP devices.

When the LP paging indication is configured to be in-band (i.e., in the same band as an active Uu band), the LP paging indication can be shaped (in time/frequency domain) similarly with the conventional Uu physical channels, in particular, be similar with conventional PDCCH and/or PDSCH, so that other users are not impacted with the low-power paging and so that it can be scheduled by the network with ease. However, to save some energy and processing time, it is not expected to monitor for paging indications when the network is configured to transmit other signals when such signals are not used by the low-power paging receives. For instance, the ULP can skip the monitoring of UL slots, PDCCH channels that cannot contain LP-paging indication, SSB that are not tracked, etc.

In a second step, the ULP device is configured to monitor the on-demand Paging DCI search space, that may constitute a set of frequency resources defined in terms of, e.g., control channel elements (CCE), resource element groups (REG), and/or aggregation level, and a set/duration of time resources defined in terms of (OFDM) symbols, slots, and/or frames. The on-demand Paging DCI search space configuration can be obtained through predefined settings, SIB/RRC configurations and based on/inferred by the reception of a LP-WUS. For instance, the position in the time/frequency domain of the LP-WUS can indicate that the LP-PDCCH's will occur in specific set or subset of the search space, such as a (pre)configured time offset between the LP-WUS and the LP-PDCCH's paging DCI.

The LP-PDCCH's paging DCI can be a message scrambled with a P-RNTI, based on the permanent or temporary identity of the ULP and/or of the Uu receiver.

In a third step, if the ULP receiver is capable of and configured to receive on-demand paging messages associated with the on-demand paging DCI, it will therefore monitor the LP-PDSCH channel associated with the received DCI for the paging message itself.

In an alternative third step, if the ULP receiver is not capable of or is not configured to receive on-demand paging messages, the device wakes the conventional receiver up and activates the duty-cycle based paging message reception based on the received PDSCH configuration in the paging DCI.

In another alternative to second and third steps, the conventional receiver of the WTRU device may be configured to receive the on-demand paging DCI and the corresponding paging message/record. The on-demand Paging messages and paging DCI (in PDSCH and PDCCH) search space may constitute a set of frequency resources defined in terms of, e.g., control channel elements (CCE), resource element groups (REG), and/or aggregation level, and a set/duration of time resources defined in terms of (OFDM)

symbols, slots, and/or frames. The on-demand Paging DCI search space and its corresponding PDSCH configuration can be obtained through predefined settings, SIB/RRC configurations and based on/inferred by the reception of a LP-WUS. For instance, the position in the time/frequency domain of the LP-WUS can indicate that the DCI will occur in specific set or subset of the search space, such as a (pre)configured time offset between the LP-WUS and the DCI and a frequency position based on the frequency position of the LP-WUS.

In a fourth step, the conventional receiver of the WRTU device is configured with two duty-cycle PO monitoring:

a short cycle PO monitoring that is used to assist the ULP and receive messages a legacy/long duty cycle for fallback paging reception operation.

The conventional receivers of the WRTU device are configured with a short cycle PO monitoring. The PO search space may constitute a set of frequency resources defined in terms of, e.g., control channel elements (CCE), resource element groups (REG), and/or aggregation level, and a set/duration of time resources defined in terms of OFDM symbols. These are configured by predefined settings and RRC configuration and can also be based on the LP-WUS/LP-DCI received by the ULP receiver of the device. For instance, when the legacy receiver short duty-cycle monitoring is reactivated upon reception of a LP-WUS or LP-DCI, the PO or PO subset to be monitored can be based on the signal position or content. Typically, a minimum time can be defined for the next PO monitoring to ensure the time to wake the legacy radio on and ensure synchronization. A subset of the PO can be selected based on the position or content of the LP signals to simplify and reduce the consumption of the legacy device.

The conventional receivers of the WRTU device are configured with long duty-cycle PO monitoring, where the device turns on to check for paging indications and would trigger the fallback reception operation.

According to a second embodiment, a ULP receiver of a WTRU, receiving an on-demand ULP paging according to the configured on-demand ULP paging and ULP WTRU-ID. Upon a true paging indication, based on either the LP-WUS, and/or LP-Paging indication, LP-PDCCH, and/or LP-PDSCH's paging message (paging record), the ULP receiver triggers a waking up signal to the conventional receiver such as it pre-synchronizes with the Uu RAN interface/network and subsequently initiates the Uu RAN connection establishment/resume procedure. Alternatively, the conventional receiver adopts a configured duty-cycled Uu paging monitoring to support a faster paging detection and decoding, on the condition that paging DCI monitoring over the PDCCH is triggered by the ULP receiver detecting a paging indication over the LP-PDCCH channel. The conventional Uu receiver, subsequently, pre-synchronizes with the RAN interface, e.g., in case the sync retention is about to expire. In a next step, the conventional Uu receiver decodes the paging DCI and the subsequent paging message, i.e., paging record transmitted over the PDSCH. On the condition that a configured unique/group ID is detected, the WTRU initiates the Uu RAN connection establishment/resume procedure.

Exemplary Embodiments

Figure 12:
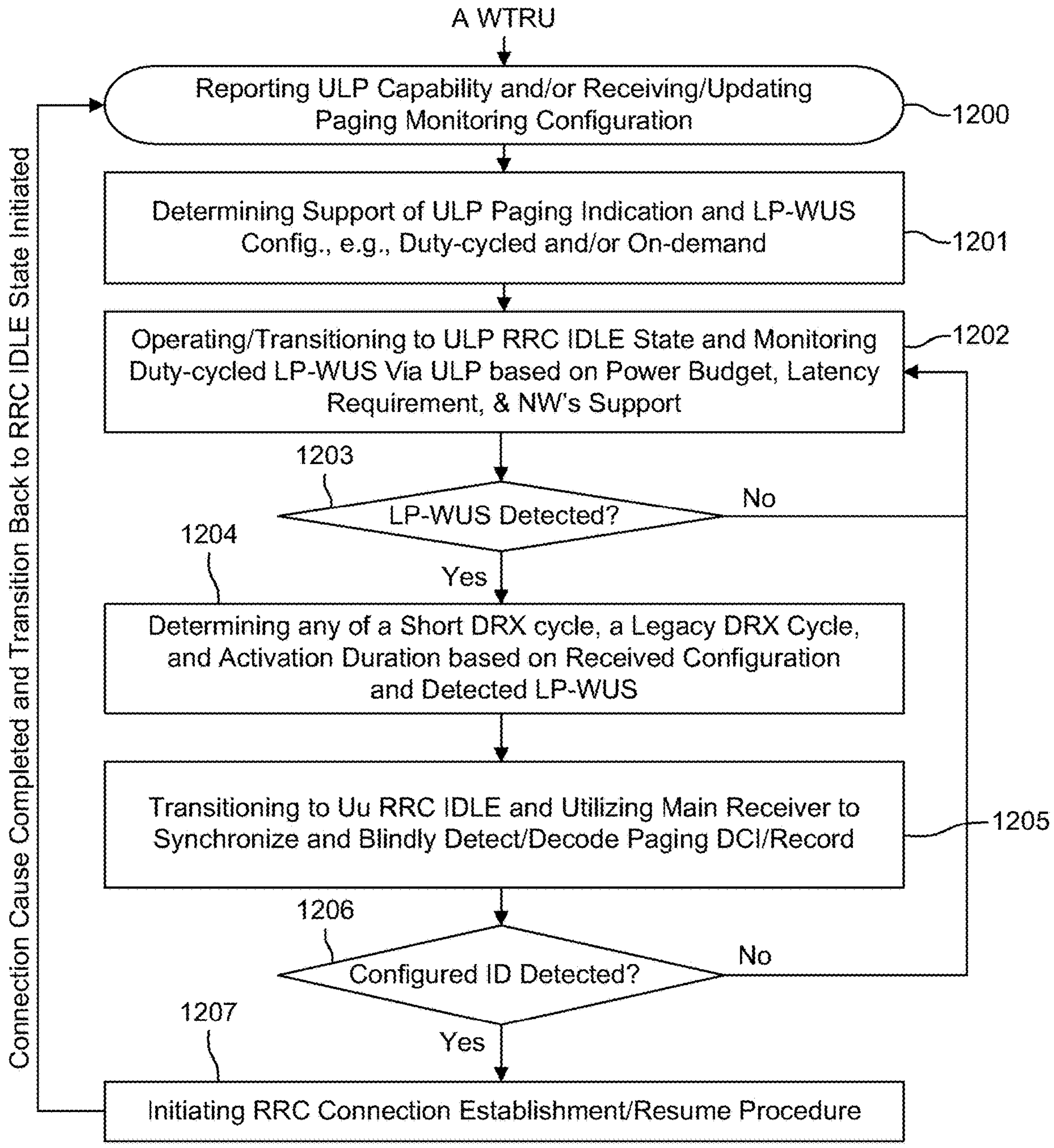
FIG. 12 is an exemplary ULP paging procedure supporting dual duty cycle configuration of the conventional receiver to enable on-demand/short duty-cycled ULP paged operation.

According to an exemplary embodiment exemplified in FIG. 12, a ULP receiver capable WTRU supporting dual duty cycle configuration of the conventional receiver to enable on-demand/short duty-cycled ULP paged operation:

reporting (1200) its ULP capability and receiving paging monitoring configuration/parameters in any of system information, RRC signaling, and NAS messages;

determining (1201) support of ULP (early) paging indication as a LP-WUS transmission, with e.g., LP-SS/LP-WUS structure and transmission configuration including any of duty-cycled and on-demand monitoring configuration, within any of current serving cell and a set of cells in a defined area;

operating (1202) in a ULP RRC IDLE/INACTIVE state, e.g., monitoring the channel using the ULP for LP-WUS detection, where channel monitoring can be duty-cycled or continuous, based on WTRU's current power consumption budget, paging latency requirement, and network's support and configuration;

detecting (1203) a LP-WUS addressed to a configured group based on assigned permanent and/or temporary identifiers;

determining (1204) a short paging/DRX duty cycle and an activation duration/interval based on any of received paging DCI monitoring configuration over PDCCH and detected LP-WUS;

transitioning (1205) from ULP RRC IDLE/INACTIVE to Uu RRC IDLE/INACTIVE state, e.g., switching to PDCCH channel monitoring and decoding, within a maximum time duration specified/signaled by the network;

utilizing the conventional receiver and determined monitoring configuration to blindly detect and decode the paging DCI and corresponding paging message/record; and on condition that the WTRU detects (1206) any of its assigned/configured identifiers in the paging message/record, it initiates (1207) connection establishment/resume procedure.

Figure 13:
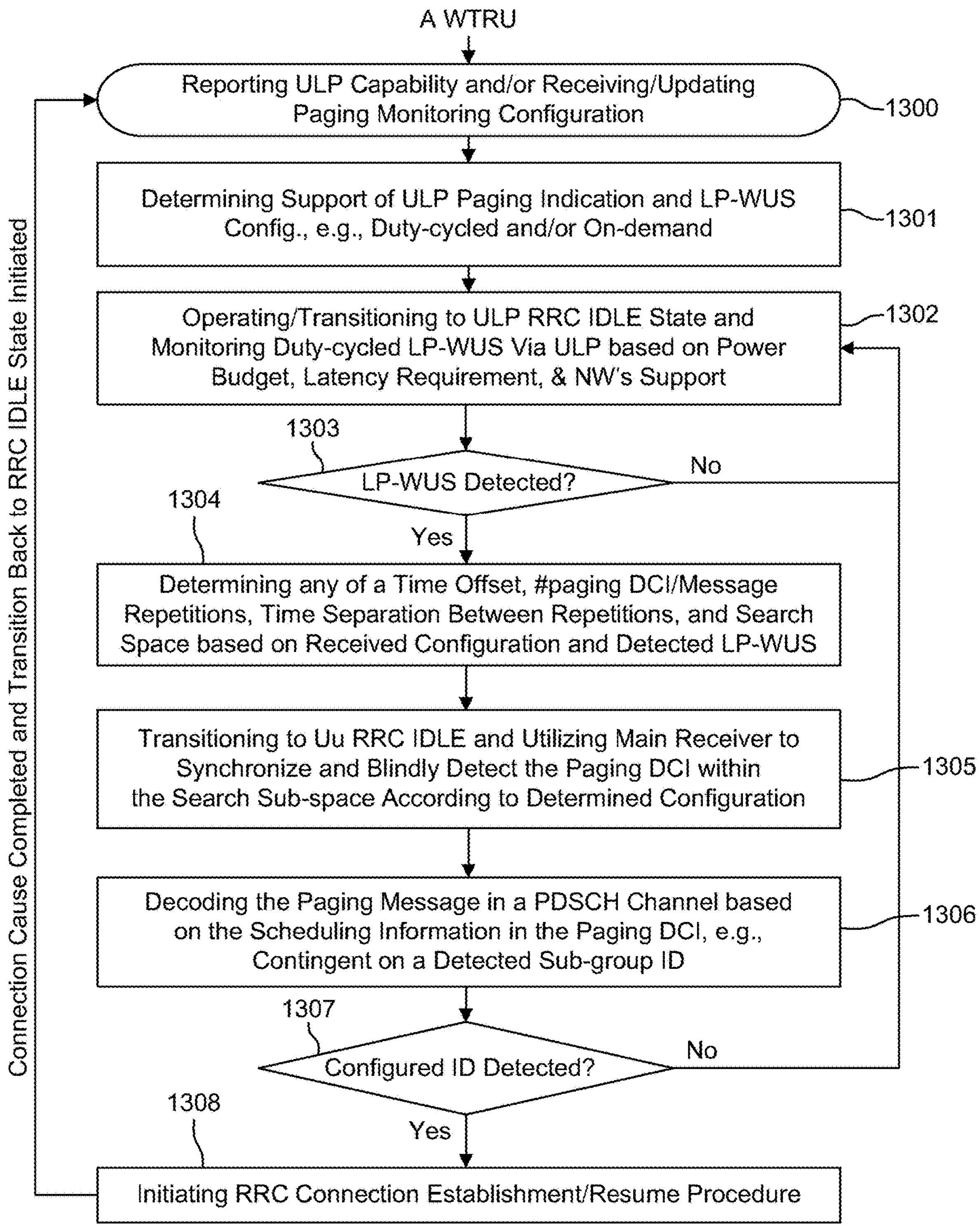
FIG. 13 is an exemplary ULP paging procedure supporting on-demand PDCCH channel configuration for paging DCI detection and decoding.

According to another exemplary embodiment exemplified in FIG. 13, a ULP receiver capable WTRU supporting on-demand PDCCH channel configuration for paging DCI detection and decoding, reporting (1300) its ULP capability and receiving paging monitoring configuration/parameters in any of system information, RRC signaling, and NAS messages;

determining (1301) support of ULP (early) paging indication as a LP-WUS transmission, with e.g., LP-SS/LP-WUS structure and transmission configuration including any of duty-cycled and on-demand monitoring configuration, within any of current serving cell and a set of cells in a defined area;

operating (1302) in a ULP RRC IDLE/INACTIVE state, e.g., monitoring the channel using the ULP for LP-WUS detection, where channel monitoring can be duty-cycled or continuous, based on WTRU's current power consumption budget, paging latency requirement, and network's support and configuration;

detecting (1303) a LP-WUS addressed to a configured group based on assigned permanent and/or temporary identifiers;

determining (1304) a time offset, number of paging DCI and message repetitions, time separation between repetitions, and search space based on any of received paging DCI monitoring configuration over PDCCH and detected LP-WUS;

transitioning (1305) from ULP RRC IDLE/INACTIVE to Uu RRC IDLE/INACTIVE state, e.g., switching to PDCCH monitoring and decoding, within a maximum time duration specified by the determined time offset from when the LP-WUS is detected;

utilizing the conventional receiver and determined monitoring configuration to blindly detect and decode the paging DCI (1305) and corresponding paging message/record (1306); and on condition that the WTRU detects (1307) any of its assigned/configured identifiers in the paging message/record, it initiates (1308) connection establishment/resume procedure.

Figure 14:
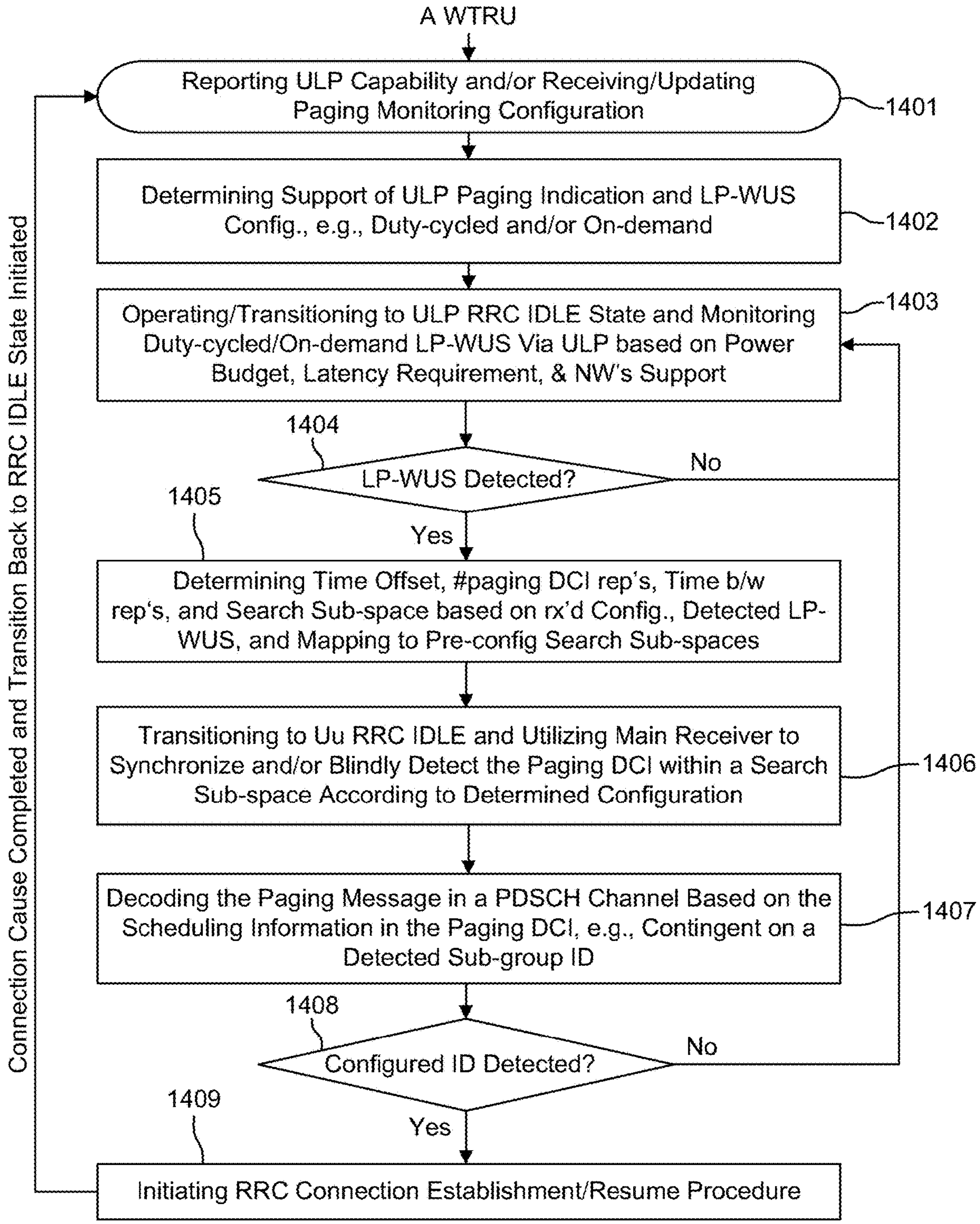
FIG. 14 is an exemplary ULP paging procedure supporting PDDCH channel's search sub-space indication (received by the ULP receiver) for efficient paging DCI detection and decoding.

According to another exemplary embodiment exemplified in FIG. 14, a ULP receiver capable WTRU supporting PDDCH channel's search sub-space indication (received by the ULP receiver) for efficient paging DCI detection and decoding, reporting (1401) its ULP capability and receiving paging monitoring configuration/parameters in any of system information, RRC signaling, and NAS messages;

determining (1402) support of ULP (early) paging indication as a LP-WUS transmission, with e.g., LP-SS/LP-WUS structure and transmission configuration including any of duty-cycled and on-demand monitoring configuration, within any of current serving cell and a set of cells in a defined area;

operating (1403) in a ULP RRC IDLE/INACTIVE state and monitoring the channel using the ULP for LP-WUS detection where channel monitoring can be duty-cycled or continuous based on WTRU's current power consumption budget, paging latency requirement, and network's support;

detecting (1404) a LP-WUS addressed to a configured group based on assigned permanent and/or temporary identifiers;

determining (1405) any of a short paging/DRX duty cycle, an activation duration/interval, a time offset, number of paging DCI and message repetitions, time separation between repetitions, and search sub-space based on any of received paging DCI monitoring configuration over PDCCH, detected LP-WUS, and mapping to preconfigured search sub-spaces;

transitioning (1406) from ULP RRC IDLE/INACTIVE to Uu RRC IDLE/INACTIVE state within a maximum time duration signaled by the network or specified by the determined time offset from when the LP-WUS is detected;

utilizing the conventional receiver and determined monitoring configuration to blindly detect and decode (1407) the paging DCI and corresponding paging message/record; and on condition that the WTRU detects (1408) any of its assigned/configured identifiers in the paging message/record, it initiates (1409) connection establishment/resume procedure.

Figure 15:
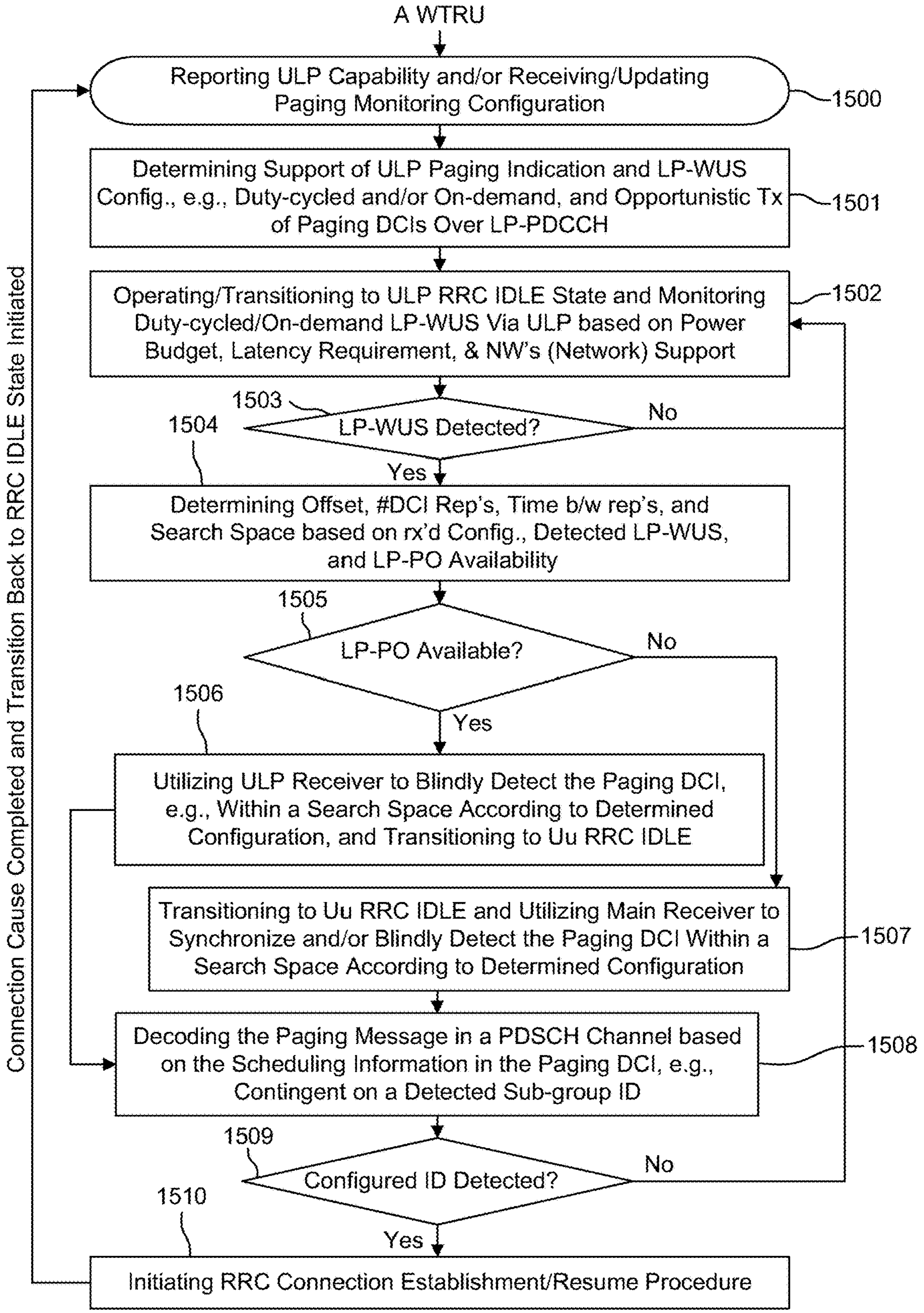
FIG. 15 is an exemplary ULP paging procedure supporting dynamic switch between ULP and Uu channels for paging based on opportunistic availability of the ULP channels.

According to another exemplary embodiment exemplified in FIG. 15, a ULP receiver capable WTRU supporting dynamic switch between ULP and Uu channels for paging based on opportunistic availability of the ULP channels, reporting (1500) its ULP capability and receiving paging monitoring configuration/parameters in any of system information, RRC signaling, and NAS messages;

determining (1501) support of ULP (early) paging indication as a LP-WUS transmission and opportunistic transmission of paging DCIs over LP-PDCCH, with e.g., LP-SS/LP-WUS structure and transmission configuration, within any of current serving cell and a set of cells in a defined area;

operating (1502) in a ULP RRC IDLE/INACTIVE state, e.g., monitoring the channel using the ULP for LP-WUS detection, where channel monitoring can be duty-cycled, based on WTRU's current power consumption budget, paging latency requirement, and network's support and configuration;

detecting (1503) a LP-WUS addressed to a configured group based on configured/assigned group identifiers;

determining (1504, 1505) presence of a LP-PO opportunity based on the detected LP-WUS and utilizing the LP-PO configuration and the ULP receiver to decode the paging DCI (1506);

On a condition that the paging DCI is successfully decoded (and a configured sub-group identifier is detected, if available), determining (1506, 1508) the paging message transmission configuration;

Transitioning (1506) from ULP RRC IDLE/INACTIVE to Uu RRC IDLE/INACTIVE state, e.g., switching to PDSCH decoding (1508), within a maximum time duration based on the paging message's scheduling information.

Otherwise, transitioning (1507) from ULP RRC IDLE/INACTIVE to Uu RRC IDLE/INACTIVE state, e.g., switching to PDCCH/PDSCH monitoring and decoding, within a maximum time duration signaled by the network or specified by a determined time offset from when the LP-WUS is detected.

utilizing (1508) the conventional receiver and determined paging message transmission configuration to decode the paging record; and on condition that the WTRU detects (1509) any of its assigned/configured identifiers in the paging message/record, it initiates (1510) connection establishment/resume procedure.

Figure 16:
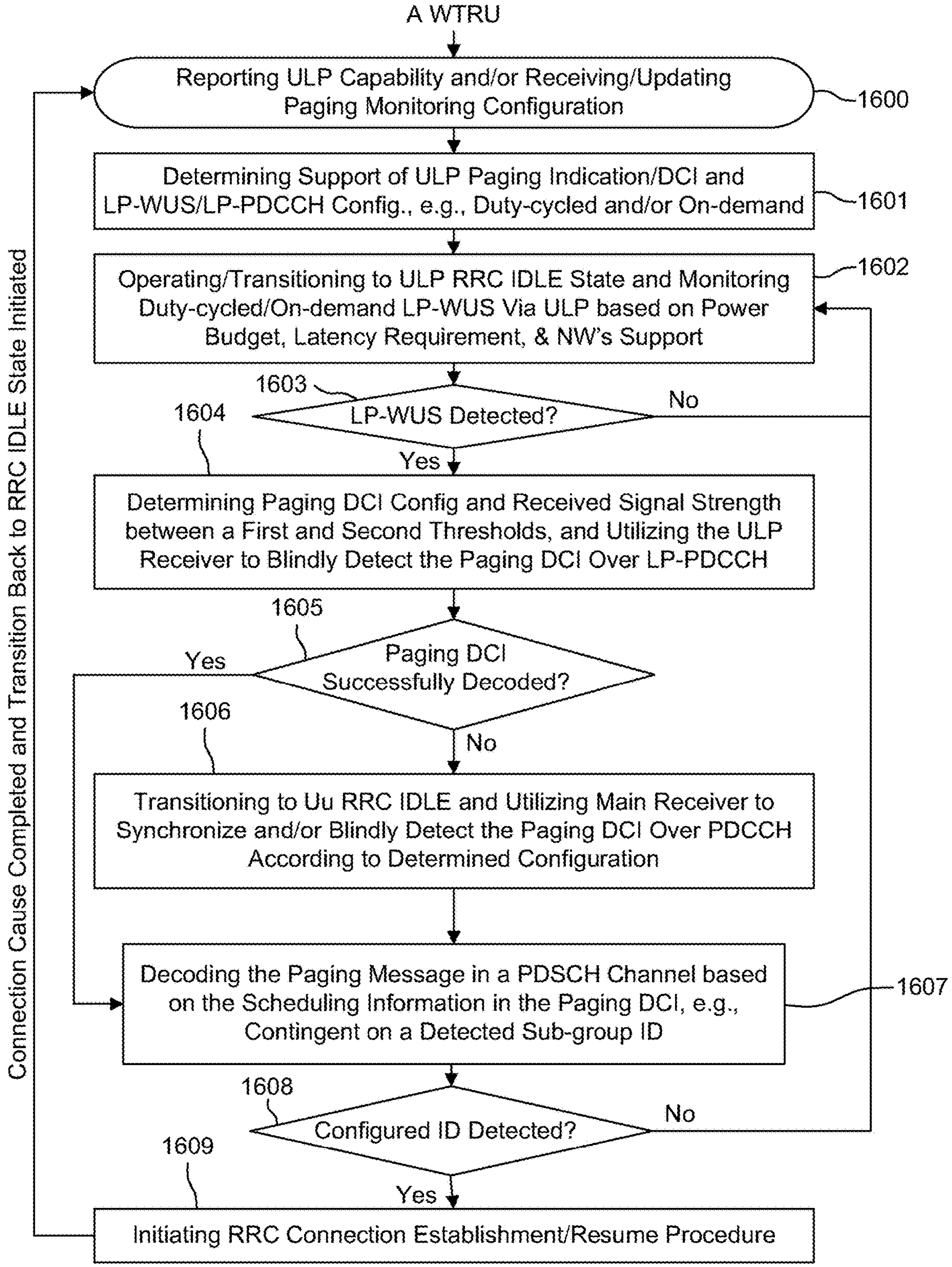
FIG. 16 is an exemplary ULP paging procedure supporting dynamic switch between ULP and Uu channels for paging based on received signal strength (signal-to-noise ratio)

According to another exemplary embodiment exemplified in FIG. 16, a ULP receiver capable WTRU supporting dynamic switch between ULP and Uu channels for paging based on received signal strength (signal-to-noise ratio), reporting (1600) its ULP capability and receiving paging monitoring configuration/parameters in any of system information, RRC signaling, and NAS messages;

determining (1601) support of ULP (early) paging indication as a LP-WUS transmission and paging DCIs transmission over LP-PDCCH, with e.g., LP-SS/LP-WUS structure and transmission configuration, within any of current serving cell and a set of cells in a defined area;

operating (1602) in a ULP RRC IDLE/INACTIVE state, e.g., monitoring the channel using the ULP for LP-WUS detection, where channel monitoring can be duty-cycled, based on WTRU's current power consumption budget, paging latency requirement, and network's support and configuration;

detecting (1603) a LP-WUS addressed to a configured group based on configured/assigned group identifiers and determining (1604) a received signal strength between a first and second thresholds based on a LP-SS used by the ULP for synchronization and/or the LP-WUS;

utilizing (1606) the conventional receiver and conventional/legacy synchronization signals, e.g., PSS and/or SSS in an SSB, to synchronize the conventional receiver;

utilizing (1604) the ULP receiver and the LP-PO configuration to decode the paging DCI in a LP-PDCCH channel;

On a condition that the paging DCI is not successfully decoded (1605), transitioning (1606) from ULP RRC IDLE/INACTIVE to Uu RRC IDLE/INACTIVE state, e.g., switching to PDCCH monitoring and decoding, within a maximum time duration signaled by the network or specified by a determined time offset from when the LP-WUS is detected.

utilizing the conventional receiver to detect the paging DCI and determined paging message transmission configuration to decode the paging record (1607); and on condition that the WTRU detects (1608) any of its assigned/configured identifiers in the paging message/record, it initiates (1609) connection establishment/resume procedure.

Figure 17:
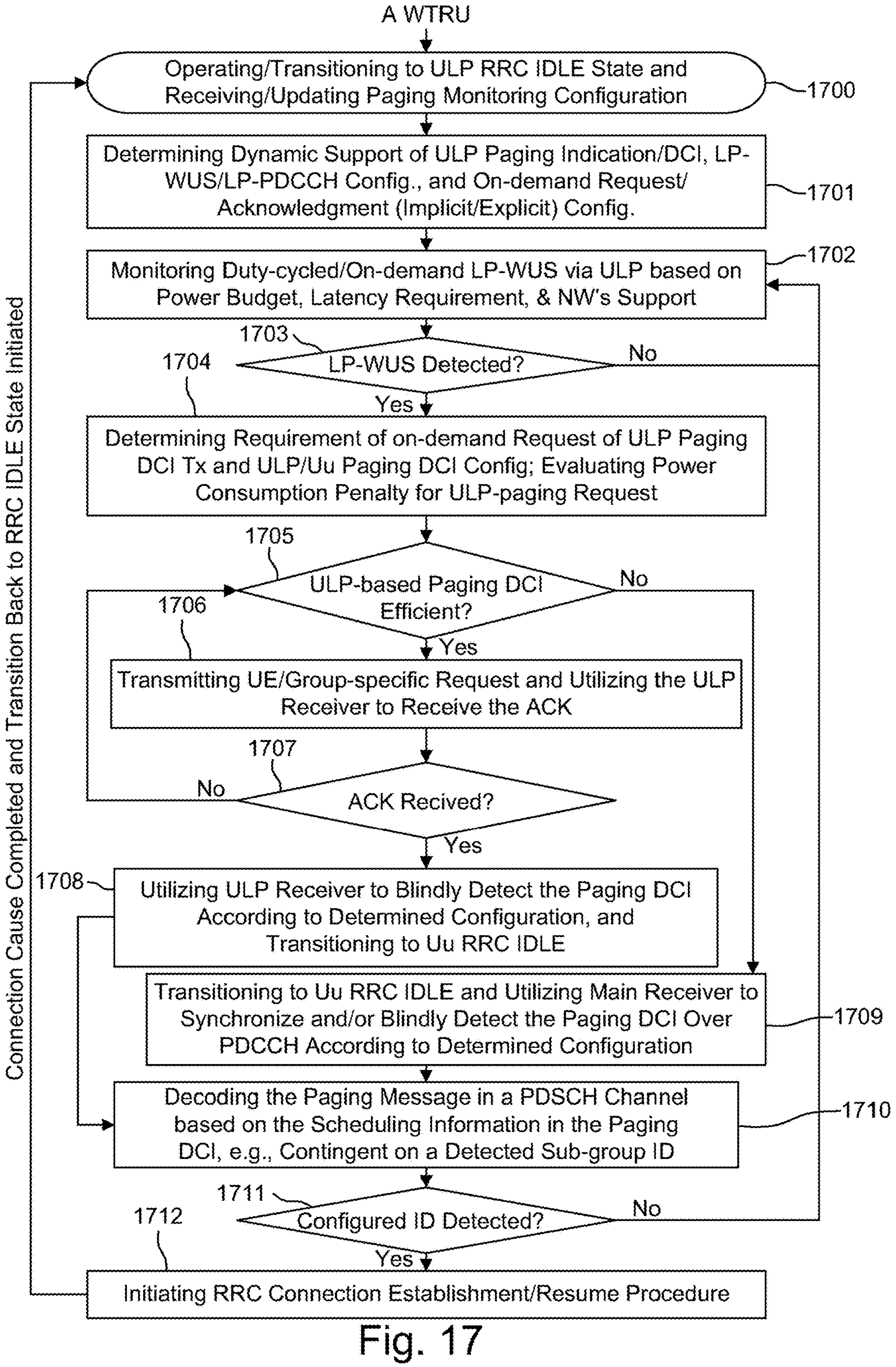
FIG. 17 is an exemplary ULP paging procedure supporting dynamic (on-demand) request to enable ULP channels for paging.

According to another exemplary embodiment exemplified in FIG. 17, a ULP receiver capable WTRU supporting dynamic (on-demand) request to enable ULP channels for paging, Operating (1700) in ULP RRC IDLE/INACTIVE state and receiving/updating paging monitoring configuration/parameters through, e.g., system information;

determining (1701) dynamic support of ULP (early) paging indication as a LP-WUS transmission and paging DCIs transmission over LP-PDCCH based on on-demand requests/feedback, as well as feedback type (WTRU/Group-specific) and feedback transmission occasions configuration and acknowledgment configuration (implicit/explicit), within any of current serving cell and a set of cells in a defined area;

monitoring (1702) the channel using the ULP for LP-WUS detection where channel monitoring can be duty-cycled based on WTRU's current power consumption budget, paging latency requirement, and network's support;

detecting (1703) a LP-WUS addressed to a configured group based on configured/assigned group identifiers and determining (1704) the need for feedback (on-demand request of ULP receiver paging) to receive the LP-PO and/or paging message over LP-PDCCH/LP-PDSCH based on detected LP-WUS;

evaluating (1704) power consumption penalty associated with ULP-paging on-demand request based on, e.g., WTRU's type, expected traffic, paging latency requirement, received signal strength, battery status, and/or mobility state;

determining (1705) efficiency of ULP-based paging (e.g., based on power consumption penalty evaluation) and transmitting (1706) a WTRU/group-specific on-demand request of ULP receiver paging according to received/signaled feedback transmission configuration;

utilizing (1708) the ULP receiver to receive an acknowledgment (1707) within a duration $T_{ULPReqAck}$ and the LP-PO configuration to blindly detect and decode the paging DCI in the LP-PDCCH channels;

On a condition that the paging DCI is successfully decoded (and a configured sub-group identifier is detected, if available), determining (1708) the paging message transmission configuration;

transitioning (1709) from ULP RRC IDLE/INACTIVE to Uu RRC IDLE/INACTIVE state within a maximum time duration based on the paging message's scheduling information.

utilizing the conventional receiver and determined paging message transmission configuration to decode (1710) the paging record; and on condition that the WTRU detects (1711) any of its assigned/configured identifiers in the paging message/record, it initiates (1712) connection establishment/resume procedure.

Figure 18:
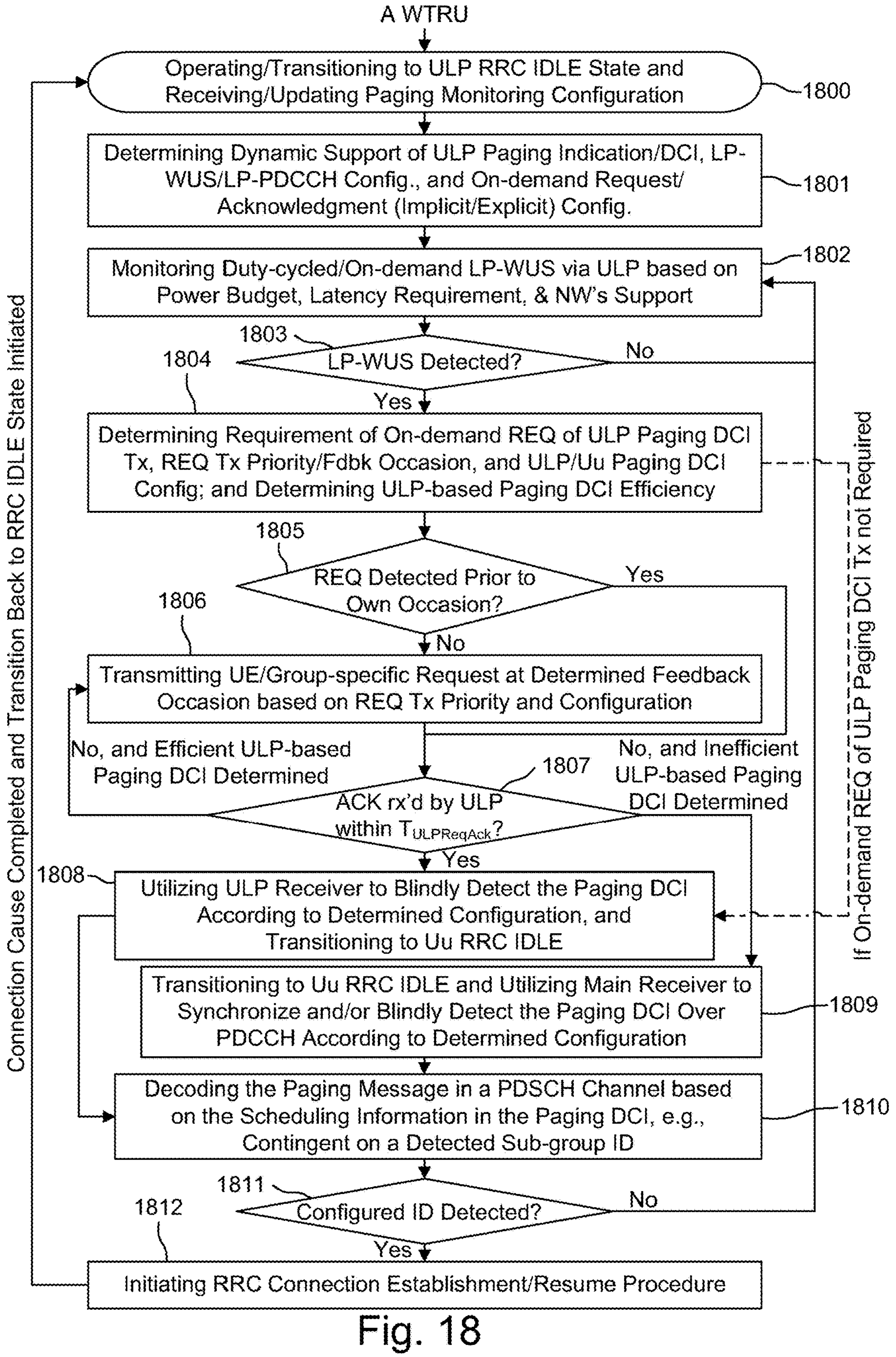
FIG. 18 is an exemplary ULP paging procedure supporting dynamic (on-demand) and Group-specific request to enable ULP channels for paging.

According to another exemplary embodiment exemplified in FIG. 18, a ULP receiver capable WTRU supporting dynamic (on-demand) and Group-specific request to enable ULP channels for paging, operating (1800) in ULP RRC IDLE/INACTIVE state and receiving/updating paging monitoring configuration/parameters through, e.g., system information;

determining (1801) dynamic support of ULP (early) paging indication as a LP-WUS transmission and paging DCIs transmission over LP-PDCCH based on on-demand requests/feedback, as well as feedback type (WTRU/Group-specific) and feedback transmission occasions configuration and acknowledgment configuration (implicit/explicit), within any of current serving cell and a set of cells in a defined area;

monitoring (1802) the channel using the ULP for LP-WUS detection where channel monitoring can be duty-cycled based on WTRU's current power consumption budget, paging latency requirement, and network's support;

detecting (1803) a LP-WUS addressed to a configured group based on configured/assigned group identifiers and determining (1804) the need for feedback (on-demand request of ULP receiver paging) to receive the LP-PO and/or paging message over LP-PDCCH/LP-PDSCH based on detected LP-WUS;

evaluating power consumption penalty associated with ULP-paging on-demand request based on, e.g., WTRU's type, expected traffic, paging latency requirement, received signal strength, battery status, and/or mobility state;

determining (1804) efficiency of ULP-based paging (e.g., based on power consumption penalty evaluation) and on-demand request/feedback transmission priority based on any of a desired power consumption budget, paging latency requirement, WTRU's type, expected traffic, received signal strength, and/or mobility state;

determining (1806) a feedback transmission occasion based on determined priority and monitoring (1805—Yes) all feedback occasions prior to its determined one.

On the condition that feedback signal(s), i.e., transmitted by other WTRU(s) that belong(s) to any of the configured group(s)/sub-group(s), is/are detected using the ULP and/or conventional receivers, refraining from on-demand request transmission on the determined/selected feedback occasion. NB the broken arrow (1804→1808) is a separate case when the WTRU determines that ULP paging is already enabled and on-demand request is not required.

utilizing (1808) the ULP receiver to receive an acknowledgment within a duration $T_{ULPReqAck}$ (1807) and the LP-PO configuration to blindly detect and decode the paging DCI in the LP-PDCCH channels;

On a condition that the paging DCI is successfully decoded (and a configured sub-group identifier is detected (1808) if available), determining the paging message transmission configuration;

transitioning (1809) from ULP RRC IDLE/INACTIVE to Uu RRC IDLE/INACTIVE state within a maximum time duration based on the paging message's scheduling information.

utilizing the conventional receiver and determined paging message transmission configuration to decode (1810) the paging record; and on condition that the WTRU detects any of its assigned/configured identifiers in the paging message/record (1811—Yes), it initiates (1812) connection establishment/resume procedure.

Figure 19:
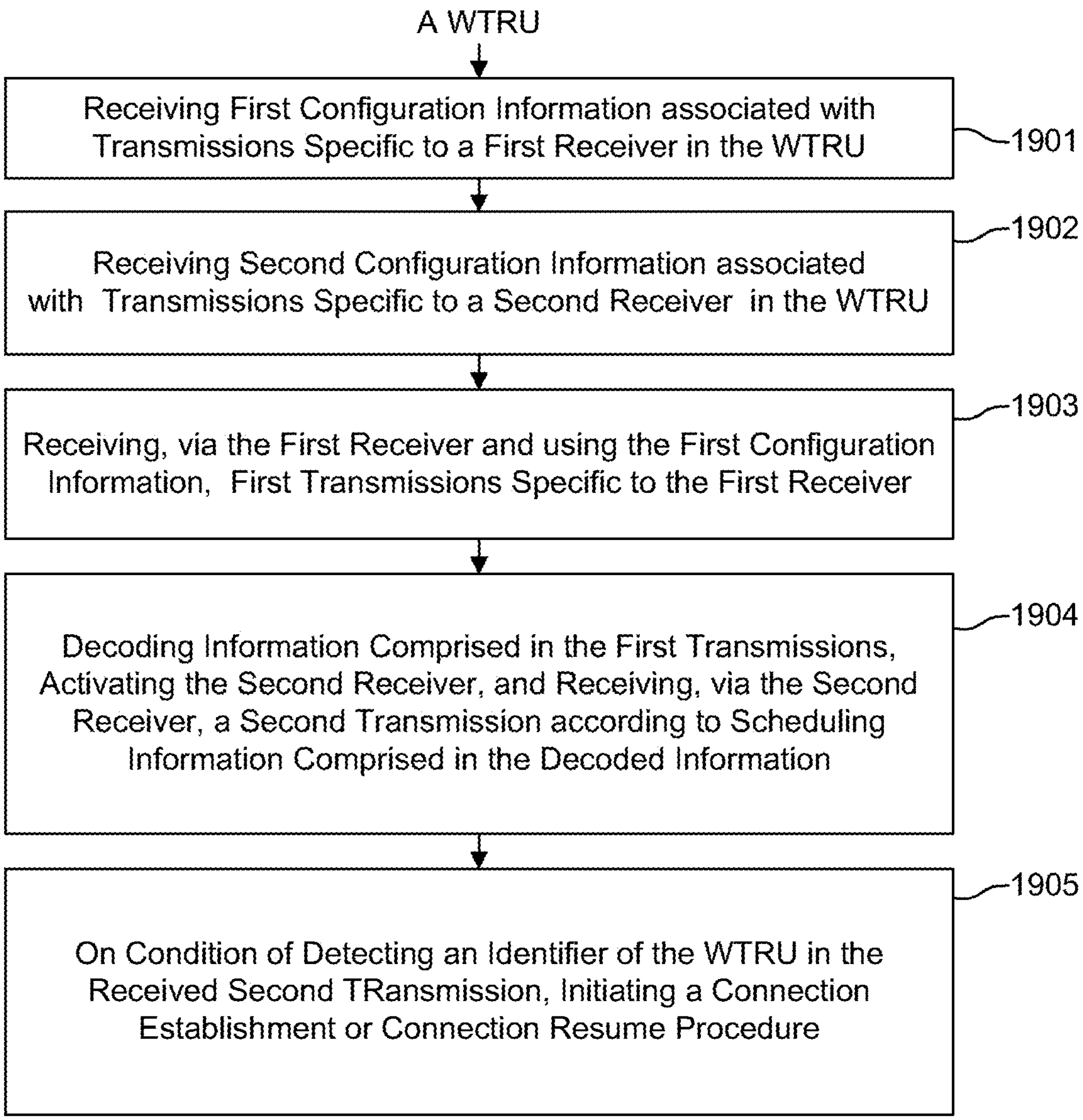
FIG. 19 is an exemplary method for (ultra-) low power paging.

According to another exemplary embodiment exemplified in FIG. 19, a method for (ultra-) low power paging is described. The method, implemented by a WTRU, includes:

receiving (1901) first configuration information associated with transmissions specific to a first receiver in the WTRU. The first receiver is for example an (U)LP receiver, and the transmissions specific to the first receiver, are for example a first signal specific to the (U)LP receiver such as an LP-WUS and a first physical downlink control channel transmission specific to the first receiver such as an LP-PDCCH;

receiving (1902) second configuration information associated with transmissions specific to a second receiver in the WTRU. The second receiver is for example an Uu or main (non-(U)LP) receiver, and the transmissions specific to the second receiver are for example conventional PDCCH;

receiving (1903), via the first receiver and using the first configuration information, first transmissions specific to the first receiver, e.g., the LP-WUS and the LP-PDCCH. The WTRU is for example in a ULP RRC IDLE/INACTIVE state and monitors the channel using the first receiver for LP-WUS detection;

decoding (1904) information comprised in the first transmissions (i.e., specific to the first receiver and received via the first receiver), activating (waking up, powering, powering-on, providing with power, supplying power to) the second receiver, and receiving, via the (activated, woken-up, powered, powered-on) second receiver, a second transmission according to scheduling information comprised in the decoded information. The information comprised in the transmissions specific to the first receiver and received via the first receiver is for example a paging DCI received over a LP-PDCCH, and the scheduling information is for example comprised in the decoded paging DCI, and the transmission according to scheduling information comprised in the decoded information is for example a PDSCH transmission; and on condition of detecting an identifier of the WTRU in the received second transmission, initiating (1905) a connection establishment or connection resume procedure.

According to an embodiment of the method the second receiver has a power consumption higher than the first receiver, and according to an embodiment of the method, the first receiver is configured to be powered by harvesting energy from the transmissions specific to the first receiver, and the second receiver is configured to be powered by a power supply comprised in the WTRU. The second receiver may for example have a power consumption of the conventional Uu or main receiver using active components, and the first receiver may for example have a power consumption of an (U)LP receiver, using passive components that process received RF waveforms collected through the antenna front-end by the receiving device in an (U)LP mode with minimal usage, or even absence, of active power supply. For example, the device may consider only passive RF components and harvest energy from the received RF waveform to run the signal processing circuitry, as described previously.

According to an embodiment of the method, the method includes, on condition of unsuccessful decoding the information comprised in the first transmissions, activating the second receiver, and receiving, via the second receiver, a third transmission comprising scheduling information for receiving, via the second receiver, the second transmission.

According to an embodiment of the method the transmissions specific to the first receiver are according to a first waveform modulation scheme specific for the first receiver. For example, a first waveform modulation scheme specific for energy harvesting and data/control transmission by the first receiver.

According to an embodiment of the method the transmissions specific to the second receiver are according to a second waveform modulation scheme specific for the second receiver. For example, a second waveform modulation scheme specific for data/control transmission by the second receiver.

According to an embodiment of the method, the first waveform modulation scheme is according to any of:

an on-off keying modulation scheme;

a frequency-shift keying modulation scheme.

According to an embodiment of the method, the first receiver is an ultra-low power receiver, and the second receiver is a Uu receiver.

According to an embodiment of the method, the method includes determining that a network supports ultra-low power paging operation, as a condition for activating the first receiver and for a deactivation of the second receiver.

According to an embodiment of the method, the determining support of ultra-low power paging operation by the network is for any of:

a current serving cell;

a group of cells;

a radio access network notification area;

a tracking area.

According to an embodiment of the method, the determining support of ultra-low power paging operation by the network is based on any of:

an information element in a received system information block;

a received radio resource control message;

a received non-access stratum message;

detecting a low-power synchronization signal;

detecting a low-power wake-up signal.

According to an embodiment of the method, the first receiver is configured to be powered by harvesting energy from the transmissions specific to the first receiver, and the second receiver is configured to be powered by a power supply comprised in the WTRU.

According to a further embodiment, there is disclosed a wireless transmit-receive unit, WTRU, the WTRU comprising at least one processor configured to:

receive first configuration information associated with transmissions specific to a first receiver in the WTRU. The first receiver is for example an (U)LP receiver, and the transmissions specific to the first receiver, are for example a first signal specific to the (U)LP receiver such as an LP-WUS and a first physical downlink control channel transmission specific to the first receiver such as an LP-PDCCH;

receive second configuration information associated with transmissions specific to a second receiver in the WTRU. The second receiver is for example an Uu or main (non-(U)LP) receiver, and the transmissions specific to the second receiver are for example conventional PDCCH;

receive, via the first receiver and using the first configuration information, first transmissions specific to the first receiver, e.g., the LP-WUS and the LP-PDCCH. The WTRU is for example in a ULP RRC IDLE/INACTIVE state and monitors the channel using the first receiver for LP-WUS detection;

decode information comprised in the first transmissions (i.e., specific to the first receiver and received via the first receiver), activating (waking up, powering, powering-on, providing with power, supplying power to) the second receiver, and receiving, via the (activated, woken-up, powered, powered-on) second receiver, a second transmission according to scheduling information comprised in the decoded information. The information comprised in the transmissions specific to the first receiver and received via the first receiver is for example a paging DCI received over a LP-PDCCH, and the scheduling information is for example comprised in the decoded paging DCI, and the transmission according to scheduling information comprised in the decoded information is for example a PDSCH transmission; and on condition of detecting an identifier of the WTRU in the received second transmission based on scheduling information comprised in the decoded information, initiate a connection establishment or connection resume procedure.

According to an embodiment of the WTRU, the second receiver is configured to have a power consumption higher than the first receiver. The second receiver may for example have a power consumption of the conventional Uu or main receiver using active components, and the first receiver may for example have a power consumption of an (U)LP receiver, using passive components that process received RF waveforms collected through the antenna front-end by the receiving device in an (U)LP mode with minimal usage, or even absence, of active power supply. For example, the device may consider only passive RF components and harvest energy from the received RF waveform to run the signal processing circuitry, as described previously.

According to an embodiment of the WTRU, the at least one processor is configured to, on condition of an unsuccessful decode of the information comprised in the first transmissions, activate the second receiver, and receive, via the second receiver, a third transmission comprising scheduling information for receiving, via the second receiver, the second transmission.

According to an embodiment of the WTRU, the transmissions specific to the first receiver are configured according to a first waveform modulation scheme specific for the first receiver, and the transmissions specific to the second receiver are configured according to a second waveform modulation scheme specific for the second receiver.

According to an embodiment of the WTRU, the first waveform modulation scheme is according to any of an on-off keying modulation scheme;

a frequency-shift keying modulation scheme.

According to an embodiment of the WTRU, the first receiver is an ultra-low power receiver, and the second receiver is a Uu receiver.

According to an embodiment of the WTRU, the at least one processor is configured to determine that a network supports ultra-low power paging operation, as a condition for activating the first receiver and for deactivating the second receiver.

According to an embodiment of the WTRU, the at least one processor is configured to determine support of ultra-low power paging operation by the network is for any of:

a current serving cell;

a group of cells;

a radio access network notification area;

a tracking area.

According to an embodiment of the WTRU, the at least one processor is configured to determine support of ultra-low power paging operation by the network based on any of:

an information element in a received system information block;

a received radio resource control message;

a received non-access stratum message;

detection of a low-power synchronization signal;

detection of a low-power wake-up signal.

According to an embodiment of the WTRU, the first receiver is configured to be powered by harvesting energy from the transmissions specific to the first receiver, and the second receiver is configured to be powered by a power supply comprised in the WTRU.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Fieid Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method, implemented by a wireless transmit-receive unit (WTRU), comprising:

receiving configuration information associated with one or more first transmissions specific to a first receiver in the WTRU and associated with one or more second transmissions specific to a second receiver in the WTRU;

receiving, via the first receiver and using the configuration information, the one or more first transmissions;

decoding, from the one or more first transmissions, scheduling information for scheduling a third transmission;

in response to the decoding, activating the second receiver;

receiving, via the activated second receiver, the third transmission according to the decoded scheduling information; and initiating, in response to detecting an identifier of the WTRU in the received third transmission, a connection establishment or a connection resume procedure.

2. The method according to claim 1, wherein the first receiver has a first power consumption profile, wherein the second receiver has a second power consumption profile, and wherein the second power consumption profile is different from the first power consumption profile.

3. The method according to claim 1, wherein the one or more first transmissions are according to a first waveform modulation scheme configured for the first receiver, wherein the one or more second transmissions are according to a second waveform modulation scheme configured for the second receiver, and the method further comprising powering the first receiver using energy harvested from the one or more first transmissions.

4. The method according to claim 3, wherein the first waveform modulation scheme is according to any of: an on-off keying modulation scheme; and a frequency-shift keying modulation scheme.

5. The method according to claim 1, wherein the one or more first transmissions comprise a low-power wake-up signal and first information associated with a low-power physical downlink control channel, wherein the first information comprises the scheduling information, wherein receiving, via the second receiver, the one or more second transmissions comprises receiving, via the second receiver, the one or more second transmissions according to the scheduling information, and wherein the one or more second transmissions comprise second information associated with a physical downlink shared channel information.

6. The method according to claim 1, wherein the first receiver is an ultra-low power receiver, and wherein the second receiver is a Uu receiver.

7. The method according to claim 1, wherein the first receiver is configured to be powered using energy harvested from the one or more first transmissions, and wherein the second receiver is configured to be powered by a power supply associated with the WTRU.

8. The method according to claim 1, wherein the WTRU is in an idle or in an inactive state when the second receiver is not activated.

9. A wireless transmit-receive unit (WTRU), comprising at least one processor configured to:

receive configuration information associated with one or more first transmissions specific to a first receiver in the WTRU and associated with one or more second transmissions specific to a second receiver in the WTRU;

receive, via the first receiver and using the configuration information, the one or more first transmissions;

decode, from the one or more first transmissions, scheduling information for scheduling a third transmission;

in response to the decoding, activate the second receiver;

receive, via the activated second receiver, the third transmission according to the decoded scheduling information; and initiate, in response to detecting an identifier of the WTRU in the received third transmission, a connection establishment or a connection resume procedure.

10. The WTRU according to claim 9, wherein the first receiver has a first power consumption profile, wherein the second receiver has a second power consumption profile, and wherein the second power consumption profile is different from the first power consumption profile.

11. The WTRU according to claim 9, wherein the one or more first transmissions are according to a first waveform modulation scheme configured for the first receiver, wherein the one or more second transmissions are according to a second waveform modulation scheme configured for the second receiver, and wherein the WTRU is configured to power the first receiver using energy harvested from the one or more first transmissions.

12. The WTRU according to claim 11, wherein the first waveform modulation scheme is according to any of:

an on-off keying modulation scheme; and a frequency-shift keying modulation scheme.

13. The WTRU according to claim 9, wherein the one or more first transmissions comprise a low-power wake-up signal and first information associated with a low-power physical downlink control channel, wherein the first information comprises the scheduling information, wherein at least one processor being configured to receive, via the second receiver, the one or more second transmissions comprises the at least one processor being configured to receive, via the second receiver, the one or more second transmissions according to the scheduling information, and wherein the one or more second transmissions comprise second information associated with a physical downlink shared channel information.

14. The WTRU according to claim 9, wherein the first receiver is configured as an ultra-low power receiver, and the second receiver is configured as a Uu receiver.

15. The WTRU according to claim 9, wherein the first receiver is configured to be powered using energy harvested from the one or more first transmissions, and wherein the second receiver is configured to be powered by a power supply associated with the WTRU.

* * * * *